United States Patent
Lee et al.

(10) Patent No.: US 12,073,017 B2
(45) Date of Patent: Aug. 27, 2024

(54) WEARABLE ELECTRONIC DEVICE FOR DISPLAYING VIRTUAL OBJECT ON A SURFACE OF A REAL OBJECT AND METHOD OF CONTROLLING THE SAME

(71) Applicant: SAMSUNG ELECTRONICS CO., LTD., Suwon-si (KR)

(72) Inventors: Eunbin Lee, Suwon-si (KR); Eunyoung Park, Suwon-si (KR); Shinjae Jung, Suwon-si (KR); Yoonho Lee, Suwon-si (KR); Eunkyung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/979,306

(22) Filed: Nov. 2, 2022

(65) Prior Publication Data

US 2023/0135420 A1     May 4, 2023

Related U.S. Application Data

(63) Continuation of application No. PCT/KR2022/095128, filed on Oct. 19, 2022.

(30) Foreign Application Priority Data

Nov. 2, 2021    (KR) .................. 10-2021-0148523
Jan. 12, 2022    (KR) .................. 10-2022-0004440

(51) Int. Cl.
*G06F 3/01*       (2006.01)
*G02B 27/00*     (2006.01)
(Continued)

(52) U.S. Cl.
CPC .......... *G06F 3/013* (2013.01); *G02B 27/0093* (2013.01); *G02B 27/0101* (2013.01);
(Continued)

(58) Field of Classification Search
CPC ...... G02B 2027/0138; G02B 2027/014; G02B 2027/0178; G02B 2027/0187;
(Continued)

(56) References Cited

U.S. PATENT DOCUMENTS

2012/0072420 A1*   3/2012   Moganti ................. G06F 16/48
                                                                 707/737
2012/0302289 A1    11/2012   Kang
(Continued)

FOREIGN PATENT DOCUMENTS

JP       2016-029591       3/2016
JP       2016-045814 A    4/2016
(Continued)

OTHER PUBLICATIONS

PCT International Search Report dated Jan. 16, 2023 for PCT/KR2022/095128.
(Continued)

*Primary Examiner* — Richard J Hong
(74) *Attorney, Agent, or Firm* — NIXON & VANDERHYE P.C.

(57) ABSTRACT

A wearable electronic device may include a display, a camera, at least one first sensor, and at least one processor operatively coupled to the display, the camera, and the at least one first sensor. The at least one processor may be configured to display an execution screen of an application on the display, based on receiving a first user input for selecting a content from among a plurality of contents included in the execution screen of the application through the camera, display a first virtual object related to the selected content on the display, based on receiving a second user input for mapping the first virtual object to an object included in a real space through the camera, identify a type of the object in the real space through the at least one first
(Continued)

sensor, in response to the type of the object in the real space being related to the selected content or the first virtual object, display on the display a second virtual object related to the selected content based on at least one of a shape, a position, or a size of the object in the real space, and in response to the type of the object in the real space being not related to the selected content or the first virtual object, display on the display a third virtual object in the form of a three-dimensional (3D) object related to the selected content.

20 Claims, 65 Drawing Sheets

(51) Int. Cl.
  *G02B 27/01* (2006.01)
  *G06F 3/04817* (2022.01)
  *G06N 20/00* (2019.01)
  *G06T 19/00* (2011.01)

(52) U.S. Cl.
  CPC ....... *G02B 27/017* (2013.01); *G02B 27/0179* (2013.01); *G06F 3/04817* (2013.01); *G06N 20/00* (2019.01); *G06T 19/006* (2013.01); *G02B 2027/0138* (2013.01); *G02B 2027/014* (2013.01); *G02B 2027/0178* (2013.01); *G02B 2027/0187* (2013.01)

(58) Field of Classification Search
  CPC ............ G02B 27/0093; G02B 27/0101; G02B 27/017; G02B 27/0179; G06F 1/163; G06F 1/1658; G06F 3/011; G06F 3/013; G06F 3/017; G06F 3/04815; G06F 3/04817; G06F 3/0482; G06F 3/04842; G06F 3/04847; G06F 3/0486; G06F 21/604; G06F 3/04845; G06F 16/48; G06N 20/00; G06T 19/006; H04N 23/60; F02D 19/105

See application file for complete search history.

(56) References Cited

U.S. PATENT DOCUMENTS

| | | | |
|---|---|---|---|
| 2013/0050258 A1* | 2/2013 | Liu | G06F 3/013 |
| | | | 345/633 |
| 2013/0152900 A1* | 6/2013 | Masubuchi | F02D 19/105 |
| | | | 123/445 |
| 2013/0182012 A1 | 7/2013 | Kim et al. | |
| 2018/0082475 A1 | 3/2018 | Sharma et al. | |
| 2018/0095635 A1 | 4/2018 | Valdivia et al. | |
| 2018/0275749 A1 | 9/2018 | Yoon et al. | |
| 2019/0369836 A1* | 12/2019 | Faulkner | G06F 3/04845 |
| 2020/0202634 A1* | 6/2020 | Faulkner | G06F 21/604 |
| 2020/0258481 A1* | 8/2020 | Woo | G02B 27/017 |
| 2020/0404159 A1* | 12/2020 | Lei | H04N 23/60 |
| 2021/0158624 A1 | 5/2021 | Moon et al. | |

FOREIGN PATENT DOCUMENTS

| | | |
|---|---|---|
| KR | 10-2013-0083179 | 7/2013 |
| KR | 10-2017-0046947 A | 5/2017 |
| KR | 10-2019-0053278 A | 5/2019 |
| KR | 10-2051202 B1 | 11/2019 |

OTHER PUBLICATIONS

PCT Written Opinion dated dated Jan. 16, 2023 for PCT/KR2022/095128.

* cited by examiner

WEARABLE ELECTRONIC DEVICE FOR DISPLAYING VIRTUAL OBJECT ON A SURFACE OF A REAL OBJECT AND METHOD OF CONTROLLING THE SAME

CROSS REFERENCE TO RELATED APPLICATION

This application is a continuation of International Application No. PCT/KR2022/095128 designating the United States, filed on Oct. 19, 2022 in the Korean Intellectual Property Receiving Office, and claiming priority to Korean Patent Application No. 10-2021-0148523, filed on Nov. 2, 2021, and Korean Patent Application No. 10-2022-0004440, filed on Jan. 12, 2022, the disclosures of which are all hereby incorporated herein by reference for all purposes as if fully set forth herein.

FIELD

Example embodiments of the disclosure relate to a wearable electronic device for displaying a virtual object, and/or a method of controlling the same.

BACKGROUND

With the development of electronic and communication technologies, an electronic device may become so small and lightweight that a user may use the electronic device without great inconvenience, even when it is worn on the user's body. For example, wearable electronic devices such as head mounting devices (HMDs), smart watches (or bands), contact lens-type devices, ring-type devices, glove-type devices, shoe-type devices, or clothing-type devices are commercially available. Because the wearable electronic devices are directly worn on the body, portability and user accessibility may be improved.

An HMD is a device used while being worn on a user's head or face, and may provide augmented reality (AR) to the user. For example, the HMD that provides AR may be implemented in the form of glasses, and provide information about objects in the form of images or text to the user in at least a partial space of the user's field of view.

In an augmented reality (AR) environment, when a wearable electronic device is used, it may be caused that it is difficult to smoothly make a motion to press a virtual button in the air or a user movement with a depth according to a surrounding situation, and to clearly recognize a sense of distance to a virtual object. When an action is made with a whole arm for a long time, physical pain may be caused.

SUMMARY

Various embodiments provide a wearable electronic device and a method of controlling the same, which may allow a user to select some of functions being executed, through a gesture, easily fix a virtual object related to the selected function in a real space, place the virtual object naturally in the real space, and increase visibility of information in an AR environment.

According to an example embodiment, a wearable electronic device may include a display, a camera, at least one first sensor, and at least one processor operatively coupled to the display, the camera, and the at least one first sensor. The at least one processor may be configured to display an execution screen of an application on the display, upon receipt of a first user input for selecting a content from among a plurality of contents included in the execution screen of the application through the camera, display a first virtual object related to the selected content on the display, upon receipt of a second user input for mapping the first virtual object to an object included in a real space through the camera, identify a type of the object in the real space through the at least one first sensor, when the type of the object in the real space is related to the selected content or the first virtual object, display on the display a second virtual object related to the selected content based on at least one of a shape, a position, or a size of the object in the real space, and when the type of the object in the real space is not related to the selected content or the first virtual object, display on the display a third virtual object in the form of a three-dimensional (3D) object related to the selected content.

According to an example embodiment, a method of controlling a wearable electronic device may include displaying an execution screen of an application on a display of the wearable electronic device, upon receipt of a first user input for selecting one content from among a plurality of contents included in the execution screen of the application through a camera of the wearable electronic device, displaying a first virtual object related to the selected content on the display, upon receipt of a second user input for mapping the first virtual object to an object included in a real space through the camera, identifying a type of the object in the real space through at least one first sensor of the wearable electronic device, when the type of the object in the real space is related to the selected content or the first virtual object, displaying on the display a second virtual object related to the selected content based on at least one of a shape, a position, or a size of the object in the real space, and when the type of the object in the real space is not related to the selected content or the first virtual object, displaying on the display a third virtual object in the form of a 3D object related to the selected content.

A wearable electronic device according to various example embodiments may allow a user to select some of functions being executed, through a gesture, and easily fix a virtual object related to the selected function in a real space.

The wearable electronic device according to various example embodiments may display detailed information according to a user's gaze, thereby increasing visibility of information.

The wearable electronic device according to various example embodiments may determine the shape of a virtual object based on the type of an object in a real space, to which the virtual object is mapped. Therefore, the virtual object may be placed naturally in the real space.

DESCRIPTION OF THE DRAWINGS

The above and other aspects, features, and advantages of certain example embodiments of the present disclosure will be more apparent from the following detailed description, taken in conjunction with the accompanying drawings, in which.

DETAILED DESCRIPTION

Figure 1:
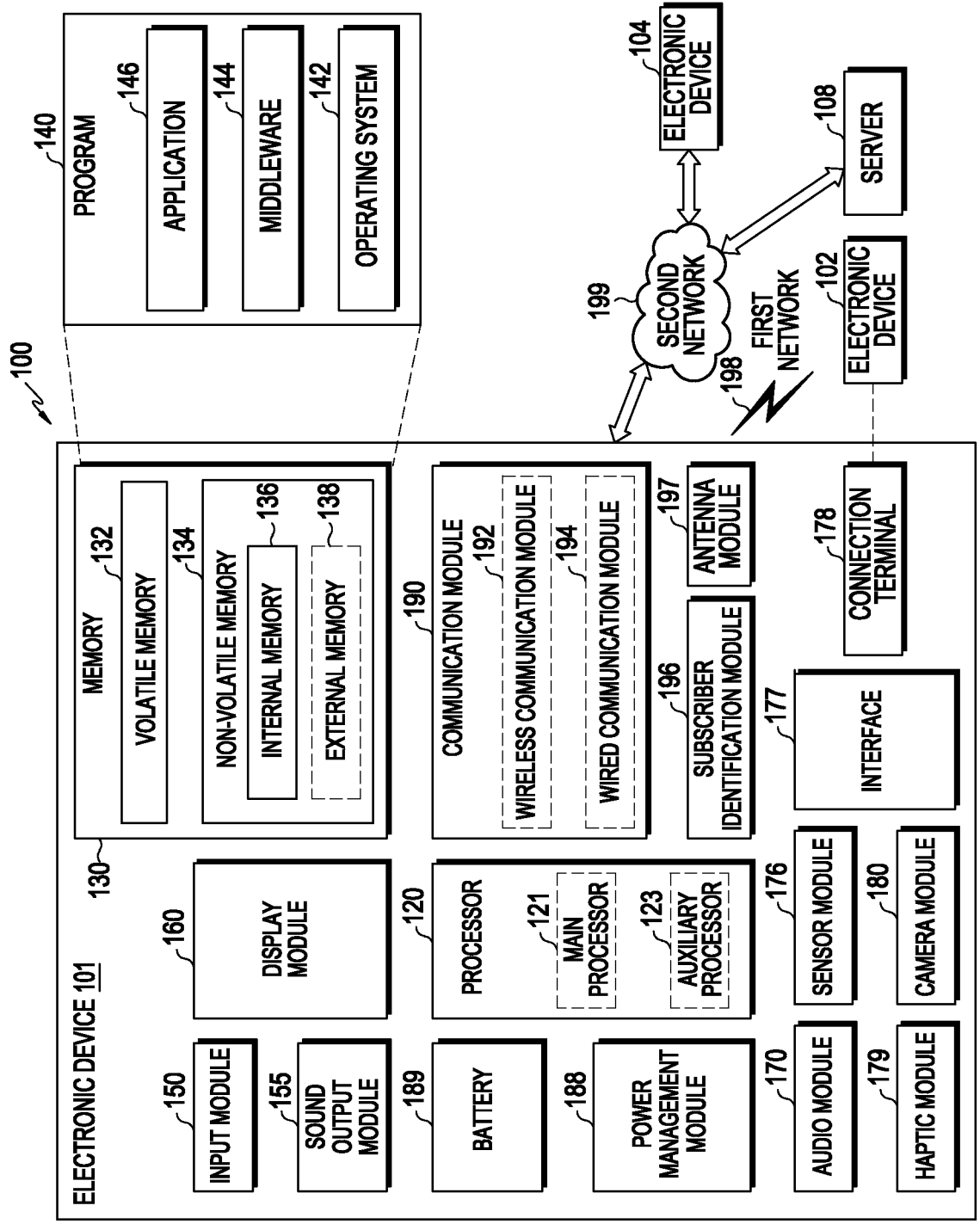
FIG. 1 is a block diagram illustrating an electronic device in a network environment according to various example embodiments.

FIG. 1 is a block diagram illustrating an electronic device in a network environment according to various embodiments. Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received 5 from another component (e.g., the sensor module 176 or the communication module 190) in volatile memory 132, process the command or the data stored in the volatile memory 132, and store resulting data in non-volatile memory 134 (which may include internal memory 136 and/or external memory 138). According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

Antenna module 197 may transmit or receive a signal or power to or from the outside (e.g., the external electronic device) of the electronic device 101. According to an embodiment, antenna module 197 may include an antenna including a radiating element composed of a conductive material or a conductive pattern formed in or on a substrate (e.g., a printed circuit board (PCB)). According to an embodiment, antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of antenna module 197.

According to various embodiments, antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
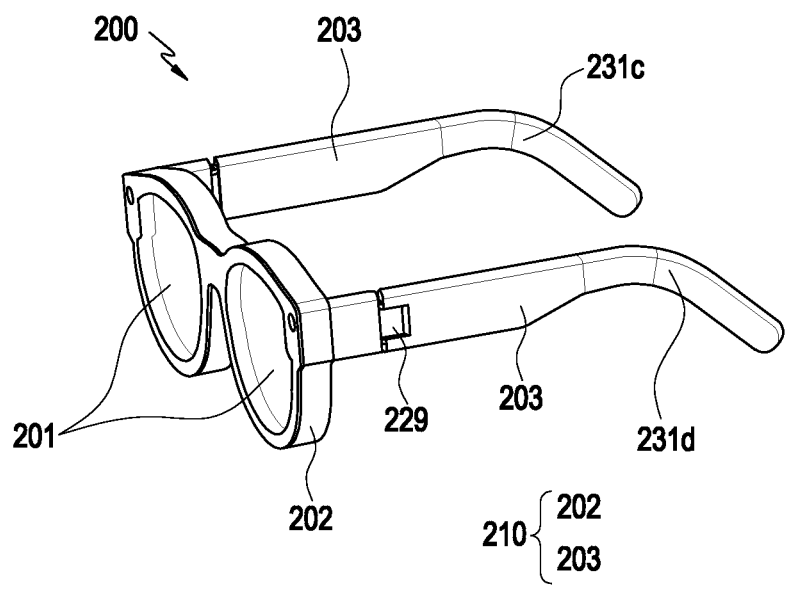
FIG. 2 is a perspective view illustrating an electronic device, according to an example embodiment.

FIG. 2 is a perspective view illustrating an electronic device 200 (e.g., the electronic device 101 of FIG. 1) according to an embodiment.

Referring to FIG. 2, the electronic device 200 is a wearable electronic device in the form of glasses, and a user may visually recognize an object or an environment around the user, while wearing the electronic device 200. For example, the electronic device 200 may be a head mounted display (HMD) or smart glasses capable of providing an image directly in front of the user's eyes. The configuration of the electronic device 200 illustrated FIG. 2 may be wholly or partially identical to that of the electronic device 101 illustrated in FIG. 1.

According to an embodiment, the electronic device 200 may include a housing 210 that forms the exterior of the electronic device 200. The housing 210 may provide a space in which components of the electronic device 200 may be arranged. For example, the housing 210 may include a lens frame 202 and at least one wearing member 203.

According to an embodiment, the electronic device 200 may include at least one display member 201 capable of providing visual information to a user. For example, the display member 201 may include a module equipped with a lens, a display, a waveguide, and/or a touch circuit. According to an embodiment, the display member 201 may be formed to be transparent or semi-transparent. According to an embodiment, the display member 201 may include translucent glass or a window member having a light transmittance which is adjustable by adjusting a color concentration. According to an embodiment, a pair of display members 201 may be provided and disposed to correspond to the left eye and the right eye of the user, respectively, while the electronic device 200 is worn on the user's body.

According to an embodiment, the lens frame 202 may accommodate at least part of the display member 201. For example, the lens frame 202 may surround at least part of an edge of the display member 201. According to an embodiment, the lens frame 202 may position at least one of the display members 201 to correspond to the user's eyes. According to an embodiment, the lens frame 202 may be the rim of a general eyeglass structure. According to an embodiment, the lens frame 202 may include at least one closed curve surrounding the display member 201.

According to an embodiment, the wearing member 203 may extend from the lens frame 202. For example, the wearing member 203 may extend from an end of the lens frame 202 and may be supported or positioned on the user's body (e.g., an ear), together with the lens frame 202. According to an embodiment, the wearing member 203 may be rotatably coupled with the lens frame 202 through a hinge structure 229. According to an embodiment, the wearing member 203 may include an inner side surface 231c configured to face the user's body and an outer side surface 231d opposite to the inner side surface 231c.

According to an embodiment, the electronic device 200 may include the hinge structure 229 configured to fold the wearing member 203 with respect to the lens frame 202. The hinge structure 229 may be disposed between the lens frame 202 and the wearing member 203. Without wearing the electronic device 200, the user may carry or keep the electronic device 200 by folding the wearing member 203 to partially overlap with the lens frame 202.

Figure 3:
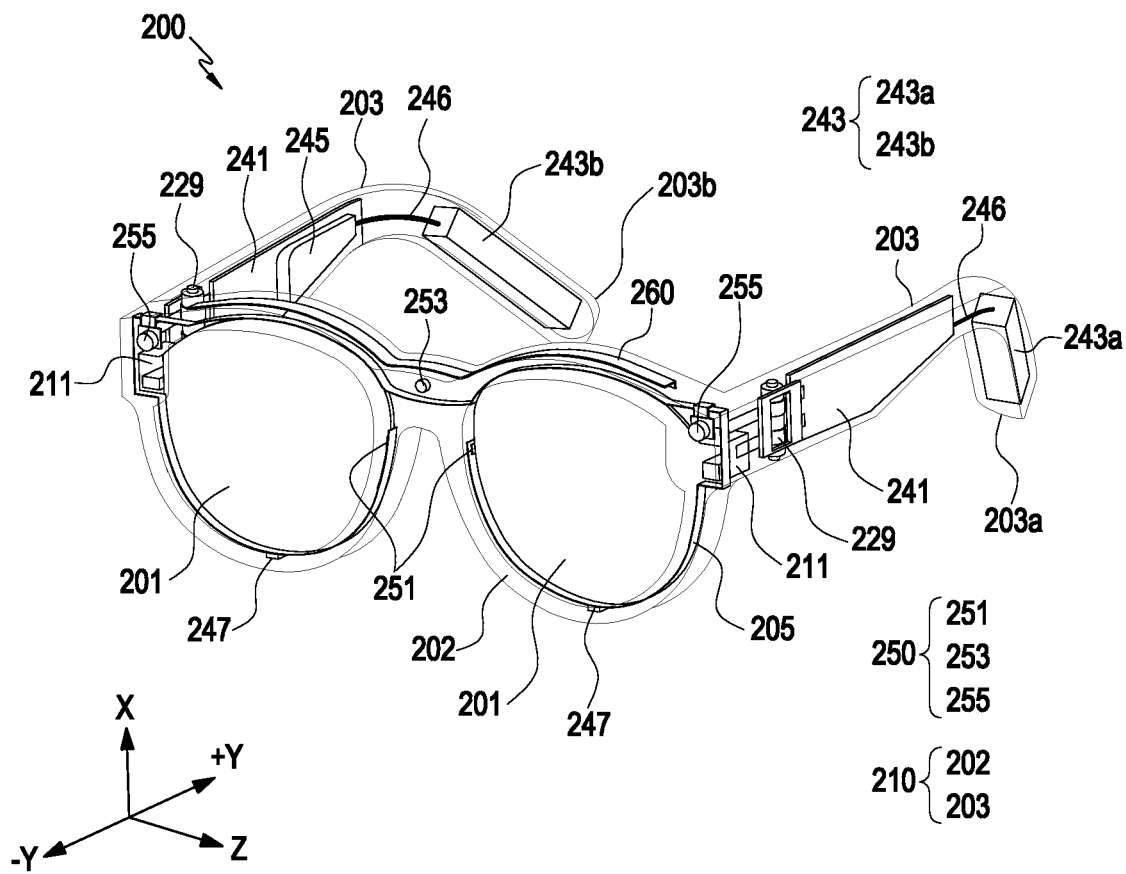
FIG. 3 is a first perspective view illustrating an internal configuration of an electronic device according to an example embodiment.
Figure 4:
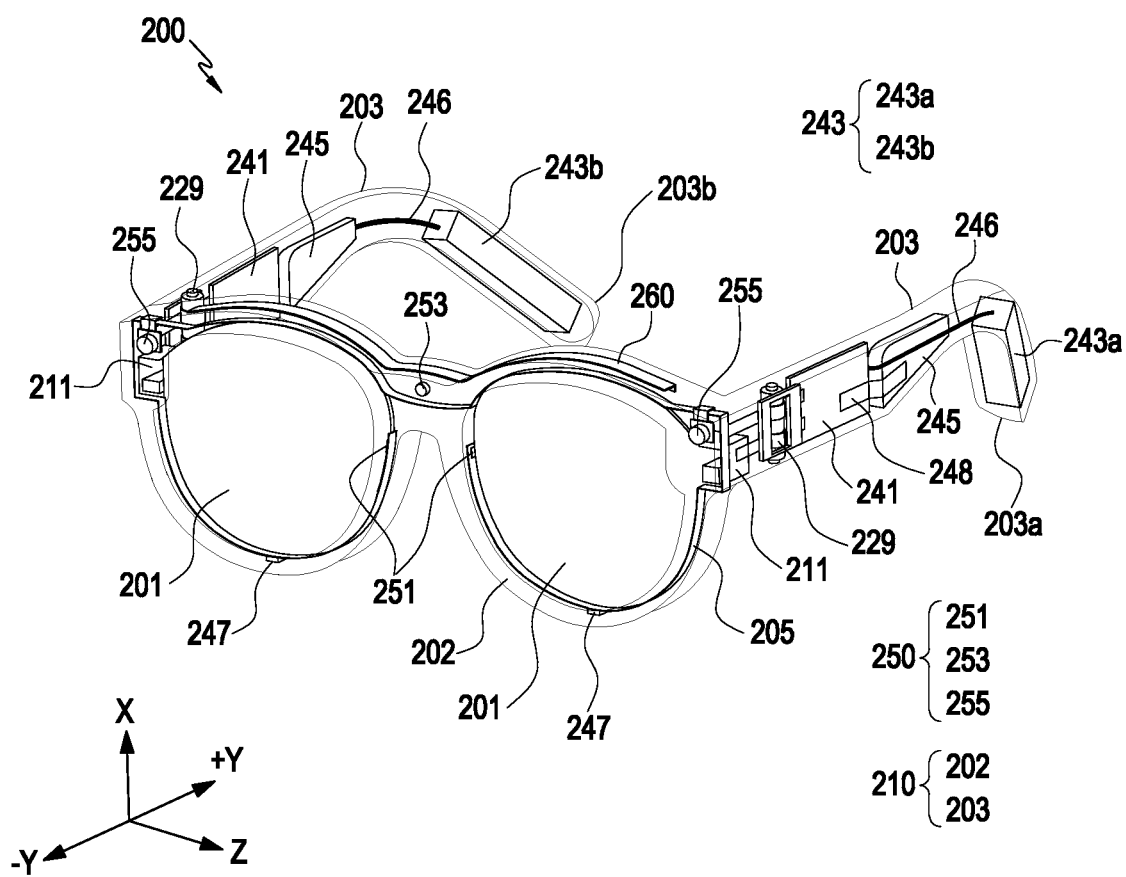
FIG. 4 is a second perspective view illustrating an internal configuration of an electronic device according to an example embodiment.
Figure 5:
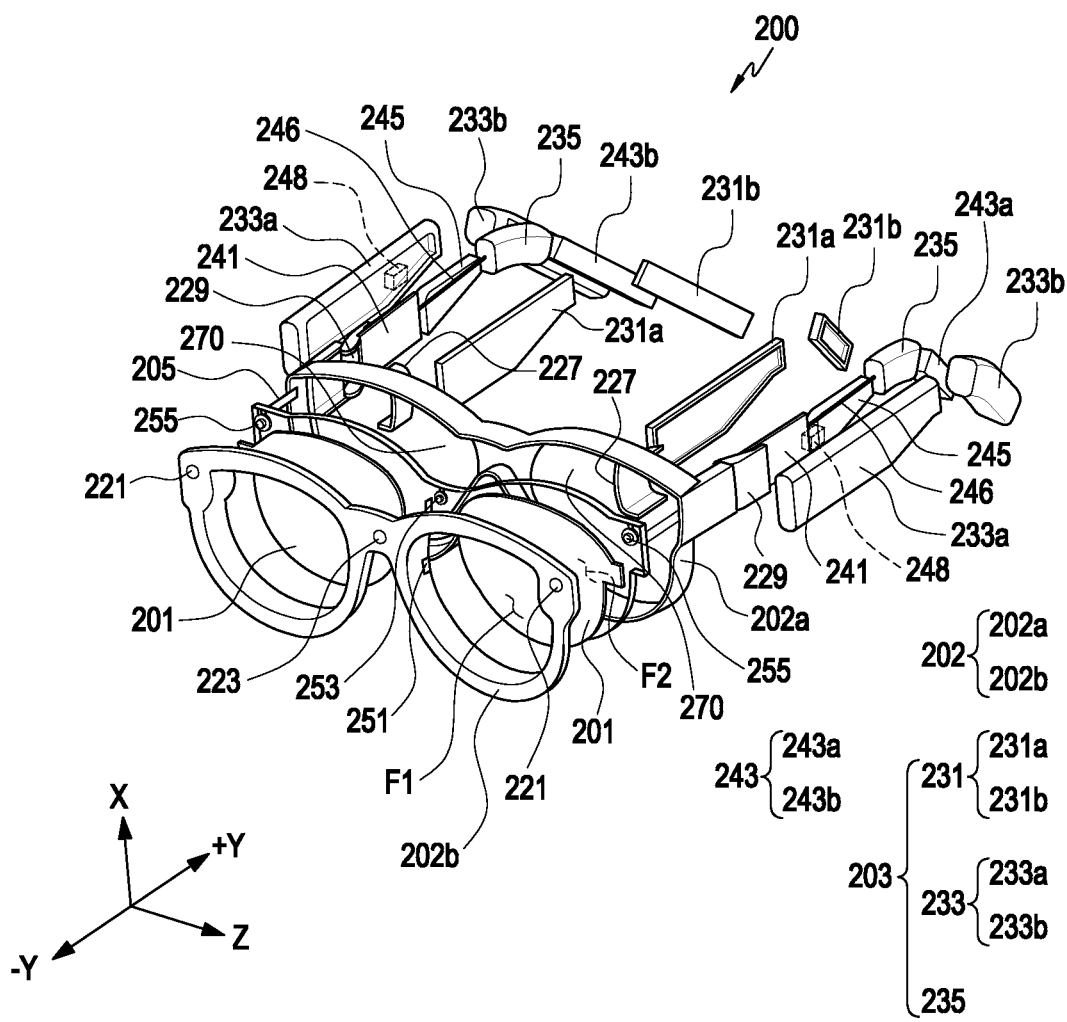
FIG. 5 is an exploded perspective view illustrating an electronic device according to an example embodiment.

FIG. 3 is a first perspective view illustrating an internal configuration of an electronic device according to various embodiments. FIG. 4 is a second perspective view illustrating an internal configuration of an electronic device according to various embodiments. FIG. 5 is an exploded perspective view illustrating an electronic device according to various embodiments.

Referring to FIGS. 3, 4 and 5, the electronic device 200 may include components (e.g., at least one circuit board 241 (e.g., a printed circuit board (PCB), a printed board assembly (PBA), a flexible PCB (FPCB), or a rigid-flexible PCB (RFPCB)) accommodated in the housing 210, at least one battery 243, at least one speaker module 245 including a speaker, at least one power transfer structure 246, and a camera module 250 including a camera). The configuration of the housing 210 illustrated in FIGS. 3 and 4 may be wholly or partially identical to those of the display member 201, the lens frame 202, the wearing member 203, and the hinge structure 229 illustrated in FIG. 2.

According to an embodiment, the electronic device 200 may obtain and/or recognize a visual image of an object or an environment in a direction (e.g., a −Y direction) in which the user sees or the electronic device 200 faces, using the camera module 250 (e.g., the camera module 180 of FIG. 1, including at least a camera), and receive information about the object or the environment from an external electronic device (e.g., the electronic device 102 or 104, or the server 108) through a network (e.g., the first network 198 or the second network 199 of FIG. 1). In another embodiment, the electronic device 200 may provide the received information about the object or environment to the user in an acoustic or visual form. The electronic device 200 may provide the received information about the object or the environment in a visual form to the user through the display member 201, using a display module (e.g., the display module 160 of FIG. 1 including at least a display). For example, the electronic device 200 may implement augmented reality (AR) by visually implementing the information about the object or the environment and combining the information with a real image of the ambient environment of the user.

According to an embodiment, the display member 201 may include a first surface F1 facing a direction (e.g., the −Y direction) from which external light is incident and a second surface F2 facing a direction (e.g., a +Y direction) opposite to the first surface F1. While the user wears the electronic device 200, at least part of light or an image incident through the first surface F1 may be introduced to the left eye and/or the right eye of the user through the second surface F2 of the display member 201 disposed to face the left eye and/or the right eye of the user.

According to one embodiment, the lens frame 202 may include at least two frames. For example, the lens frame 202 may include a first frame 202a and a second frame 202b. According to an embodiment, when the user wears the electronic device 200, the first frame 202a may be a part facing the user's face, and the second frame 202b may be part of the lens frame 202 spaced apart from the first frame 202a in the gaze direction (e.g., the −Y direction) of the user.

According to an embodiment, a light output module 211 may provide an image and/or a video to the user. For example, the light output module 211 may include a display panel (not shown) capable of outputting an image, and a lens (not shown) corresponding to the user's eye and guiding the image to the display member 201. For example, the user may obtain an image output from a display panel of the light output module 211 through a lens of the light output module 211. According to an embodiment, the light output module 211 may include a device configured to display various types of information. For example, the light output module 211 may include at least one of a liquid crystal display (LCD), a digital mirror device (DMD), a liquid crystal on silicon (LCoS), or an organic light emitting diode (OLED), or a micro light emitting diode (micro LED). According to an embodiment, when the light output module 211 and/or the display member 201 includes one of an LCD, a DMD, and an LCoS, the electronic device 200 may include a light source irradiating light to the display area of the output module 211 and/or the display member 201. According to another embodiment, when the light output module 211 and/or the display member 201 includes one of an OLED and a micro LED, the electronic device 200 may provide a virtual image to the user, without including a separate light source.

According to an embodiment, at least part of the light output module 211 may be disposed in the housing 210. For example, light output modules 211 may be disposed in the wearing member 203 or the lens frame 202 to correspond to the user's right eye and left eye, respectively. According to an embodiment, the light output module 211 may be coupled to the display member 201 and provide an image to the user through the display member 201. For example, an image output from the light output module 211 may be incident on the display member 201 through an input optical member located at one end of the display member 201, and radiated toward the user's eye through a waveguide and an output optical member located in at least part of the display member 201. According to an embodiment, the waveguide may be made of glass, plastic, or a polymer, and include a nanopattern, for example, a polygonal or curved grating structure, formed on one surface inside or outside the waveguide. According to an embodiment, the waveguide may include at least one of at least one diffractive element (e.g., a diffractive optical element (DOE) or a holographic optical element (HOE)) or a reflective element (e.g., a reflective mirror).

According to an embodiment, the circuit board 241 may include components for driving the electronic device 200. For example, the circuit board 241 may include at least one integrated circuit (IC) chip, and at least one of the processor 120 the memory 130, the power management module 188, or the communication module 190 illustrated in FIG. 1 may be provided on the IC chip. According to an embodiment, the circuit board 241 may be disposed in the wearing member 203 of the housing 210. According to an embodiment, the circuit board 241 may be electrically coupled to the battery 243 through the power transfer structure 246. According to an embodiment, the circuit board 241 may be coupled to a flexible printed circuit board (FPCB) 205 and transmit an electrical signal to electronic components (e.g., the optical/light output module 211 comprising circuitry) of the electronic device, the camera module 250, and a light emitter through the FPCB 205. According to an embodiment, the circuit board 241 may be an interposer board. Each "module" herein may include circuitry.

According to various embodiments, the FPCB 205 may extend from the circuit board 241 across the hinge structure 229 into the lens frame 202, and may be disposed at least part of the circumference of the display member 201 inside the lens frame 202.

According to an embodiment, the battery 243 (e.g., the battery 189 of FIG. 1) may be electrically coupled to components (e.g., the optical/light output module 211, the circuit board 241, the speaker module 245, a microphone module 247, and/or the camera module 250 of the electronic device 200) of the electronic device 200, and supply power to the components of the electronic device 200.

According to an embodiment, at least part of the battery 243 may be disposed in the wearing member 203. According to an embodiment, the battery 243 may be disposed adjacent (directly or indirectly) to ends 203a and 203b of wearing members 203. For example, the battery 243 may include a first battery 243a disposed at a first end 203a of the at least one wearing member 203 and a second battery 243b disposed at a second end 203b of the at least one wearing member 203.

According to various embodiments, the speaker module 245 (e.g., the audio module 170 or the sound output module 155 of FIG. 1, e.g., including at least one speaker) may convert an electrical signal into a sound. At least part of the speaker module 245 may be disposed in the wearing member 203 of the housing 210.

According to an embodiment, the speaker module 245 may be located inside the wearing member 203 to correspond to the user's ear. According to an embodiment (e.g., FIG. 3), the speaker module 245 may be disposed on the circuit board 241. For example, the speaker module 245 may be disposed between the circuit board 241 and an inner case (e.g., an inner case 231 of FIG. 5). According to an embodiment (e.g., FIG. 4), the speaker module 245 may be disposed next to the circuit board 241. For example, the speaker module 245 may be disposed between the circuit board 241 and the battery 243.

According to an embodiment, the electronic device 200 may include a connecting member 248 coupled to the speaker module 245 and the circuit board 241. The connecting member 248 may transmit at least part of a sound and/or a vibration generated by the speaker module 245 to the circuit board 241. According to an embodiment, the connecting member 248 may be integrally formed with the speaker module 245. For example, a portion extending from a speaker frame of the speaker module 245 may be interpreted as the connecting member 248. According to an embodiment (e.g., FIG. 3), the connecting member 248 may be omitted. For example, when the speaker module 245 is disposed on the circuit board 241, the connecting member 248 may be omitted.

According to an embodiment, the power transfer structure 246 may transfer power from the battery 243 to an electronic component (e.g., the light output module 211) of the electronic device 200. For example, the power transfer structure 246 may be electrically coupled to the battery 243 and/or the circuit board 241, and the circuit board 241 may transfer power received through the power transfer structure 246 to the optical output module 211.

According to an embodiment, the power transfer structure 246 may be configured to transfer power. For example, the power transfer structure 246 may include an FPCB or a wire. For example, the wire may include a plurality of cables (not shown). In various embodiments, the shape of the power transfer structure 246 may be modified in various manners in consideration of the number and/or type of the cables.

According to an embodiment, the microphone module 247 (e.g., the input module 150 and/or the audio module 170 of FIG. 1) may convert a sound into an electrical signal. According to an embodiment, the microphone module 247 may be disposed on at least part of the lens frame 202. For example, at least one microphone module 247 may be disposed at a lower end (e.g., in a direction toward the −X axis) and/or at an upper end (e.g., in a direction toward the X axis) of the electronic device 200. According to an embodiment, the electronic device 200 may more clearly recognize the user's voice, using voice information (e.g., sound) obtained from the at least one microphone module 247. For example, the electronic device 200 may distinguish voice information from ambient noise based on the obtained voice information and/or additional information (e.g., low-frequency vibration of the user's skin and bones). For example, the electronic device 200 may clearly recognize the user's voice and perform a function of reducing ambient noise (e.g., noise canceling).

According to an embodiment, the camera module 250 may capture a still image and/or a video. The camera module 250 may include at least one of a lens, at least one image sensor, an image signal processor, or a flash. According to an embodiment, the camera module 250 may be disposed inside the lens frame 202 and disposed around the display member 201.

According to an embodiment, the camera module 250 may include at least one first camera module 251. According to an embodiment, the first camera module 251 may photograph the user's eye (e.g., a pupil) or the trajectory of a gaze. For example, the first camera module 251 may photograph a reflection pattern of light emitted from the light emitter to the user's eye. For example, the light emitter may emit light in an IR band for tracking the trajectory of the gaze using the first camera module 251. For example, the light emitter may include an IR LED. According to an embodiment, the processor (e.g., the processor 120 of FIG. 1) may adjust the position of the virtual image so that a virtual image projected on the display member 201 corresponds to the gaze direction of the user's pupil. According to an embodiment, the first camera module 251 may include a global shutter (GS)-type camera, and the user's eye or the trajectory of the gaze may be traced using a plurality of first camera modules 251 of the same standard and performance.

According to various embodiments, the first camera module 251 may periodically or aperiodically transmit information (e.g., trajectory information) related to the trajectory of the user's eye or gaze to the processor (e.g., the processor 120 of FIG. 1). According to another embodiment, when the first camera module 251 detects that the user's gaze has changed based on the trajectory information (e.g., the eye moves more than a reference value with the head stationary), the first camera module 251 may transmit the trajectory information to the processor.

According to an embodiment, the camera module 250 may include a second camera module 253. According to an embodiment, the second camera module 253 may capture an external image. According to an embodiment, the second camera module 253 may be a GS-type camera or a rolling shutter (RS)-type camera. According to an embodiment, the second camera module 253 may capture an external image through a second optical hole 223 formed in the second frame 202b. For example, the second camera module 253 may include a high-resolution color camera, and may be a high resolution (HR) or photo video (PV) camera. Further, the second camera module 253 may provide an auto focus function (AF) and an optical image stabilizer (OIS) function.

According to various embodiments (not shown), the electronic device 200 may include a flash (not shown) located adjacent (directly or indirectly) to the second camera module 253. For example, the flash (not shown) may provide light to increase an ambient brightness (e.g., illuminance) of the electronic device 200, when the second camera module 253 obtains an external image, and reduce the difficulty of obtaining an image, caused by a darker environment, mixture of various light sources, and/or light reflection.

According to an embodiment, the camera module 250 may include at least one third camera module 255. According to an embodiment, the third camera module 255 may photograph a user motion through a first optical hole 221 formed in the lens frame 202. For example, the third camera module 255 may photograph a user gesture (e.g., hand gesture). Third camera modules 255 and/or first optical holes 221 may be formed respectively at both side ends of the lens frame 202 (e.g., the second frame 202b), for example, in the X direction. According to an embodiment, the third camera module 255 may be a GS-type camera. For example, the third camera module 255 may provide 360-degree spatial (e.g., omnidirectional) recognition, position recognition, and/or movement recognition with a camera supporting 3 degrees of freedom (3DoF) or 6DOF. According to an embodiment, the third camera module 255 may use a plurality of GS-type cameras of the same standard and performance as a stereo camera to perform a simultaneous localization and mapping (SLAM) function and a user movement recognition function. According to an embodiment, the third camera module 255 may include an IR camera (e.g., a time of flight (TOF) camera or a structured light camera). For example, the IR camera may operate as at least part of a sensor module (e.g., the sensor module 176 of FIG. 1) for detecting a distance to a subject.

According to an embodiment, at least one of the first camera module 251 or the third camera module 255 may be replaced with a sensor module (e.g., the sensor module 176 of FIG. 1). For example, the sensor module may include at least one of a vertical cavity surface emitting laser (VCSEL), an IR sensor, and/or a photodiode. For example, the photodiode may include a positive intrinsic negative (PIN) photodiode or an avalanche photodiode (APD). A photodiode may also be referred to as a photo detector or a photo sensor.

According to an embodiment, at least one of the first camera module 251, the second camera module 253, or the third camera module 255 may include a plurality of camera modules (not shown). For example, the second camera module 253 may include a plurality of lenses (e.g., wide-angle and telephoto lenses) and image sensors, and may be disposed on one surface (e.g., a surface facing the −Y axis) of the electronic device 200. For example, the electronic device 200 may include a plurality of camera modules having different attributes (e.g., angles of view (AOVs)) or functions, and control to change the AOVs of the camera modules based on a user selection and/or trajectory information. For example, at least one of the plurality of camera modules may be a wide-angle camera, and at least another may be a telephoto camera.

According to various embodiments, the processor (e.g., the processor 120 of FIG. 1) may determine a movement of the electronic device and/or a user movement, using information about the electronic device 200 obtained by at least one of a gesture sensor, a gyro sensor, or an acceleration sensor of the sensor module (e.g., the sensor module 176 of FIG. 1) and a user action (e.g., approach of the user body to the electronic device 200) detected by the third camera module 255. According to an embodiment, the electronic device 200 may include a magnetic (geomagnetic) sensor that measures a bearing using a magnetic field and a magnetic force line, and/or a hall sensor that obtains movement information (e.g., a movement direction or a movement distance) using the strength of a magnetic field. For example, the processor may determine a movement of the electronic device 200 and/or a user movement based on information obtained from the magnetic (geomagnetic) sensor and/or the hall sensor.

According to various embodiments (not shown), the electronic device 200 may perform an input function (e.g., a touch and/or pressure sensing function) enabling interaction with the user. For example, a component configured to perform the touch and/or pressure sensing function (e.g., a touch sensor and/or a pressure sensor) may be disposed in at least part of the wearing member 203. The electronic device 200 may control a virtual image output through the display member 201 based on information obtained through the component. For example, the sensor related to the touch and/or pressure sensing function may be configured in various types such as a resistive type, a capacitive type, an electro-magnetic (EM) type, or an optical type. According to an embodiment, the component configured to perform the touch and/or pressure sensing function may be wholly or partially identical to that of the input module 150 of FIG. 1.

Each embodiment herein may be used in combination with any other embodiment herein.

According to an embodiment, the electronic device 200 may include a reinforcing member 260 disposed in an inner space of the lens frame 202 and formed to have a higher rigidity than that of the lens frame 202.

According to an embodiment, the electronic device 200 may include a lens structure 270. The lens structure 270 may refract at least part of light. For example, the lens structure 270 may be a prescription lens with a specified refractive power. According to an embodiment, the housing 210 may include a hinge cover 227 that may conceal part of the hinge structure 229. Another part of the hinge structure 229 may be accommodated or concealed between the inner case 231 and an outer case 233 to be described later.

According to various embodiments, the wearing member 203 may include the inner case 231 and the outer case 233. The inner case 231, which is, for example, a case configured to face the user's body or directly contact the user's body, may be made of a material having low thermal conductivity, for example, a synthetic resin. According to an embodiment, the inner case 231 may include an inner surface (e.g., the inner surface 231c of FIG. 2) facing the user's body. The outer case 233 may include, for example, a material (e.g., a metal material) which may at least partially transfer heat, and may be coupled with the inner case 231 to face the inner case 231. According to an embodiment, the outer case 233 may include an outer surface (e.g., the outer surface 231d of FIG. 2) opposite to the inner surface 231c. In an embodiment, at least one of the circuit board 241 or the speaker module 245 may be accommodated in a space separated from the battery 243 inside the wearing member 203. In the illustrated embodiment, the inner case 231 may include a first case 231a including the circuit board 241 and/or the speaker module 245, and a second case 231b accommodating the battery 243. The outer case 233 may include a third case 233a coupled with the first case 231a to face the first case 231a, and a fourth case 233b coupled with the second case 231b to face the second case 231b. For example, the first case 231a and the third case 233a may be coupled with each other (hereinafter, referred to as a "first case part 231a and 233a") to accommodate the circuit board 241 and/or the speaker module 245. The second case 231b and the fourth case 233b may be coupled with each other (hereinafter, referred to as a 'second case part 231b and 233b') to accommodate the battery 243.

According to an embodiment, the first case part 231a and 233a may be rotatably coupled with the lens frame 202 through the hinge structure 229, and the second case part 231b and 233b may be coupled to an end of the first case part 231a and 233a through a connecting structure 235. In some embodiments, a part of the connecting structure 235 that comes into contact with the user's body may be made of a material having a low thermal conductivity, for example, silicon, polyurethane, or an elastic material such as rubber, whereas a part of the connecting structure 235 that does not come into contact with the user's body may be made of a material with a high thermal conductivity (e.g., a metal material). For example, when heat is generated from the circuit board 241 or the battery 243, the connecting structure 235 may block the heat from being transferred to the part in contact with the user's body, and disperse or release the heat through the part not in contact with the user's body. According to an embodiment, the part of the connecting structure 235 configured to come into contact with the user's body may be interpreted as part of the inner case 231, and the part of the connecting structure 235 that does not contact the user's body may be interpreted as part of the outer case 233. According to an embodiment (not shown), the first case 231a and the second case 231b may be integrally configured without the connecting structure 235, and the third case 233a and the fourth case 233b may be integrally configured without the connecting structure 235. According to various embodiments, other components (e.g., antenna module 197 of FIG. 1, including at least one antenna) may be further included in addition to the illustrated components, and information about an object or an environment may be provided from an external electronic device (e.g., the electronic device 102 or 104, or the server 108 of FIG. 1) through a network (e.g., the first network 198 or the second network 199 of FIG. 1), using the communication module 190 including communication circuitry.

Figure 6:
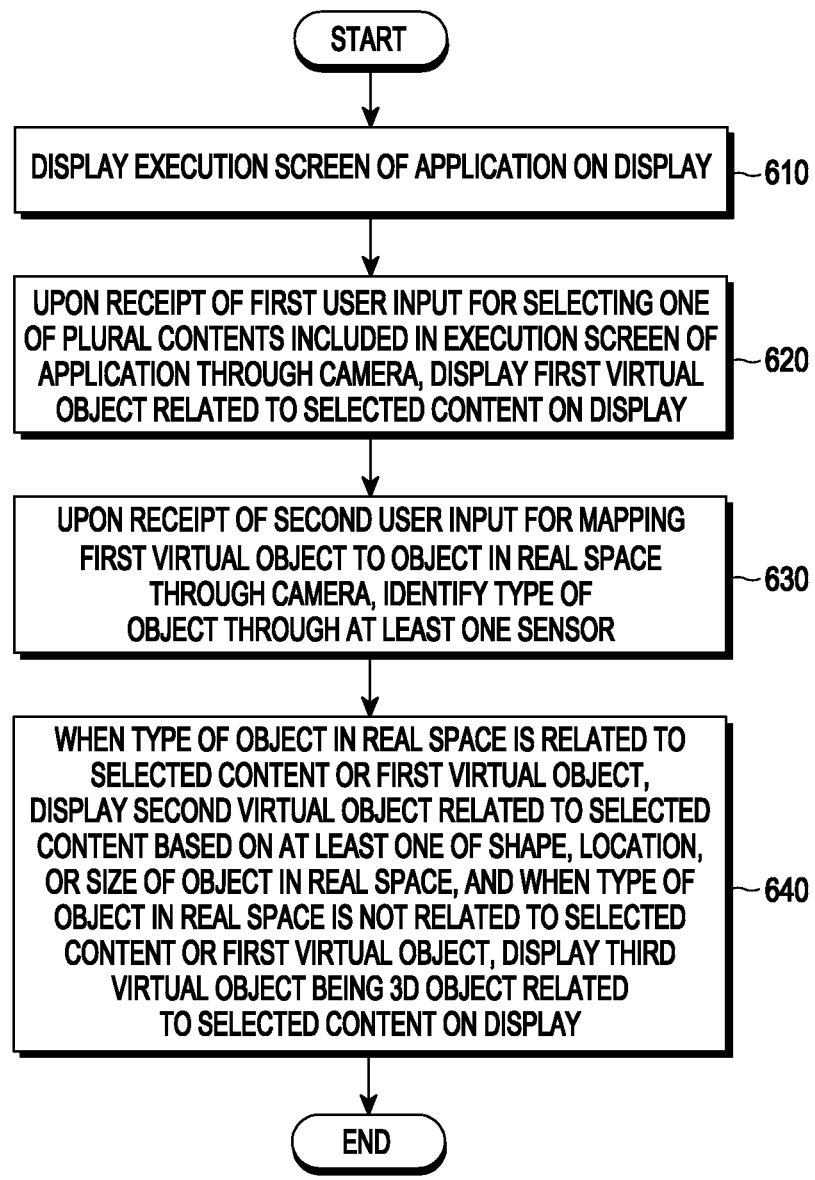
FIG. 6 is a flowchart illustrating an operation of displaying a virtual object in a wearable electronic device according to an example embodiment.

FIG. 6 is a flowchart illustrating an operation of displaying a virtual object in an electronic device according to an embodiment.

According to an embodiment, referring to FIG. 6, the electronic device (e.g., the electronic device 101 of FIG. 1, the processor 120 of FIG. 1, or the electronic device 200 of FIG. 2) may display an execution screen of an application on the display (e.g., the display module 160 of FIG. 1 or the display member 201 of FIG. 2, each including at least a display) in operation 610.

For example, the electronic device may display an application list including a plurality of application icons on the display. Upon receipt of a user input for selecting one icon from the application list through the camera (e.g., the camera module 180 of FIG. 1 or the third camera module 255 of FIG. 3), the electronic device may display an execution screen of an application corresponding to the selected icon on the display.

The operation of displaying an execution screen of an application according to an embodiment will be described below with reference to FIG. 7.

According to an embodiment, in operation 620, based on receiving a first user input for selecting one of a plurality of contents included in the execution screen of the application through the camera (e.g., the camera module 180 of FIG. 1 or the third camera module 255 of FIG. 3), the electronic device may display a first virtual object related to the selected content on the display.

For example, the first user input may be a pinch action by which the user picks up content with a thumb and an index finger. Upon receipt of a pinch action that selects one of the plurality of contents included in the execution screen of the application, the electronic device may display the first virtual object related to the selected content on the display. According to an embodiment, the first user input may be a gesture input such as a touch action other than a pinch action, and the gesture input is not limited to the pinch action or the touch action.

According to an embodiment, the first user input may include a voice input and/or eye tracking, not limited to the gesture input. An operation of mapping a virtual object to a real object through a voice input and/or eye tracking according to an embodiment will be described below with reference to FIGS. 10A to 10G.

According to an embodiment, the first virtual object may be in the form of a panel or a three-dimensional (3D) virtual object. According to an embodiment, the shape of the first virtual object may be set during manufacture or by a user manipulation.

For example, when the first virtual object is in the form of a panel, the electronic device may generate the first virtual object in the form of a closed curve (e.g., a figure such as a square, a circle, a rounded square, or an oval) distinguished from the execution screen of the application, and display selected content information on the first virtual object.

For example, when the first virtual object is in the form of a 3D virtual object, the shape of the 3D virtual object may be determined based on the type of the application. For example, when the execution screen is for a calendar application, the first virtual object may be in the form of a desk calendar, and when the execution screen is for an alarm application, the first virtual object may be in the form of a desk clock. According to an embodiment, the shape of a 3D virtual object may be mapped to each application and stored in memory (e.g., the memory 130 of FIG. 1).

According to an embodiment, the operation of selecting one content on an execution screen of an application will be described below with reference to FIG. 8.

According to an embodiment, the operation of displaying the first virtual object related to the content selected based on the first user input will be described below with reference to FIGS. 9A and 9B.

According to an embodiment, in operation 630, based on receiving a second user input for mapping the first virtual object to an object included in a real space through the camera (e.g., the camera module 180 of FIG. 1 or the third camera module 255 of FIG. 3), the electronic device may identify the type of the object in the real space through at least one sensor (e.g., the sensor module 176 of FIG. 1 or the second camera module 253 of FIG. 3).

For example, the second user input may include a gesture input for moving the first virtual object and a gesture input for releasing the first virtual object near the object included in the real space. According to an embodiment, the second user input is not limited thereto, and may be a gesture input for selecting the first virtual object, selecting the object included in the real space, and mapping the first virtual object to the object included in the real space.

According to an embodiment, the second user input is not limited to the gesture input, and may include a voice input and/or eye tracking. An operation of mapping a virtual object to a real object through a voice input and/or eye tracking according to an embodiment will be described below with reference to FIGS. 10A to 10G.

According to an embodiment, the electronic device may identify the type of the object on which the first virtual object is released among a plurality of objects located in the real space through at least one sensor (e.g., the camera (e.g., the second camera module 253 of FIG. 3)).

According to an embodiment, the electronic device may identify the existence of a plurality of objects located in the real space through at least one sensor (e.g., the sensor module 176 of FIG. 1 (e.g., a depth of field (DoF) and a Lidar)), and display a plurality of icons indicating that the first virtual object is mappable, respectively on the plurality of objects in the real space. According to an embodiment, upon receipt of the second user input that releases the first virtual object on one of the plurality of icons, the electronic device may identify the type of the object through the camera (e.g., the third camera module 255, and/or the second camera module 253, of FIG. 3). Each "camera module" herein includes circuitry and/or a camera.

According to an embodiment, the operation of displaying an icon on each of the plurality of objects in the real space is optional. Upon receipt of the second user input that releases the first virtual object on the object in the real space with no icon displayed for each object in the real space, the electronic device may change and display the first virtual object depending on whether the type of the object in the real space is related to the selected content or the first virtual object. According to an embodiment, the operation of the electronic device, upon receipt of the second user input for releasing the first virtual object on the object in the real space with no icons displayed on the objects in the real space will be described in detail in relation to operation 640.

According to an embodiment, the operation of displaying an icon on each of a plurality of objects located in a real space will be described below with reference to FIG. 13B.

According to an embodiment, the electronic device may obtain an image of the object in the real space, to which the first virtual object is mapped through the camera, and determine the type of the object in the real space based on an artificial intelligence (AI) model stored in the memory (e.g., the memory 130 of FIG. 1). For example, the AI model may be trained by using the types of objects and a plurality of shapes of the objects as input data.

According to an embodiment, the electronic device may store information related to a plurality of shapes for each object in the memory, and determine an object having a highest similarity to the object in the real space among a plurality of objects stored in the memory as the type of the object in the real space. For example, the similarity may be determined based on at least one of the shape of the object or information included in the object. According to an embodiment, the shape of an object may mean the shape of a boundary of the object, and include a 2D shape and a 3D shape. According to an embodiment, the information included in the object may include at least one of text information or image information.

Although it has been described above that the operation of identifying the type of an object in a real space is performed in the electronic device, a server (e.g., the server 108 in FIG. 1) may receive an image of the object in the real space, identify the type of the object in the real space, and transmit an identification result to the electronic device according to an embodiment.

According to an embodiment, in operation 640, in response to the type of the object in the real space being related to the selected content or the first virtual object, the electronic device may display a second virtual object related to the selected content on the display, based on at least one of the information included in the object in the real space, or the shape, position, or size of the object.

For example, when the object in the real space to which the first virtual object is mapped is related to the selected content or the first virtual object, the electronic device may display the second virtual object in at least one of at least part of the object in the real space or the vicinity of the object in the real space, and the second virtual object may include selected content information.

According to an embodiment, the electronic device may analyze the object in the real space, and identify that the object in the real space to which the first virtual object is mapped is related to the selected content or the first virtual object.

For example, the electronic device may identify that the object in the real space to which the first virtual object is mapped is related to the selected content or the first virtual object, based on at least one of the information included in the object in the real space, or the shape, position, or size of the object in the real space. According to an embodiment, the information included in the object in the real space may include at least one of text information or image information.

For example, when the object in the real space is a calendar, the electronic device may determine whether the calendar is a monthly calendar or a daily calendar based on text information included in the calendar, and the information included in the second virtual object and the position at which the second virtual object is displayed may vary depending on whether the calendar is a monthly calendar or a daily calendar.

In another embodiment, when the object in the real space is a watch, the electronic device may determine whether the watch is an analog watch or a digital watch based on text information included in the watch, and the information included in the second virtual object and the position at which the second virtual object is displayed may vary, depending on whether the real watch is an analogue watch or a digital watch.

According to an embodiment, the electronic device may display the changed second virtual object in at least one of part of the object in the real space or the vicinity of the object in the real space.

According to an embodiment, the operation of the electronic device, when the type of the object in the real space to which the first virtual object is mapped is related to the selected content or the first virtual object will be described below with reference to FIGS. 13A and 14.

According to an embodiment, in response to the type of the object in the real space being not related to the selected content or the first virtual object, the electronic device may display on the display a third virtual object in the form of a 3D object related to the selected content.

According to an embodiment, the electronic device may determine the shape of the third object based on the type of the object in the real space to which the first virtual object is mapped.

For example, in the case where the selected content is content of a calendar application, when the object in the real space to which the first virtual object is mapped is a desk, the electronic device may display the third virtual object in the form of a desk calendar. When the object in the real space is a wall, the electronic device may display the third virtual object in the form of a wall-mounted calendar. According to an embodiment, aside from the form of a calendar, the third virtual object may be in the form of a clock, an emoji, a memo paper, or a note.

According to an embodiment, upon receipt of a user input for moving the displayed third virtual object, the electronic device may analyze an object in the real space, on which the third object is newly placed, and change the third object to a fourth object based on the object in the real space. For example, as the object in the real space to which the first virtual object is mapped is a desk, the third virtual object in the form of a desk calendar may be displayed. Then, upon receipt of a user input for moving the third virtual object to a wall, the electronic device may display the fourth object in the form of a wall-mounted calendar to which the third virtual object in the form of the desk calendar is changed, at a newly set position.

According to an embodiment, the operation of determining the shape of the third object according to the type of the object in the real space to which the first virtual object is mapped will be described below with reference to FIGS. 9C and 9D.

According to an embodiment, the third virtual object may further include content information displayed around the shape of the 3D virtual object.

According to an embodiment, the third virtual object further including content information displayed around the shape of the 3D virtual object will be described below with reference to FIG. 11.

According to an embodiment, the third virtual object and the first virtual object may be in the same shape. For example, when the first virtual object is a 3D virtual object, the shape of the third object may be the same as that of the first virtual object. According to an embodiment, even when the first virtual object is a 3D virtual object, the first virtual object and the third virtual object may be different in shape, depending on the type of the object in the real space to which the first virtual object is mapped. For example, when the first virtual object in the form of a desk calendar is mapped to a wall in the real space, the shape of the third virtual object may be changed to a wall-mounted calendar.

According to an embodiment, when a third user input for selecting the second virtual object or third virtual object mapped to the real space, the electronic device may display an execution screen of an application related to the selected content around the second virtual object or the third virtual object.

According to an embodiment, an operation of displaying an execution screen of an application, upon selection of the second virtual object or the third virtual object will be described below with reference to FIGS. 12A and 12B.

According to an embodiment, the electronic device may detect the user's gaze through at least one second sensor (e.g., the sensor module 176 of FIG. 1 or the first camera module 251 of FIG. 3). Based on the detected user's gaze toward the object in the real space to which the virtual object is mapped, the electronic device may display the second virtual object or the third virtual object on the display.

According to an embodiment, the electronic device may delete part of the second virtual object or part of the third virtual object, based on the detected user's gaze not being directed toward the object in the real space to which the virtual object is mapped.

For example, in the case where the second virtual object includes content information displayed around the object in real space, or the third virtual object includes content information displayed around the shape of the 3D virtual object, when the user's gaze is not directed toward to the object in the real space to which the virtual object is mapped, the electronic device may delete the content information displayed around the object in real space or the content information displayed around the shape of the 3D virtual object.

According to an embodiment, upon occurrence of an event related to the selected content, the electronic device may update the second virtual object or the third virtual object based on information about the event. For example, the event related to the selected content may be generated by the electronic device or an external electronic device (e.g., the electronic device 104 of FIG. 1).

According to an embodiment, the electronic device may change the shape of the second virtual object or the third virtual object based on the information about the generated event. An operation of changing the shape of the second virtual object or the third virtual object according to an embodiment will be described below with reference to FIG. 18C.

According to an embodiment, upon occurrence of an event related to the selected content in the external electronic device, the electronic device may update the second virtual object or the third virtual object based on information about the event received from the external electronic device.

According to an embodiment, an operation in the case of occurrence of the event related to the selected content in the external electronic device will be described below with reference to FIG. 26.

According to an embodiment, upon identification of occurrence of an event related to the second virtual object or the third virtual object through the camera, the electronic device may identify whether the electronic device has been coupled to the external electronic device (e.g., the communication module 190 of FIG. 1, including communication circuitry) through the communication module (e.g., the communication module 190 of FIG. 1, including communication circuitry). Based on identification that the electronic device has been coupled to the external electronic device, the electronic device may transmit information about the event to the external electronic device through the communication module.

According to an embodiment, an operation in the case of occurrence of an event related to selected content in an electronic device will be described below with reference to FIG. 27.

According to an embodiment, the operation of mapping a virtual object to a real object may be applied to each application implementable in the electronic device. For example, an operation applied to a calendar application will be described below with reference to FIGS. 7 to 14, an operation applied to an alarm application will be described below with reference to FIGS. 15 to 18C, an operation applied to a memo application will be described below with reference to FIGS. 19A to 19D, an operation applied to a contact application will be described below with reference to FIGS. 20A to 21C, an operation applied to a message application will be described below with reference to FIGS. 22A to 23F, an operation applied to a weather application will be described below with reference to FIGS. 24A, 24B and 24C, and an operation applied to a photo application will be described below with reference to FIGS. 25A to 25D.

Figure 7:
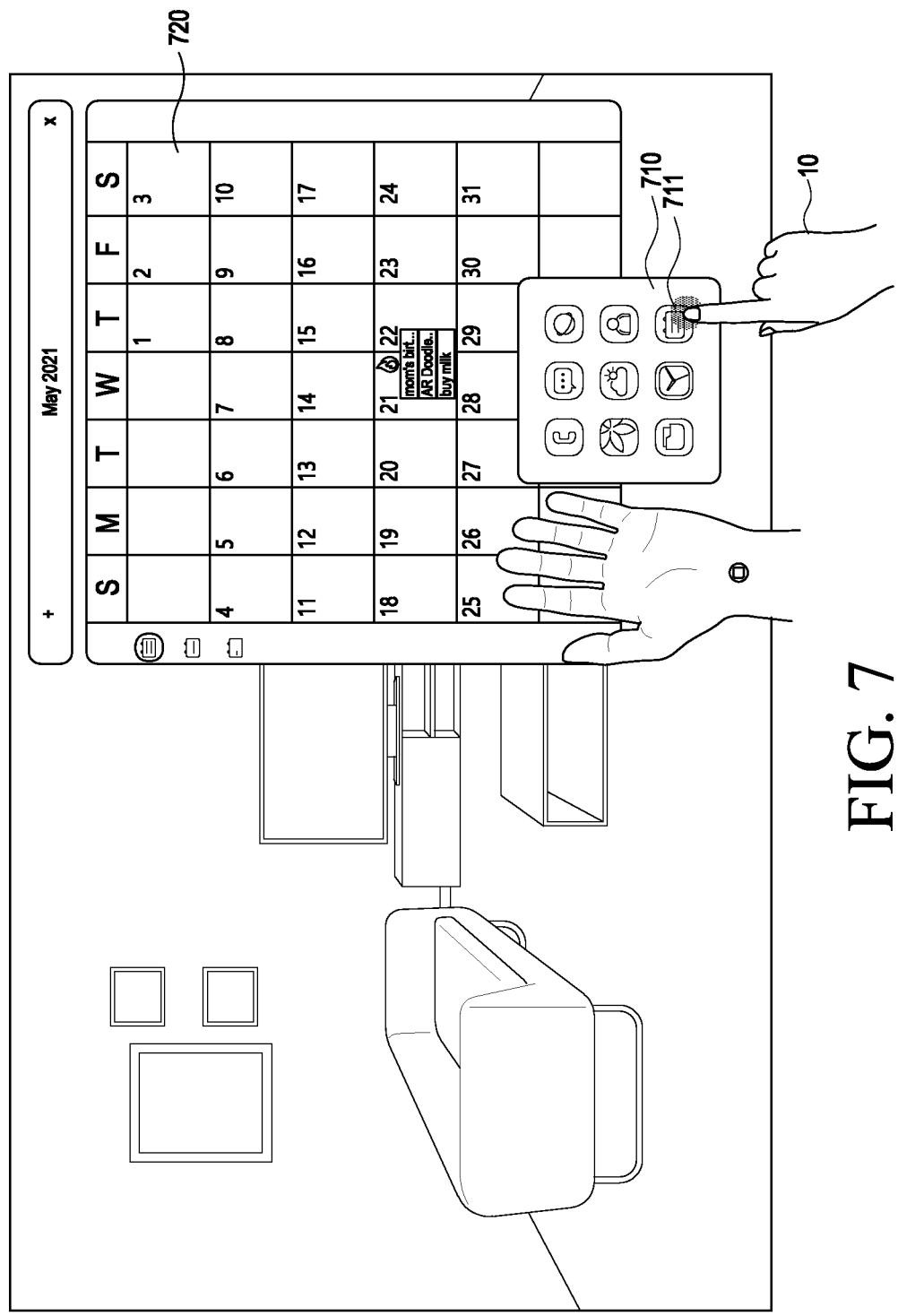
FIG. 7 is a diagram illustrating an operation of displaying an execution screen in a wearable electronic device according to an example embodiment.

FIG. 7 is a diagram illustrating an operation of displaying an execution screen in an electronic device according to an embodiment.

According to an embodiment, referring to FIG. 7, an electronic device (e.g., the electronic device 101 of FIG. 1, the processor 120 of FIG. 1, or the electronic device 200 of FIG. 2) may display an application list 710 including a plurality of application icons on a display (e.g., the display module 160 of FIG. 1 or the display member 201 of FIG. 2). Each "processor" herein includes processing circuitry.

According to an embodiment, upon receipt of a user input for selecting one icon 711 from the application list 710, the electronic device may display an execution screen 720 of an application corresponding to the selected icon 711 on the display. For example, upon receipt of a hand gesture of a user 10 for selecting the icon 711 from the application list 710 through a camera (e.g., the camera module 180 of FIG. 1 or the third camera module 255 of FIG. 3), the electronic device may display the execution screen 720 of the application on the display (e.g., the display module 160 of FIG. 1 or the display member 201 of FIG. 2).

For example, upon receipt of a user input for selecting the icon 711 representing a calendar application from the application list 710 from the user 10, the electronic device may display the execution screen 720 of the calendar application on the display.

Figure 8:
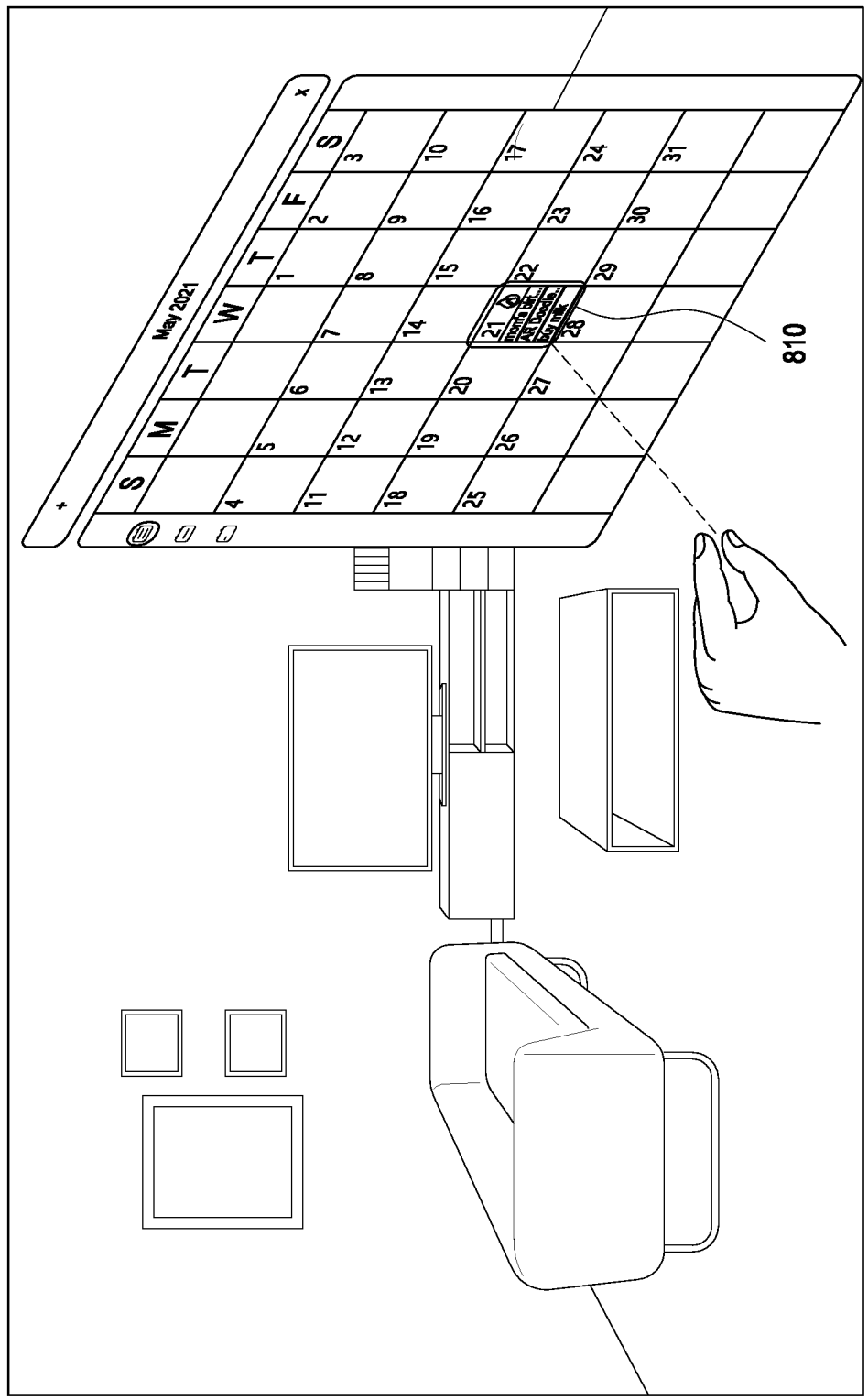
FIG. 8 is a diagram illustrating a content selection operation in a wearable electronic device according to an example embodiment.

FIG. 8 is a diagram illustrating a content selection operation in an electronic device according to an embodiment.

According to an embodiment, referring to FIG. 8, an electronic device (e.g., the electronic device 101 of FIG. 1, the processor 120 of FIG. 1, or the electronic device 200 of FIG. 2) may receive a user input for selecting one content 810 from among a plurality of contents included in an execution screen of an application displayed on a display (e.g., the display module 160 of FIG. 1 or the display member 201 of FIG. 2).

For example, the user input for selecting one content may be a gesture input such as a pinch action by which the user picks up the content with a thumb and an index finger, or a touch action that presses the content. For example, the electronic device may receive a gesture input such as a pinch action or a touch action for selecting a content such as specific date 810 on the execution screen of the calendar application. According to an embodiment, the gesture input is not limited to a pinch action or a touch action.

According to an embodiment, upon receipt of the gesture input for selecting the content 810 from among the plurality of contents included in the execution screen of the application, the electronic device may display a virtual object related to the selected content 810 on the display.

According to an embodiment, the virtual object displayed according to the content selection may be in the form of a panel or a 3D virtual object. According to an embodiment, the shape of the virtual object displayed according to the content selection may be set during manufacture or by a user manipulation.

According to an embodiment, an embodiment of displaying a panel-shaped virtual object according to content selection will be described below with reference to FIG. 9A.

According to an embodiment, an embodiment of displaying a virtual object shaped into a 3D virtual object according to content selection will be described below with reference to FIG. 9B.

Figure 9A:
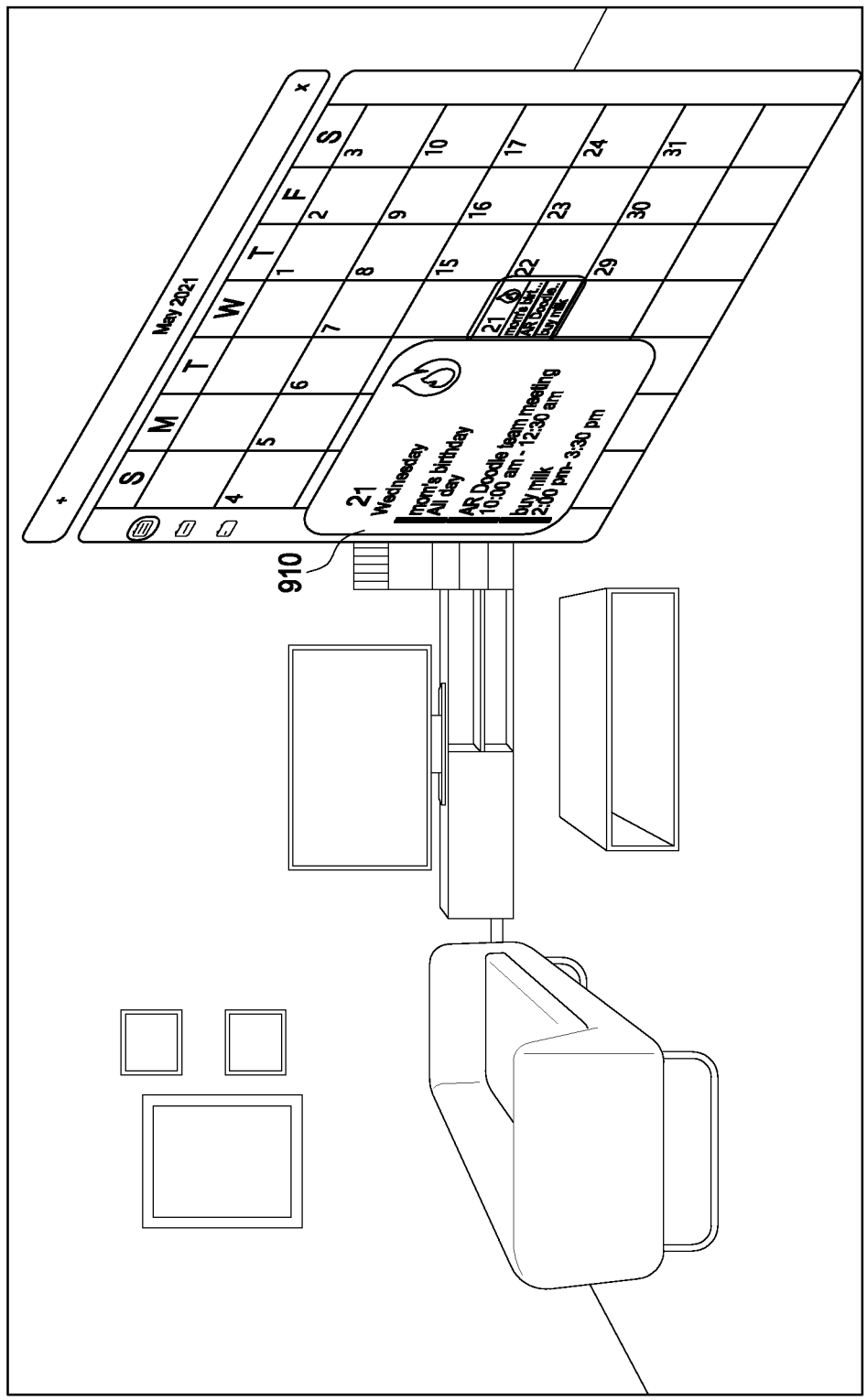
FIG. 9A is a diagram illustrating an operation of displaying a virtual object based on a content selection operation according to an example embodiment.

FIG. 9A is a diagram illustrating an operation of displaying a virtual object based on content selection according to an embodiment.

According to an embodiment, referring to FIG. 9A, upon receipt of a user input for selecting one of a plurality of contents included in an execution screen of an application displayed on a display (e.g., the display module 160 of FIG. 1 or the display member 201 of FIG. 2), an electronic device (e.g., the electronic device 101 of FIG. 1, the processor 120 of FIG. 1, or the electronic device 200 of FIG. 2) may display a virtual object 910 in the form of a panel distinguished from the execution screen of the application. For example, the electronic device may display the virtual object 910 in the form of a pop-up or floating panel on the execution screen of the application.

For example, when the virtual object displayed according to the content selection is in the form of a panel, the virtual object may be shaped into a closed curve (e.g., a figure such as a square, a circle, a rounded square, or an oval).

According to an embodiment, the electronic device may display selected content information inside the closed curve-shaped virtual object. For example, upon receipt of a user input for selecting a specific date in the calendar application, the electronic device may display schedule information, which is content information of the specific date, inside the panel-shaped virtual object.

Figure 9B:
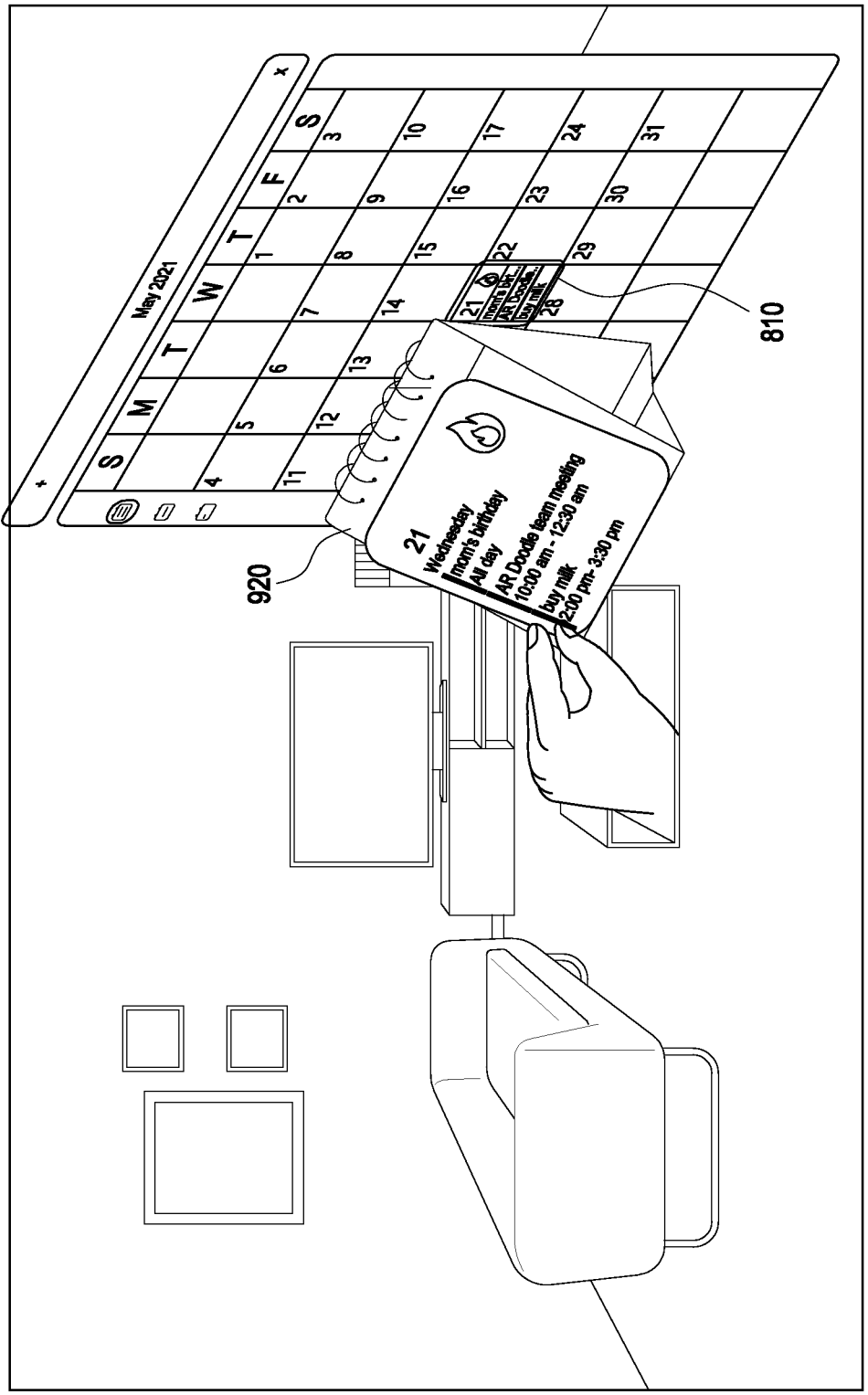
FIG. 9B is a diagram illustrating an operation of displaying a virtual object based on a content selection operation according to an example embodiment.

FIG. 9B is a diagram illustrating an operation of displaying a virtual object based on content selection according to an embodiment.

According to an embodiment, referring to FIG. 9B, upon receipt of a user input for selecting one of a plurality of contents included in an execution screen of an application displayed on a display (e.g., the display module 160 of FIG. 1 or the display member 201 of FIG. 2), an electronic device (e.g., the electronic device 101 of FIG. 1, the processor 120 of FIG. 1, or the electronic device 200 of FIG. 2) may display a virtual object 920 in the form of a 3D virtual object distinguished from the execution screen of the application. For example, the electronic device may display the virtual object 920 in the form of a pop-up or floating 3D virtual object on the execution screen of the application.

For example, when the virtual object displayed according to content selection is in the form of a 3D virtual object, the shape of the 3D virtual object may be determined based on the type of the application. For example, when the execution screen is for a calendar application, the virtual object may be shaped into a desk calendar. When the execution screen is for an alarm application, the virtual object may be shaped into a desk clock. According to an embodiment, the shape of a 3D virtual object may be mapped to each application and stored in memory (e.g., the memory 130 of FIG. 1).

While it has been described above that a virtual object is displayed in the form of a panel as illustrated in FIG. 9A or in the form of a 3D virtual object as illustrated in FIG. 9B according to content selection, when a gesture of making a pinch action and moving the pinch is received after the panel-shaped virtual object illustrated in FIG. 9A is displayed, the panel-shaped virtual object may be changed to the virtual object in the form of the 3D virtual object illustrated in FIG. 9B.

Figure 9C:
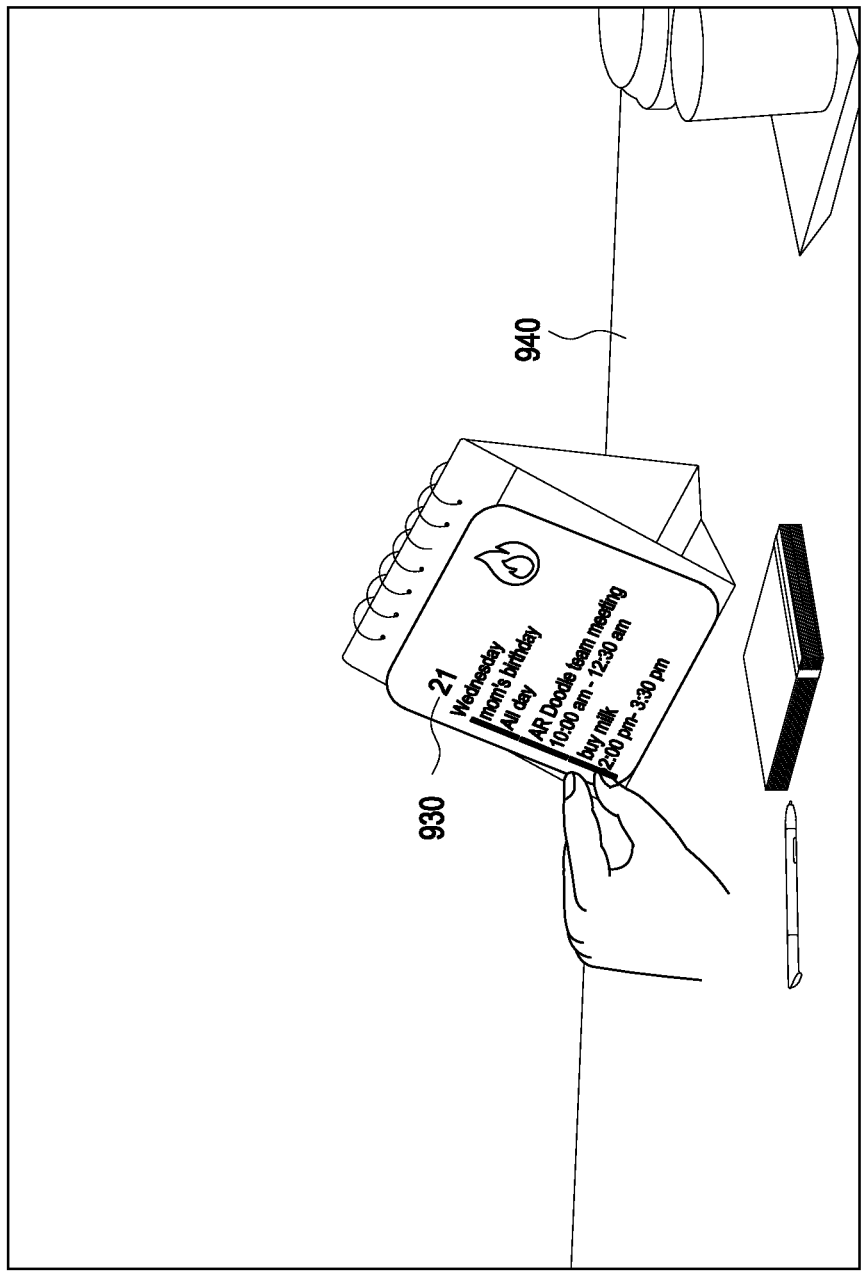
FIG. 9C is a diagram illustrating an operation of mapping a three-dimensional (3D) virtual object to a real space unrelated to content according to an example embodiment.

FIG. 9C is a diagram illustrating an operation of mapping a 3D virtual object to a real space which is not related to content according to an embodiment.

According to an embodiment, referring to FIG. 9C, when an electronic device (e.g., the electronic device 101 of FIG. 1, the processor 120 of FIG. 1, or the electronic device 200 of FIG. 2) maps a virtual object 930 in the form of a 3D virtual object to an object 940 unrelated to content in a real space, the shape of the virtual object 930 may be determined based on the type of the object 940 in the real space.

For example, when the object 940 in the real space is a desk, the electronic device may display the virtual object 930 as a 3D virtual object in the form of a desk calendar. For example, the virtual object 930 may be a 3D virtual object in the form of a desk calendar including a panel form with content information.

While the virtual object 930 is shown as a 3D virtual object in FIG. 9C, when a panel-shaped virtual object is moved and mapped to an object in a real space, the shape of the virtual object may be changed to a 3D virtual object based on the type of selected content and the type of the object in the real space.

Figure 9D:
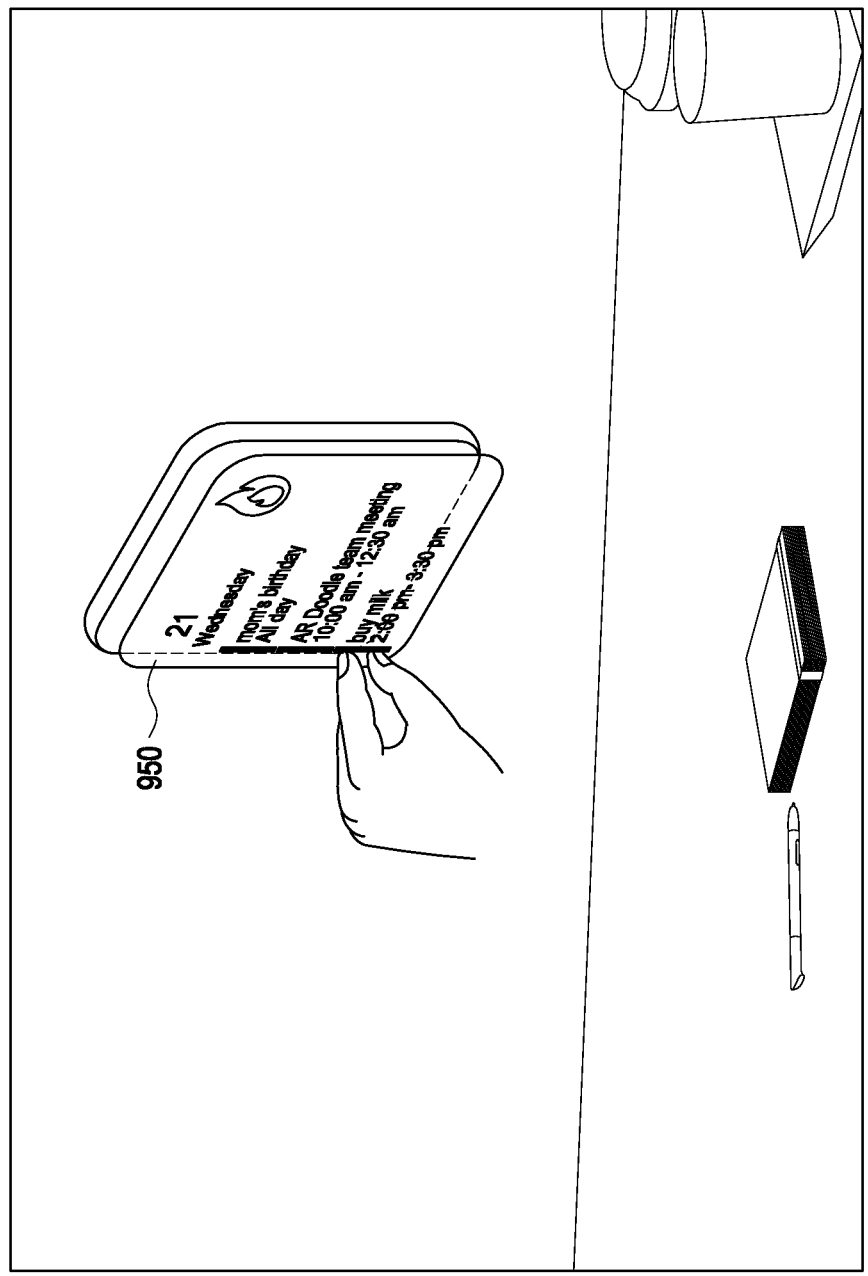
FIG. 9D is a diagram illustrating an operation of mapping a 3D virtual object to a real space unrelated to content according to an example embodiment.

FIG. 9D is a diagram illustrating an operation of mapping a 3D virtual object to a real space which is not related to content according to an embodiment.

According to an embodiment, referring to FIG. 9D, when an object in a real space is a wall, an electronic device (e.g., the electronic device 101 of FIG. 1, the processor 120 of FIG. 1, or the electronic device 200 of FIG. 2) may display a virtual object 950 as a 3D virtual object in the form of a wall-mounted calendar. For example, the virtual object 950 may be a 3D virtual object in the form of a wall-mounted calendar including a panel form with content information.

While it has been described and illustrated in FIGS. 9A to 9D that a virtual object is mapped to an object in a real space through a gesture input of a user, the electronic device may map a virtual object to an object in a real space through a voice input and/or eye tracking of the user, which will be described below with reference to FIGS. 10A to 10G.

Figure 10A:
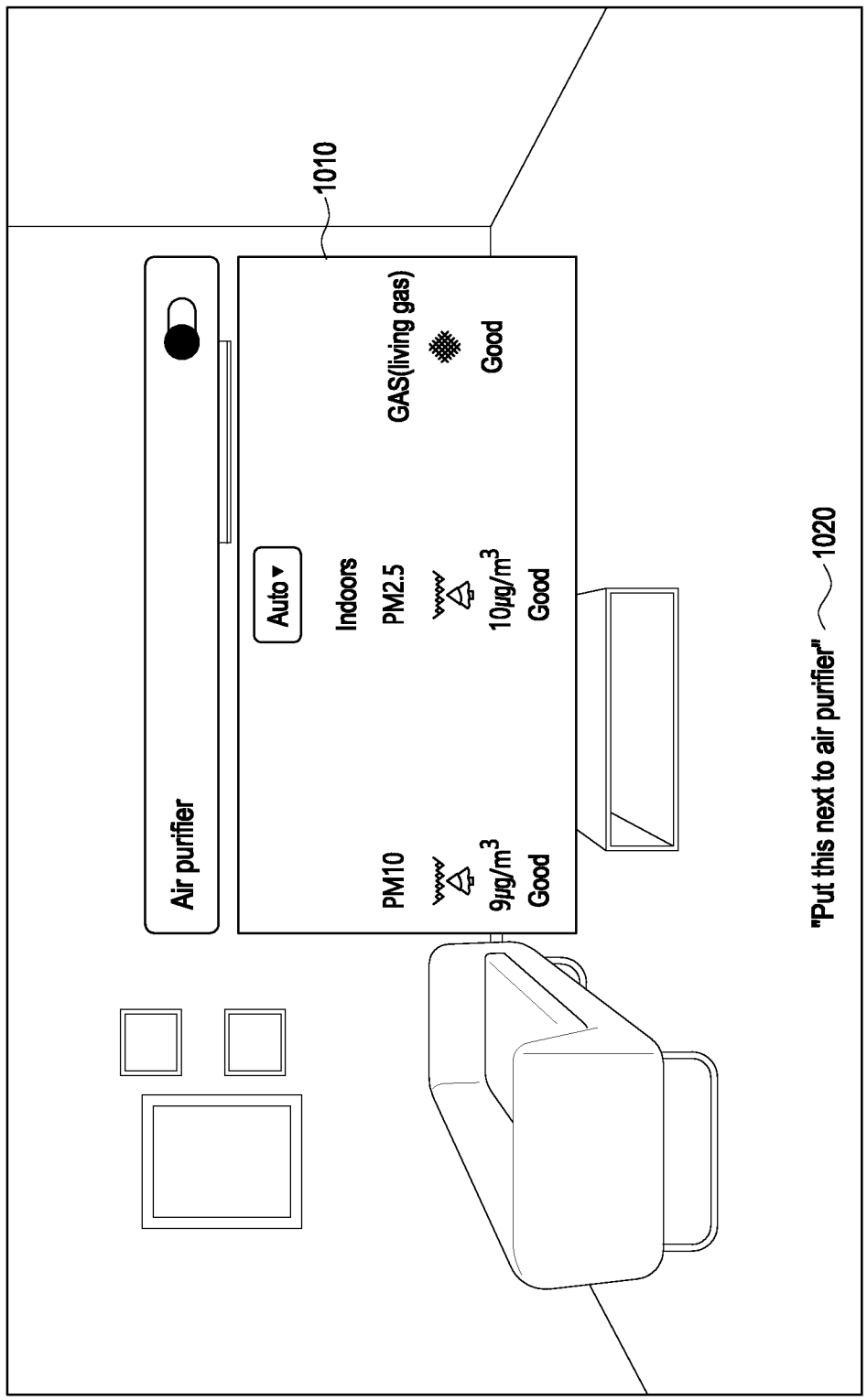
FIG. 10A is a diagram illustrating an operation of mapping a virtual object to a real space according to an example embodiment.
Figure 10B:
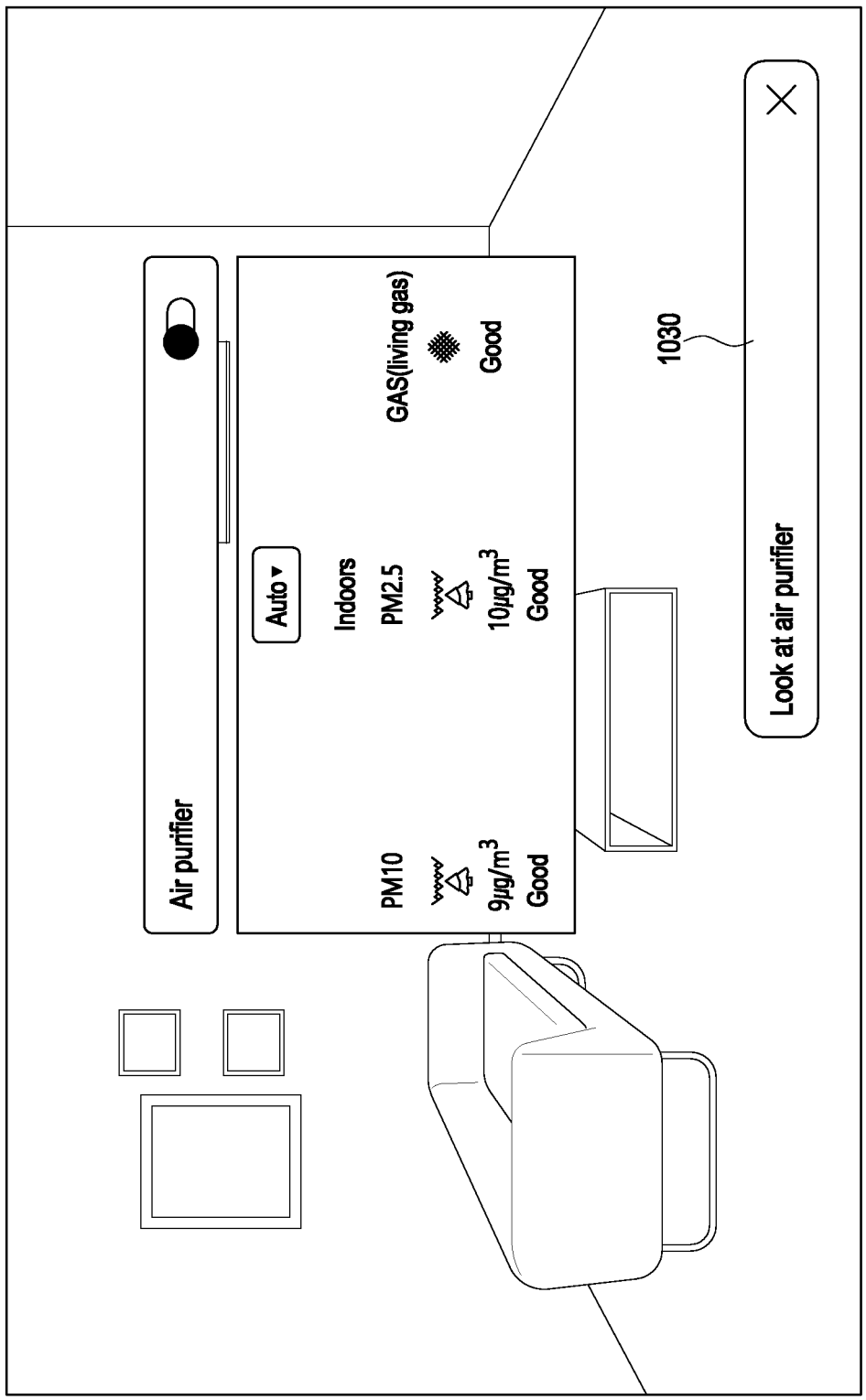
FIG. 10B is a diagram illustrating an operation of mapping a virtual object to a real space according to an example embodiment.
Figure 10C:
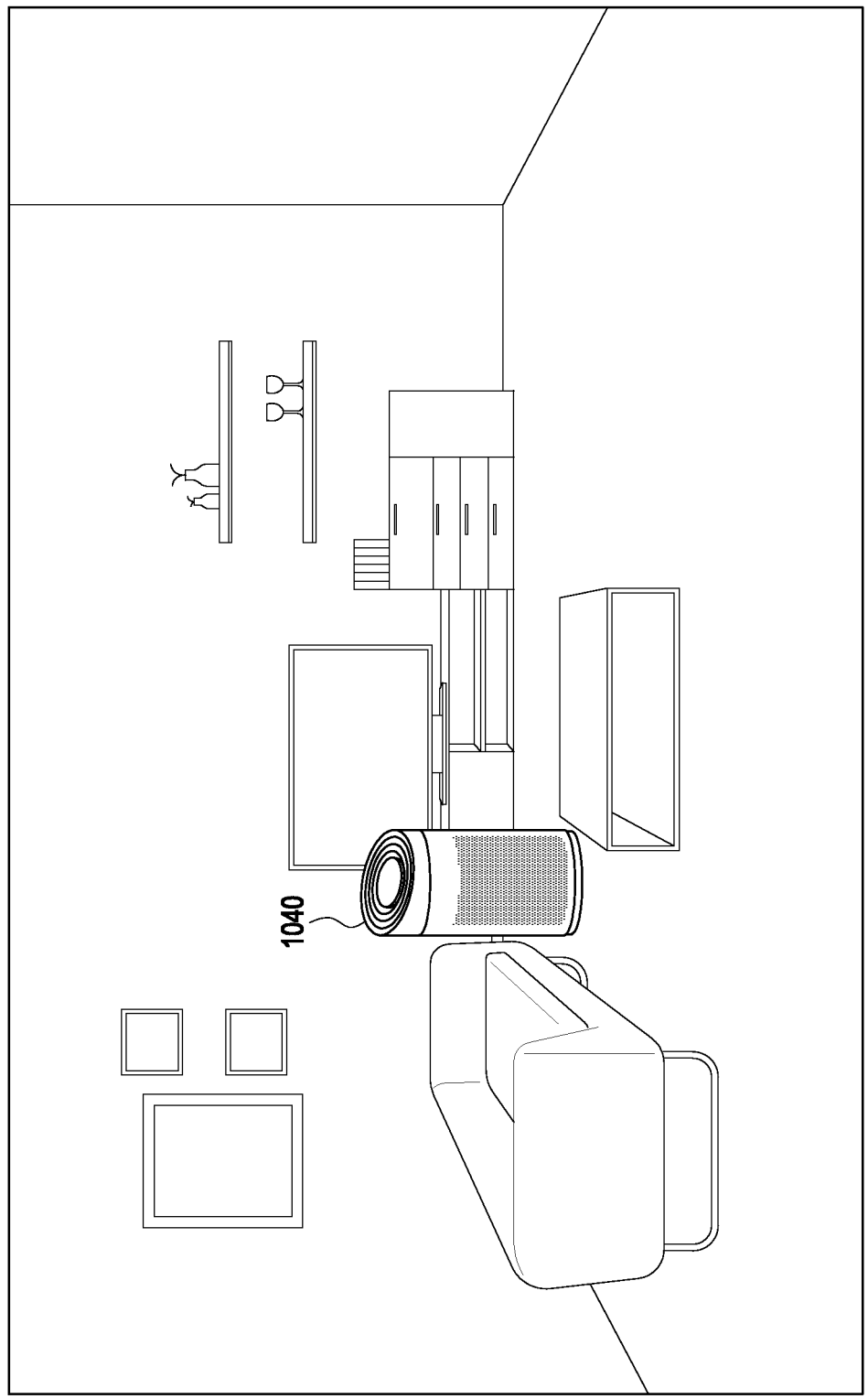
FIG. 10C is a diagram illustrating an operation of mapping a virtual object to a real space according to an example embodiment.
Figure 10D:
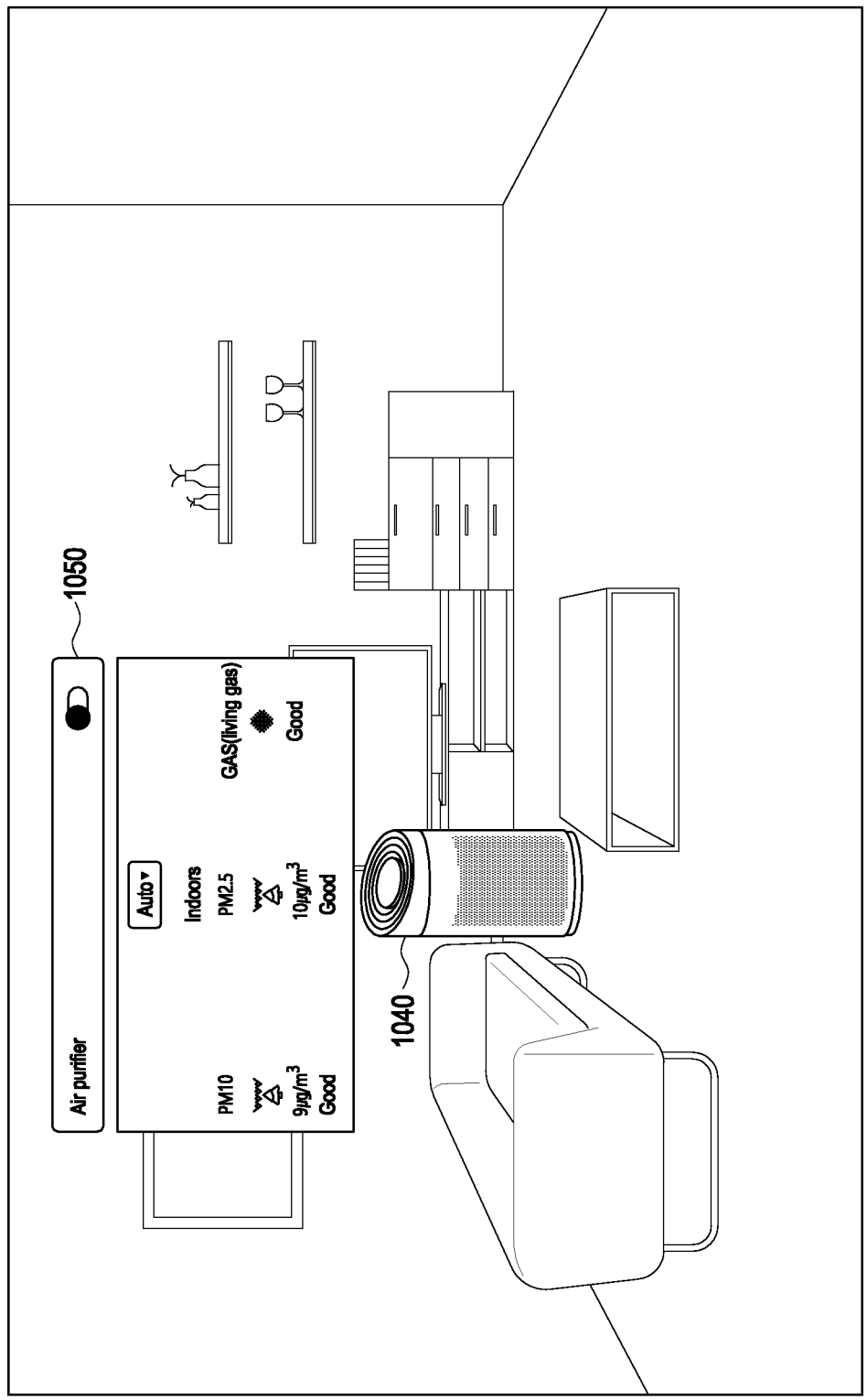
FIG. 10D is a diagram illustrating an operation of mapping a virtual object to a real space according to an example embodiment.
Figure 10E:
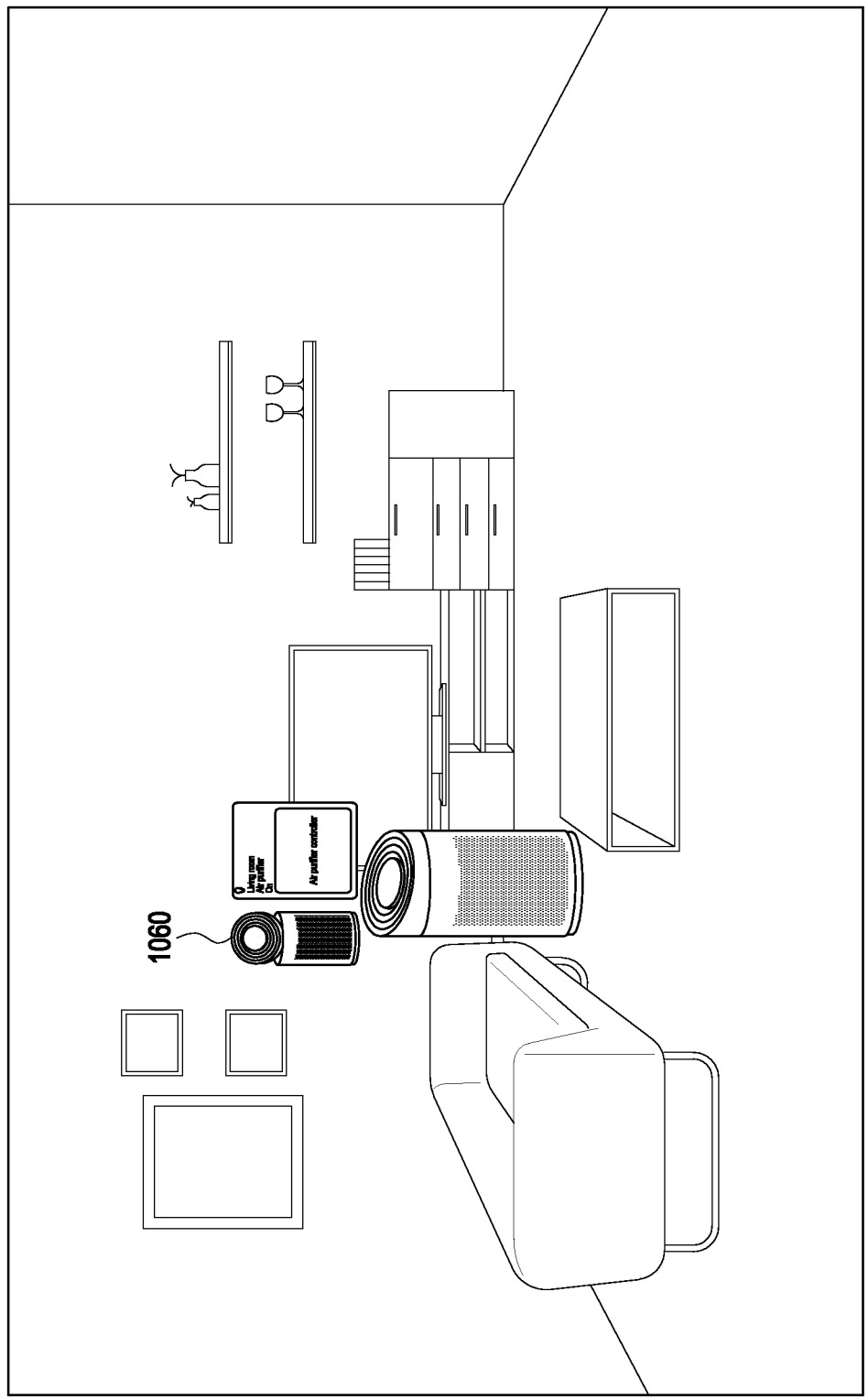
FIG. 10E is a diagram illustrating an operation of mapping a virtual object to a real space, according to an example embodiment.
Figure 10F:
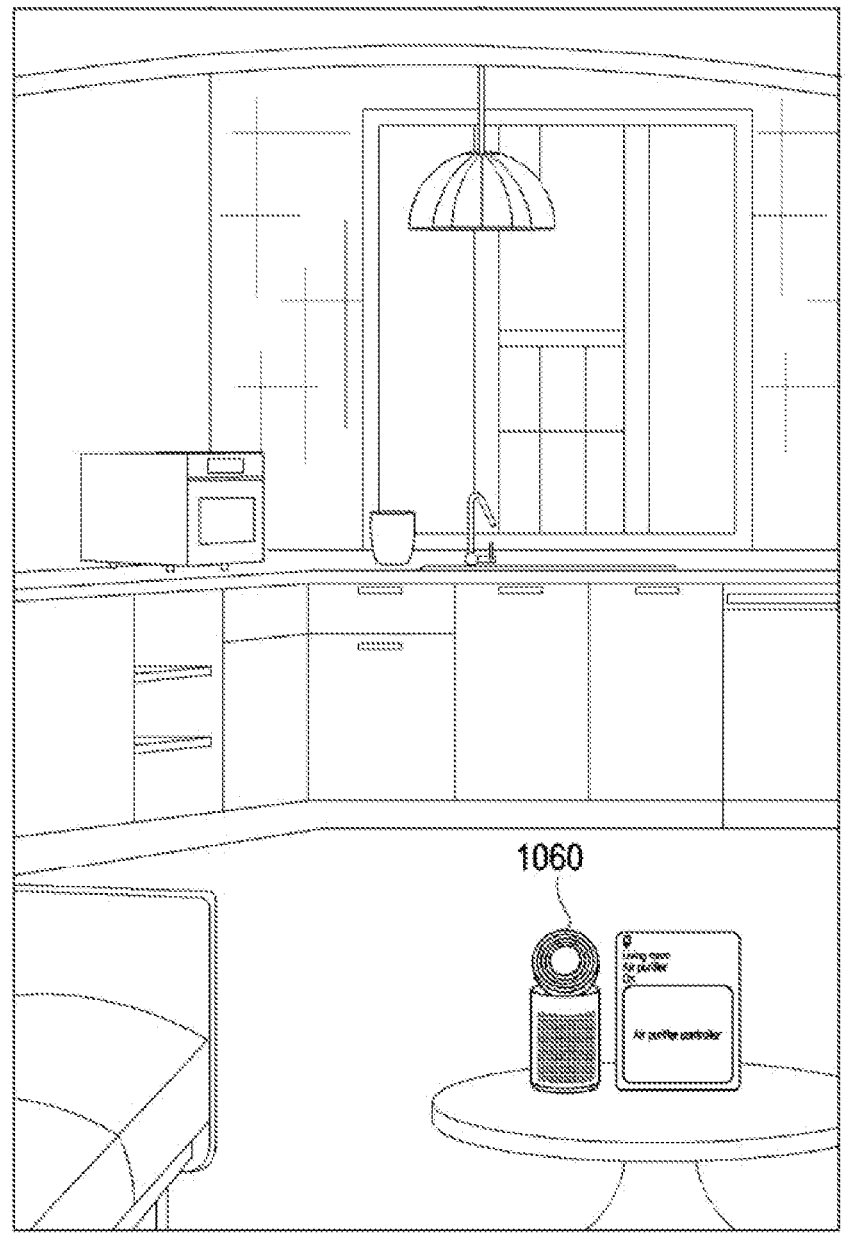
FIG. 10F is a diagram illustrating an operation of mapping a virtual object to a real space, according to an example embodiment.
Figure 10G:
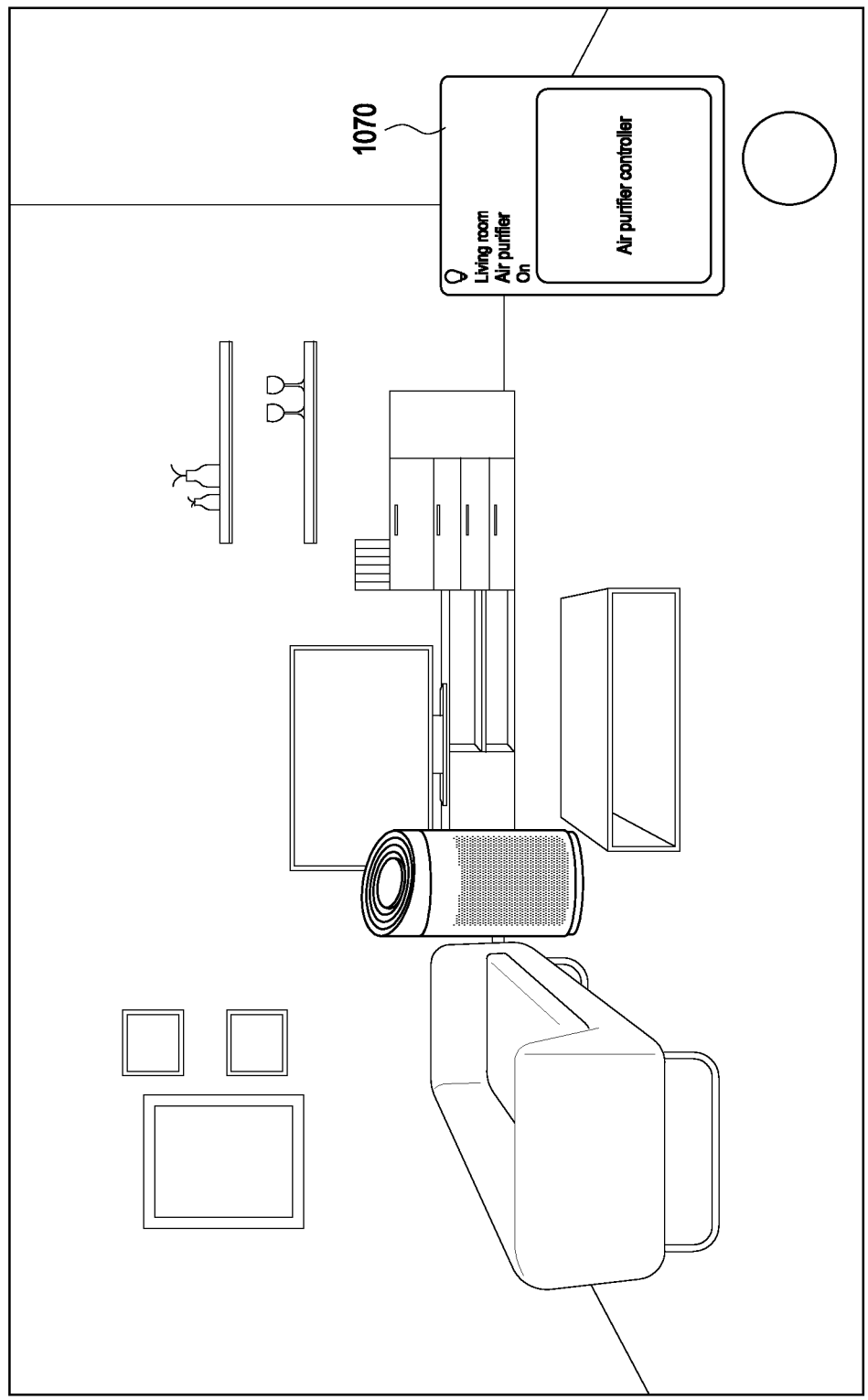
FIG. 10G is a diagram illustrating an operation of mapping a virtual object to a real space, according to an example embodiment.

FIG. 10A is a diagram illustrating an operation of mapping a virtual object to a real space according to an embodiment. FIG. 10B is a diagram illustrating an operation of mapping a virtual object to a real space according to an embodiment. FIG. 10C is a diagram illustrating an operation of mapping a virtual object to a real space according to an embodiment. FIG. 10D is a diagram illustrating an operation of mapping a virtual object to a real space according to an embodiment. FIG. 10E is a diagram illustrating an operation of mapping a virtual object to a real space according to an embodiment. FIG. 10F is a diagram illustrating an operation of mapping a virtual object to a real space according to an embodiment. FIG. 10G is a diagram illustrating an operation of mapping a virtual object to a real space according to an embodiment.

According to an embodiment, referring to FIG. 10A, with an execution screen 1010 of an application displayed on a display (e.g., the display module 160 of FIG. 1 or the display member 201 of FIG. 2), an electronic device (e.g., the electronic device 101 of FIG. 1, the processor 120 of FIG. 1, or the electronic device 200 of FIG. 2) may receive a user input for mapping a virtual object related to the execution screen 1010 of the application to a real object. For example, the electronic device may receive a voice input 1020 (e.g., put this next to air purifier) for mapping the virtual object related to the execution screen 1010 of the application for controlling a real object to a real object.

According to an embodiment, upon identification of the real object (e.g., an air purifier) to which the virtual object related to the execution screen 1010 of the application is to be mapped in an image of a real space received through a camera (e.g., the camera module 180 of FIG. 1), the electronic device may display a virtual object 1050 around a real object 1040, as illustrated in FIG. 10D.

According to an embodiment, when failing to identify the real object (e.g., the air purifier) to which the virtual object related to the execution screen 1010 of the application is to be mapped in the image of the real space received through the camera, the electronic device may display a message 1030 asking the user to gaze at the real object so that the real object may be recognized, as illustrated in FIG. 10B.

According to an embodiment, referring to FIG. 10C, the electronic device may obtain an image of the real space that the user gazes at through the camera, and recognize the real object 1040 (e.g., the air purifier) included in the real space by image analysis.

According to an embodiment, the electronic device may identify whether the real object 1040 recognized by image analysis matches stored real object information (e.g., product model information). According to an embodiment, the electronic device may identify whether the recognized real object 1040 matches the real object information stored in memory (e.g., the memory 130 of FIG. 1). Alternatively, the electronic device may transmit information about the recognized real object 1040 to a server (e.g., the server 108 of FIG. 1), and receive a result indicating whether the recognized real object 1040 matches stored real object information.

According to an embodiment, when the recognized real object 1040 matches the stored real object information, the electronic device may display the virtual object 1050 (e.g., an application execution screen or a widget screen) for controlling the real object 1040, around the real object 1040 as illustrated in FIG. 10D. According to an embodiment, a case in which the information about the recognized real object 1040 does not match the stored real object information will be described below with reference to FIG. 10G.

According to an embodiment, when the position of the real object 1040 is changed (e.g., a living room->a room), the electronic device may display the virtual object 1050 around the changed position of the real object 1040.

According to an embodiment, the virtual object displayed around the real object may further include a 3D virtual object 1060 related to the real object, as illustrated in FIG. 10E. For example, referring to FIG. 10E, the virtual object displayed around the air purifier may further include the 3D virtual object 1060 in the form of a 3D miniature of the real object.

According to an embodiment, the electronic device may control the real object by calling a virtual object related to the real object in a space different from that in which the real object is located. For example, as illustrated in FIG. 10F, as the 3D virtual object 1060 in the form of a 3D miniature of the real object is included in the virtual object displayed in another space where the real object is not located, information about the real object controlled by the user may be provided intuitively.

According to an embodiment, when the recognized real object 1040 does not match the stored real object information (e.g., product model information), a virtual object 1070 (e.g., an application execution screen or a widget screen) may be displayed in an area of a display (e.g., the display module 160 of FIG. 1), which is not related to the position of the real object, as illustrated in FIG. 10G. For example, when information about an air purifier recognized through the camera does not match information about an air purifier stored in the memory of the electronic device or in the server, the electronic device may display the virtual object 1070 in an area of the display, which is not related to the position of the air purifier recognized through the camera, considering that the electronic device controls an air purifier which is not included in a field of view, not the air purifier recognized through the camera.

Figure 11:
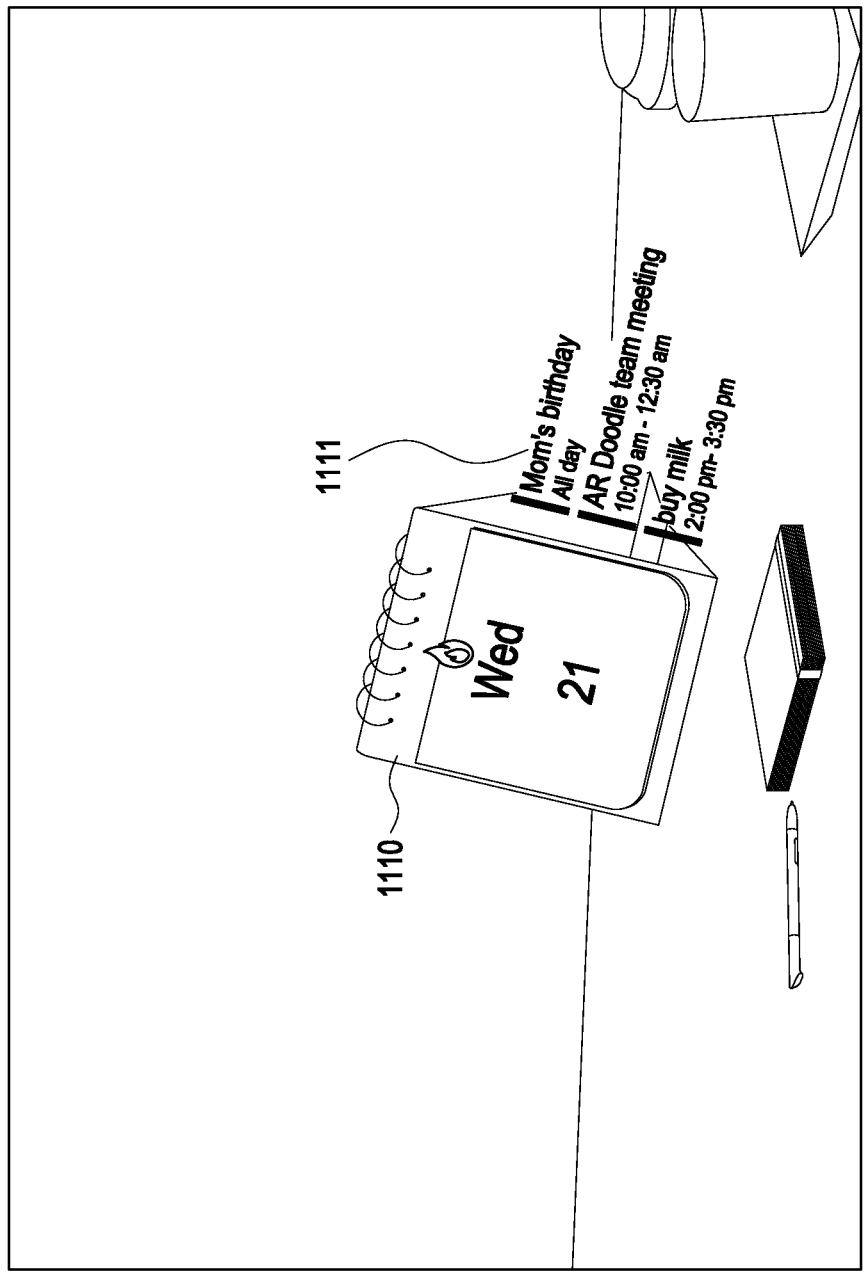
FIG. 11 is a diagram illustrating a 3D virtual object mapped to a real space according to an example embodiment.

FIG. 11 is a diagram illustrating a 3D virtual object mapped to a real space according to an embodiment.

According to an embodiment, referring to FIG. 11, upon receipt of a user input for mapping a virtual object 1110 in the form of a 3D virtual object to an object unrelated to content in a real space and releasing the virtual object 1110, an electronic device (e.g., the electronic device 101 of FIG. 1, the processor 120 of FIG. 1, or the electronic device 200 of FIG. 2) may fix the virtual object 1110 in the form of a 3D virtual object to the object in the real space, and display selected content information 1111 in part of the shape of the 3D virtual object or around the shape of the 3D virtual object.

According to an embodiment, the electronic device may display summary information about selected content on the shape of the 3D virtual object, and display the detailed information 1111 about the selected content around the shape of the 3D virtual object.

For example, the electronic device may fix the object 1110 in the form of a desk calendar on a desk, display information about a date selected on an execution screen of a calendar application on the shape of the desk calendar, and display the schedule information 1111 related to the selected date around the shape of the desk calendar.

According to an embodiment, the electronic device may detect the user's gaze through at least one second sensor (e.g., the sensor module 176 of FIG. 1 or the first camera module 251 of FIG. 3), and display the detailed information 1111 on the virtual object 1110, based on the detected user's gaze being directed toward the object in the real space, to which the virtual object 1110 is mapped.

According to an embodiment, the electronic device may delete the detailed information 1111 from the virtual object 1110 based on the detected user's gaze not being directed toward the object in the real space, to which the virtual object 1110 is mapped.

Figure 12A:
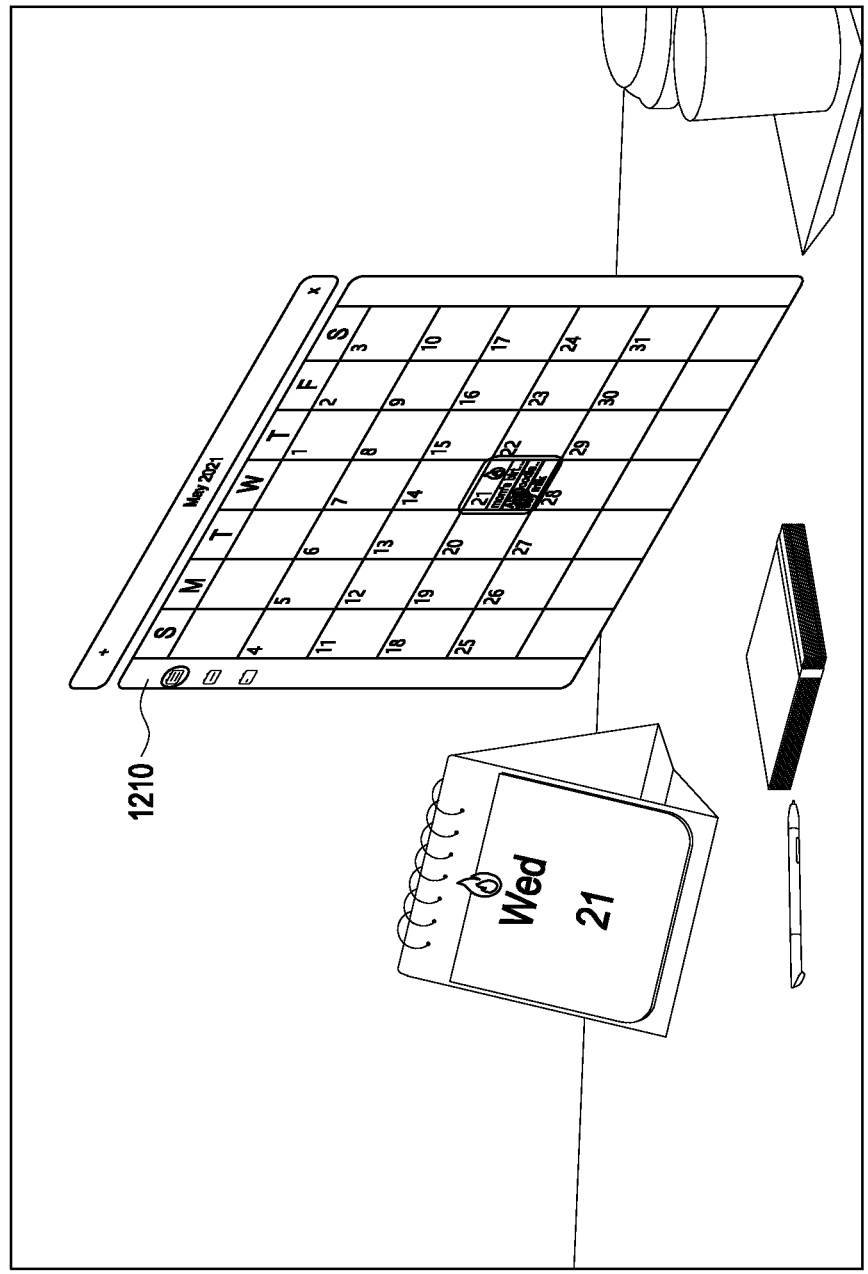
FIG. 12A is a diagram illustrating an operation when a 3D virtual object is selected according to an example embodiment.

FIG. 12A is a diagram illustrating an operation when a 3D virtual object is selected according to an embodiment.

According to an embodiment, referring to FIG. 12A, upon receipt of a user input for selecting a virtual object mapped to a real space, an electronic device (e.g., the electronic device 101 of FIG. 1, the processor 120 of FIG. 1, or the electronic device 200 of FIG. 2) may display an execution screen 1210 of an application related to selected content around the virtual object.

Figure 12B:
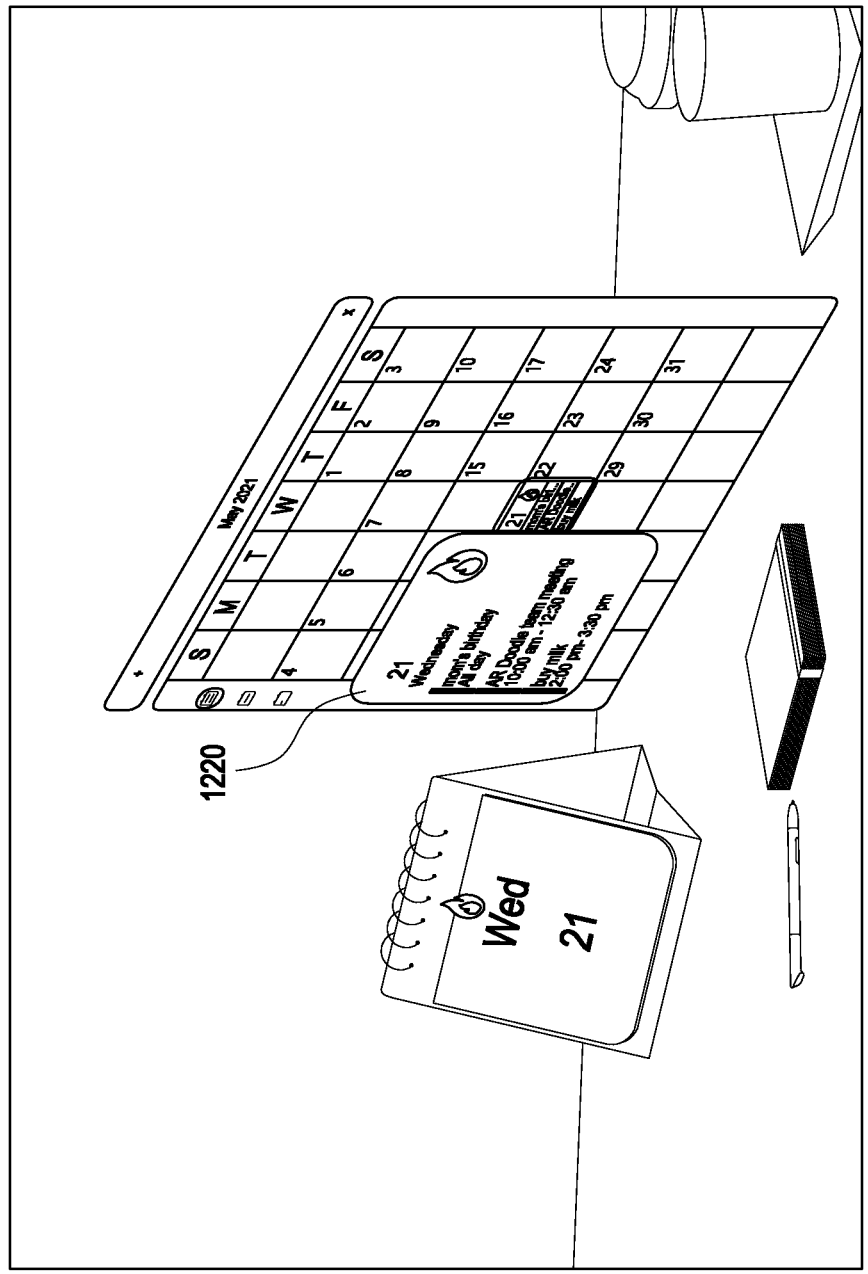
FIG. 12B is a diagram illustrating an operation when a 3D virtual object is selected according to an example embodiment.

FIG. 12B is a diagram illustrating an operation when a 3D virtual object is selected according to an embodiment.

According to an embodiment, referring to FIG. 12B, upon receipt of a user input for selecting a virtual object mapped to a real space, an electronic device (e.g., the electronic device 101 of FIG. 1, the processor 120 of FIG. 1, or the electronic device 200 of FIG. 2) may display an execution screen of an application, including detailed information 1220 related to selected content, around the virtual object.

While it has been described and illustrated above that an application execution screen or an application execution screen including detailed information is displayed according to selection of a virtual object, an embodiment may be implemented such that detailed information is further displayed a predetermined time after an application execution screen is displayed according to selection of a virtual object.

Figure 13A:
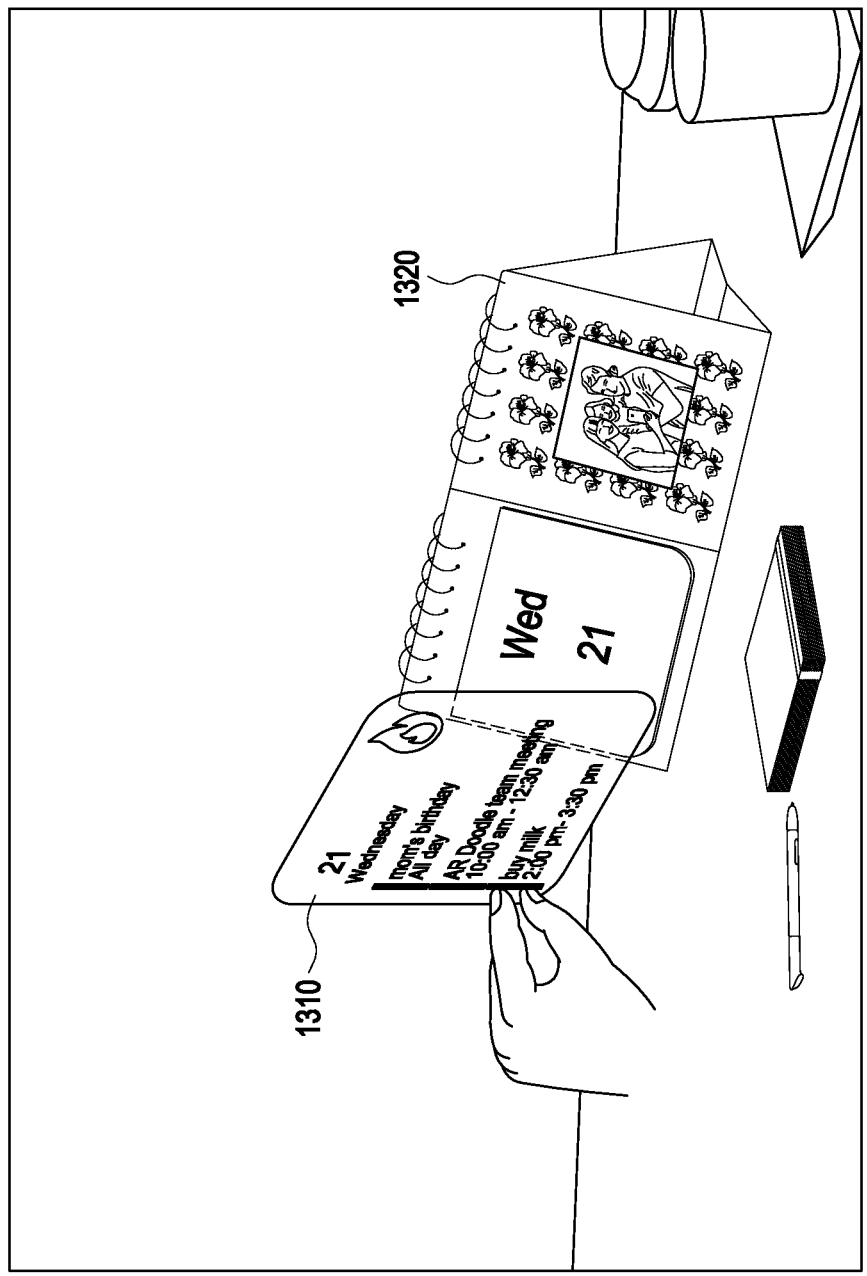
FIG. 13A is a diagram illustrating an operation of mapping a virtual object to a real space related to content according to an example embodiment.

FIG. 13A is a diagram illustrating an operation of mapping a virtual object to a real space related to content according to an embodiment.

According to an embodiment, referring to FIG. 13A, when an electronic device (e.g., the electronic device 101 of FIG. 1, the processor 120 of FIG. 1, or the electronic device 200 of FIG. 2) maps a virtual object 1310 in the form of a panel to an object 1320 related to content in a real space, the electronic device may determine the shape of the virtual object based on the type of the object 1320 (e.g., calendar in FIG. 13A) in the real space.

For example, when the electronic device moves and maps the panel-shaped virtual object 1310 displayed according to content selection to the calendar 1320 in the real space, the electronic device may display a virtual object including content information displayed in part of the calendar 1320 or displayed around the calendar 1320.

According to an embodiment, the electronic device may display a virtual object related to selected content on the display based on at least one of the shape, position, or size of the calendar 1320.

According to an embodiment, an operation of displaying a virtual object based on at least one of the shape, position, or size of an object in a real space will be described below with reference to FIG. 14.

Although the virtual object 1310 is shown in the form of a panel in FIG. 13A, when a virtual object in the form of a 3D virtual object is moved and mapped to an object in a real space, the virtual object may be changed to the form of a panel based on the type of the object in the real space according to an embodiment.

Figure 13B:
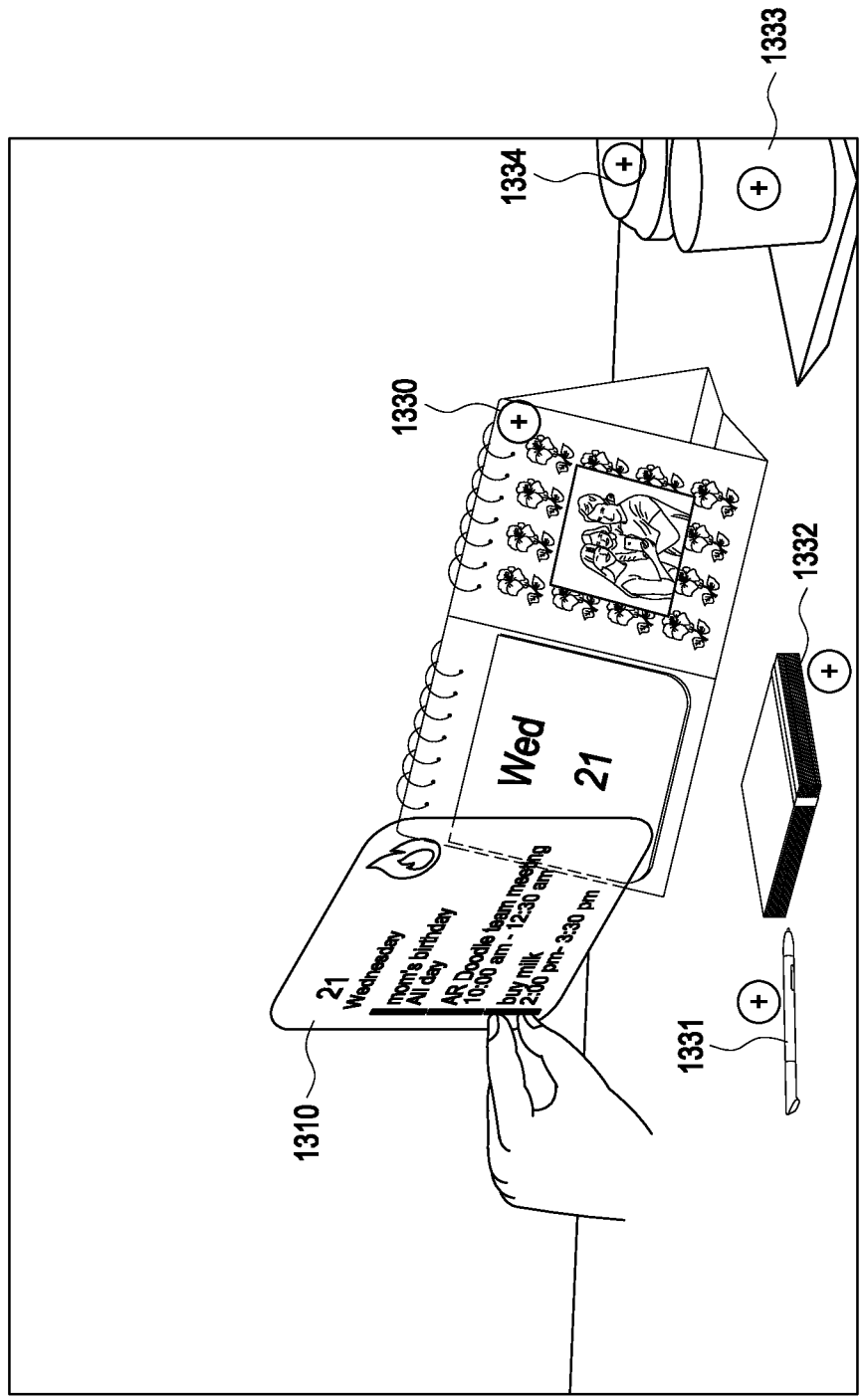
FIG. 13B is a diagram illustrating an operation of mapping a virtual object to a real space according to an example embodiment.

FIG. 13B is a diagram illustrating an operation of mapping a virtual object to a real space, according to an embodiment.

According to an embodiment, referring to FIG. 13B, when the panel-shaped virtual object 1310 displayed according to content selection is moved, an electronic device (e.g., the electronic device 101 of FIG. 1, the processor 120 of FIG. 1, or the electronic device 200 of FIG. 2) may identify the existence of a plurality of objects located in the real space through at least one sensor (e.g., the sensor module 176 of FIG. 1 (e.g., DoF or a Lidar)) and display a plurality of icons 1330, 1331, 1332, 1333, and 1334 indicating that the virtual object 1310 is mappable, respectively on the plurality of objects in the real space.

According to an embodiment, upon receipt of a user input for mapping the virtual object 1310 to one of the plurality of icons 1330, 1331, 1332, 1333, and 1334, the electronic device may change the shape of the virtual object 1310 based on at least one of the shape, position, or size of an object corresponding to the icon, and display the changed virtual object in at least one of part or the vicinity of the object corresponding to the icon. For example, at least some of the shape, position, and size of the object in the real space may be obtained through at least one sensor.

According to an embodiment, upon receipt of a user input for mapping the virtual object 1310 to one of the plurality of icons 1330, 1331, 1332, 1333, and 1334, the electronic device may identify the type of an object through a camera (e.g., the third camera module 255 and/or second camera module 253 of FIG. 3). According to an embodiment, the shape of the virtual object may be determined based on whether the type of the mapped object in the real space is related to selected content. According to an embodiment, the operation of determining the shape of a virtual object has been described before with reference to FIGS. 9C, 9D, and 13A, and thus a redundant description thereof will be avoided.

Figure 14:
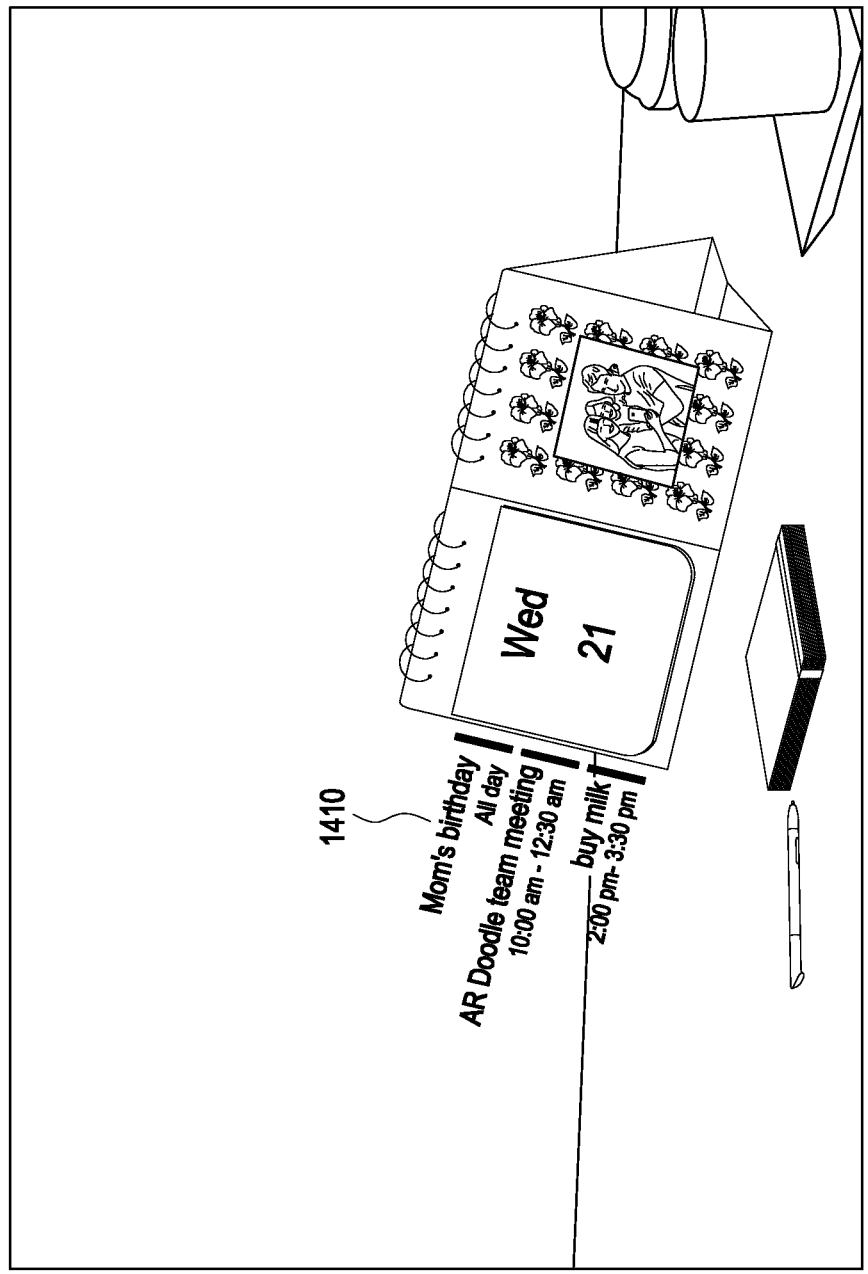
FIG. 14 is a diagram illustrating a virtual object mapped to a real space related to content according to an example embodiment.

FIG. 14 is a diagram illustrating a virtual object mapped to a real space related to content according to an embodiment.

According to an embodiment, referring to FIG. 14, when an electronic device (e.g., the electronic device 101 of FIG. 1, the processor 120 of FIG. 1, or the electronic device 200 of FIG. 2) maps the panel-shaped virtual object 1310 illustrated in FIG. 13A to the object 1320 (e.g., calendar) related to content in the real space, the electronic device may display a virtual object related to the selected content based on at least one of the shape, position, or size of the calendar 1320 on a display (e.g., the display module 160 of FIG. 1).

For example, when the object in the real space to which the virtual object displayed based on content selection is mapped is related to the selected content, the electronic device may change the virtual object based on at least one of the shape, position, or size of the object in the real space. According to an embodiment, the electronic device may display the changed virtual object in at least one of at least part of the object in the real space or the vicinity of the object in the real space. For example, the changed virtual object may be content information 1410 displayed in at least one of at least part of the object in the real space or the vicinity of the object in the real space.

For example, the electronic device may display summary information about the selected content in part of the object in the real space, and display the detailed information 1410 about the selected content around the object in the real space.

For example, the electronic device may display information about a date selected on an execution screen of a calendar application on a calendar in the real space, and display the schedule information 1410 related to the selected date around the calendar in the real space.

According to an embodiment, the electronic device may detect the user's gaze through at least one second sensor (e.g., the sensor module 176 of FIG. 1 or the first camera module 251 of FIG. 3), and based on the detected user's gaze being directed toward the object in the real space, to which the virtual object is mapped, display the detailed information 1410 around the calendar in the real space.

According to an embodiment, the electronic device may delete the detailed information 1111 (e.g., see 1111 in FIG. 11) around the calendar in the real space, based on the detected user's gaze not being directed toward the object in the real space, to which the virtual object is mapped.

Figure 15:
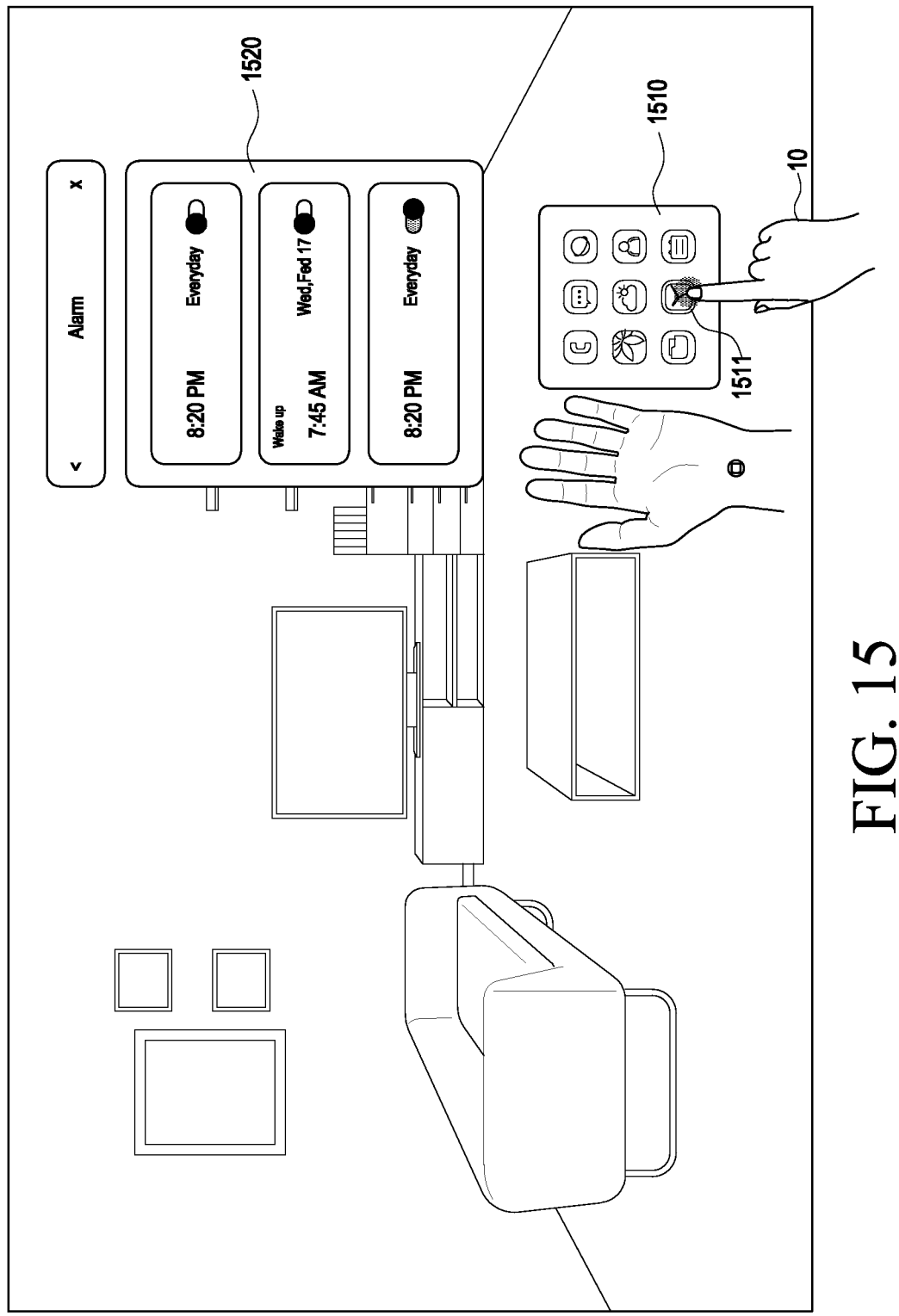
FIG. 15 is a diagram illustrating an operation of displaying an execution screen in a wearable electronic device according to an example embodiment.

FIG. 15 is a diagram illustrating an operation of displaying an execution screen in an electronic device according to an embodiment.

According to an embodiment, referring to FIG. 15, an electronic device (e.g., the electronic device 101 of FIG. 1, the processor 120 of FIG. 1, or the electronic device 200 of FIG. 2) may display an application list 1510 including a plurality of application icons on a display (e.g., the display module 160 of FIG. 1 or the display member 201 of FIG. 2).

According to an embodiment, upon receipt of a user input for selecting one icon 1511 from the application list 1510, the electronic device may display an execution screen 1520 of an application corresponding to the selected icon on the display. For example, upon receipt of a hand gesture of the user 10 for selecting the icon 1511 from the application list 1510 through a camera (e.g., the camera module 180 of FIG. 1 or the third camera module 255 of FIG. 3), the electronic device may display the execution screen 1520 of the application on the display (e.g., the display module 160 of FIG. 1 or the display member 201 of FIG. 2).

For example, upon receipt of a user input for selecting the icon 1511 representing an alarm application from the application list 1510, the electronic device may display the execution screen 1520 of the alarm application on the display.

Figure 16:
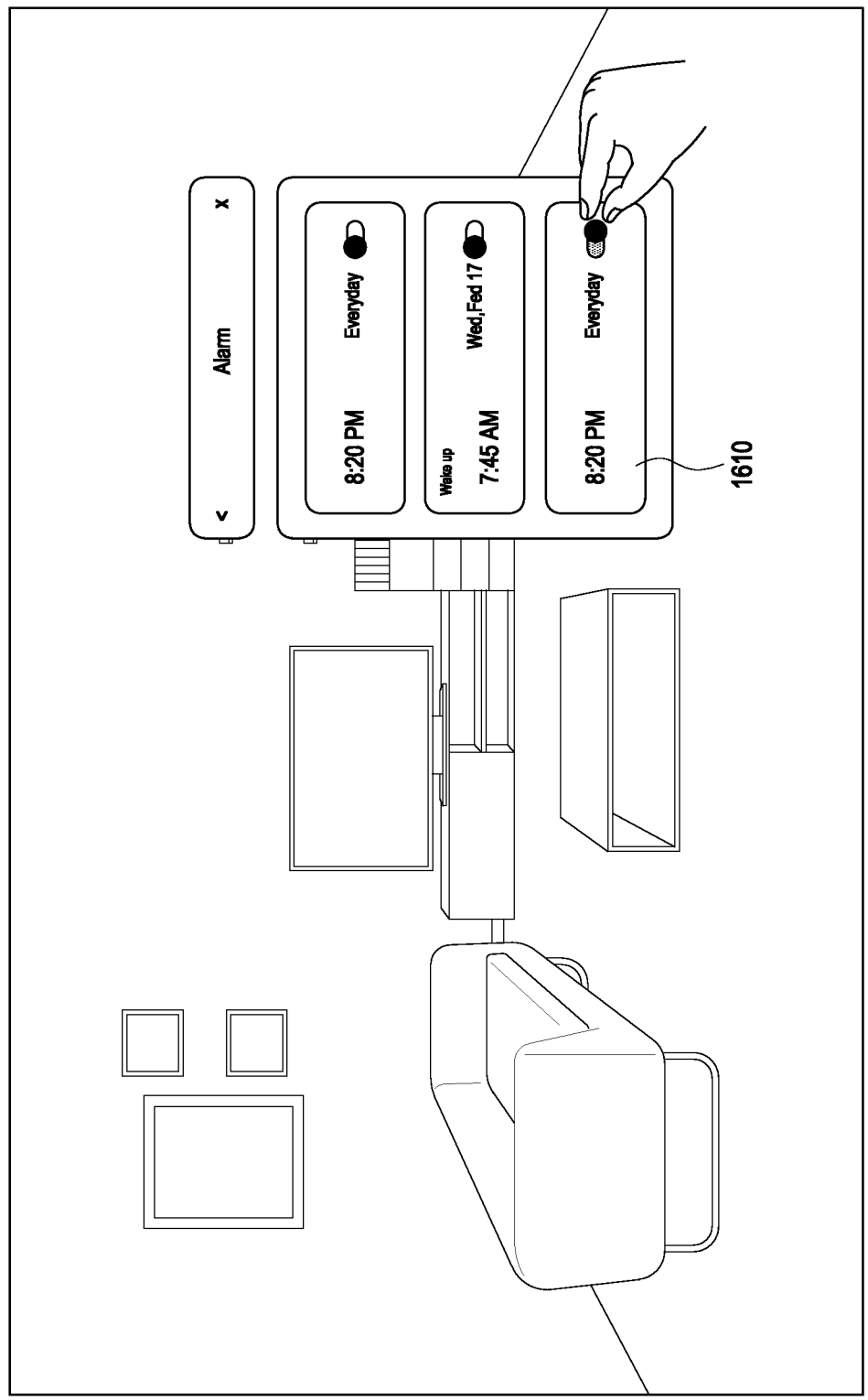
FIG. 16 is a diagram illustrating a content selection operation in a wearable electronic device according to an example embodiment.

FIG. 16 is a diagram illustrating a content selection operation in an electronic device according to an embodiment.

According to an embodiment, referring to FIG. 16, an electronic device (e.g., the electronic device 101 of FIG. 1, the processor 120 of FIG. 1, or the electronic device 200 of FIG. 2) may receive a user input for selecting one content 1610 from among a plurality of contents included in an execution screen of an application displayed on a display (e.g., the display module 160 of FIG. 1 or the display member 201 of FIG. 2).

For example, the user input for selecting the content may be a gesture input such as a pinch action by which the user picks up the content with a thumb and an index finger or a touch action of pressing the content. For example, a gesture input such as a pinch action or a touch action for selecting the content (e.g., specific alarm) 1610 may be received on an execution screen of the alarm application. According to an embodiment, the gesture input is not limited to the pinch action or the touch action.

According to an embodiment, upon receipt of the gesture input for selecting the content 1610 from among the plurality of contents included in the execution screen of the application, the electronic device may display a virtual object related to the selected content 1610 on the display.

According to an embodiment, the virtual object displayed according to the content selection may be in the form of a panel or a 3D virtual object. According to an embodiment, the shape of the virtual object displayed according to the content selection may be set during manufacture or by a user manipulation.

According to an embodiment, an embodiment of displaying a panel-shaped virtual object according to content selection will be described below with reference to FIGS. 17A and 18A.

Figure 17A:
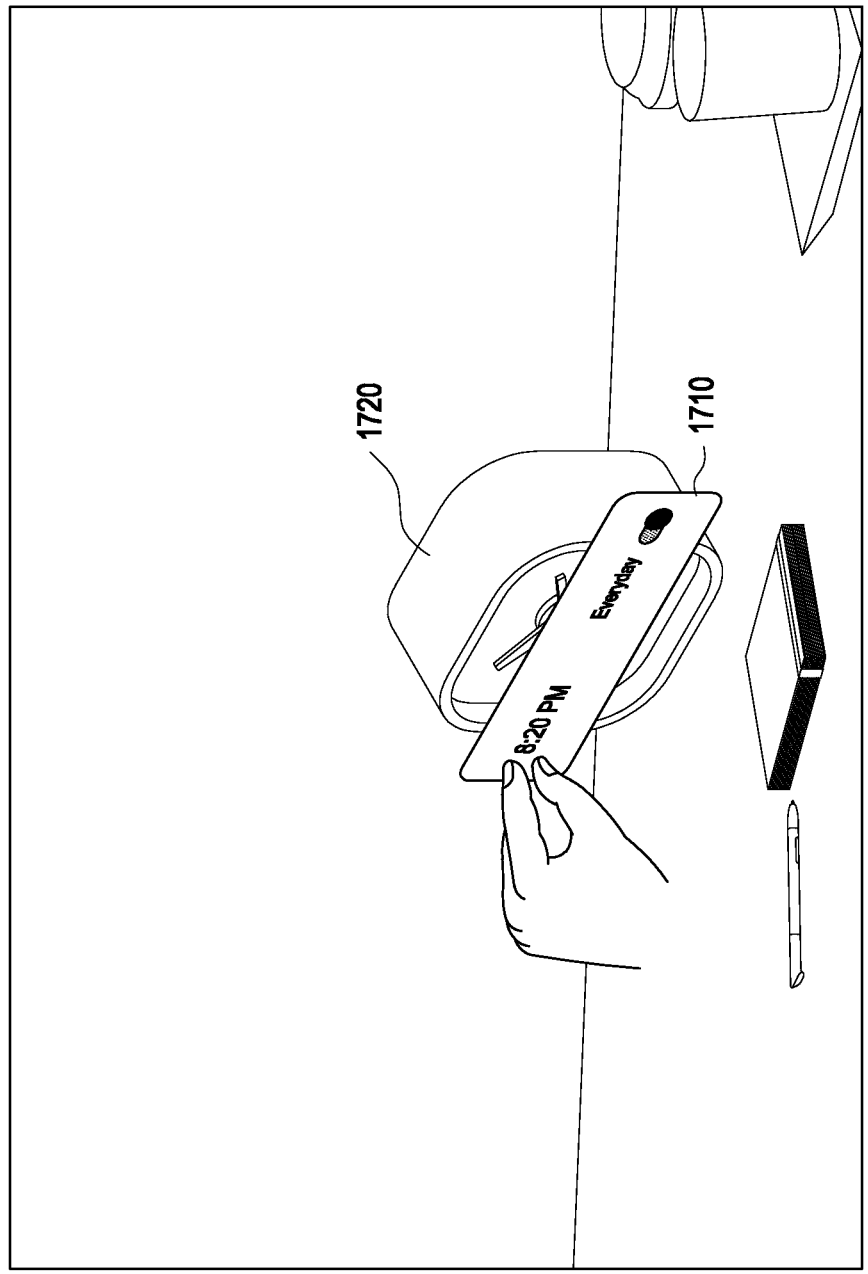
FIG. 17A is a diagram illustrating an operation of mapping a virtual object to a real space related to content according to an example embodiment.

FIG. 17A is a diagram illustrating an operation of mapping a virtual object to a real space related to content according to an embodiment.

According to an embodiment, referring to FIG. 17A, when an electronic device (e.g., the electronic device 101 of FIG. 1, the processor 120 of FIG. 1, or the electronic device 200 of FIG. 2) maps a panel-shaped virtual object 1710 to an object 1720 related to content in a real space, the electronic device may determine the shape of the virtual object based on the type of the object 1720 in the real space.

Figure 17B:
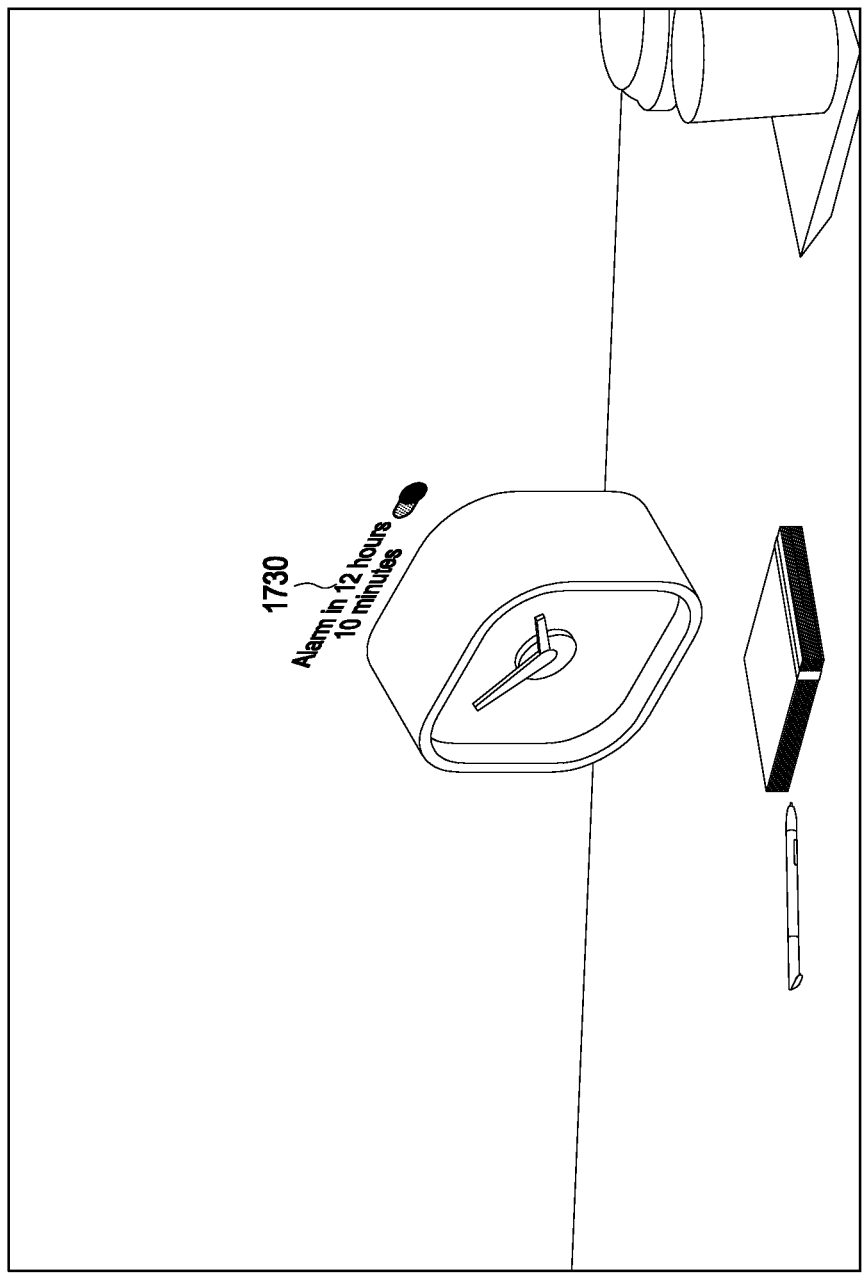
FIG. 17B is a diagram illustrating a virtual object mapped to a real space related to content according to an example embodiment.

For example, when the panel-shaped virtual object 1710 displayed according to content selection is moved and mapped to the object (e.g., table clock) 1720 in the real space, the electronic device may display a virtual object including content information displayed in part of the table clock 1720 or around the table clock 1720. FIG. 17B is a diagram illustrating a virtual object mapped to a real space related to content according to an embodiment.

According to an embodiment, referring to FIG. 17B, when an electronic device (e.g., the electronic device 101 of FIG. 1, the processor 120 of FIG. 1, or the electronic device 200 of FIG. 2) maps the panel-shaped object 1710 illustrated in FIG. 17A to the content-related object 1720 in the real space, the electronic device may display a virtual object related to the selected content on a display (e.g., the display module 160 of FIG. 1) based on at least one of the shape, position, or size of the desk clock 1720.

For example, the electronic device may display a changed virtual object in at least one of at least part of the object in the real space or the vicinity of the object in the real space. For example, the changed virtual object may be content information 1730 displayed in at least one of at least part of the object in the real space or the vicinity of the object in the real space.

For example, the electronic device may display the information 1730 related to the selected alarm around the desk clock in the real space.

While FIGS. 17A and 17B illustrate that content selected on an execution screen of an alarm application is mapped to a table clock in a real space, when the selected content is mapped to an object (e.g., a desk) unrelated to the selected content in the real space, a 3D virtual object in the form of a clock (e.g., a table clock) may be mapped to the object in the real space, and information about the selected content may be displayed in at least one of part of the 3D virtual object or the vicinity of the 3D virtual object according to an embodiment.

Figure 18A:
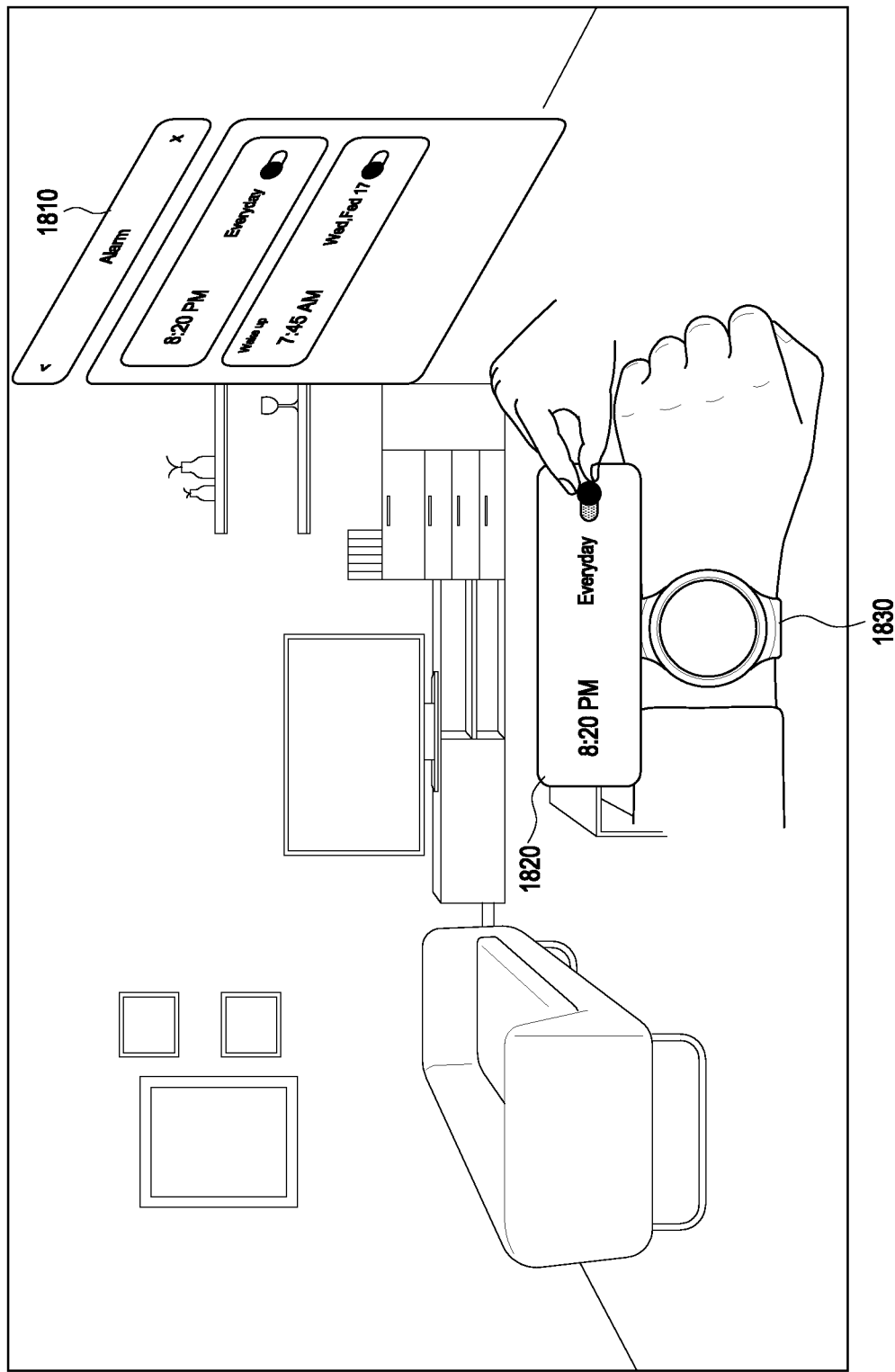
FIG. 18A is a diagram illustrating an operation of mapping a virtual object to a real space related to content according to an example embodiment.

FIG. 18A is a diagram illustrating an operation of mapping a virtual object to a real space related to content according to an embodiment.

According to an embodiment, referring to FIG. 18A, an electronic device (e.g., the electronic device 101 of FIG. 1, the processor 120 of FIG. 1, or the electronic device 200 of FIG. 2) may receive a user input for selecting one of a plurality of contents included in an execution screen of an application, displayed on a display (e.g., the display module 160 of FIG. 1 or the display member 201 of FIG. 2).

For example, the user input for selecting one content may be a gesture input such as a pinch action by which the user picks up the content with a thumb and an index finger or a touch action of pressing the content. For example, a gesture input such as a pinch action or a touch action for selecting a specific alarm may be received on an execution screen of an alarm application (e.g., see 1810 in FIG. 18A). According to an embodiment, the gesture input is not limited to the pinch action or the touch action.

According to an embodiment, upon receipt of the gesture input for selecting one of the plurality of contents included in the execution screen of the application, the electronic device may display a virtual object 1820 related to the selected content on the display.

According to an embodiment, when the electronic device maps the virtual object 1820 in the form of a panel to an object 1830 related to content in a real space, the electronic device may determine the shape of a virtual object based on the type of the object 1830 in the real space.

For example, when the panel-shaped virtual object 1820 displayed according to content selection is moved and mapped to an object (e.g., wrist watch) 1830 in the real space, a virtual object including content information displayed in part of the wrist watch 1830 or around the wrist watch 1830 may be displayed.

Figure 18B:
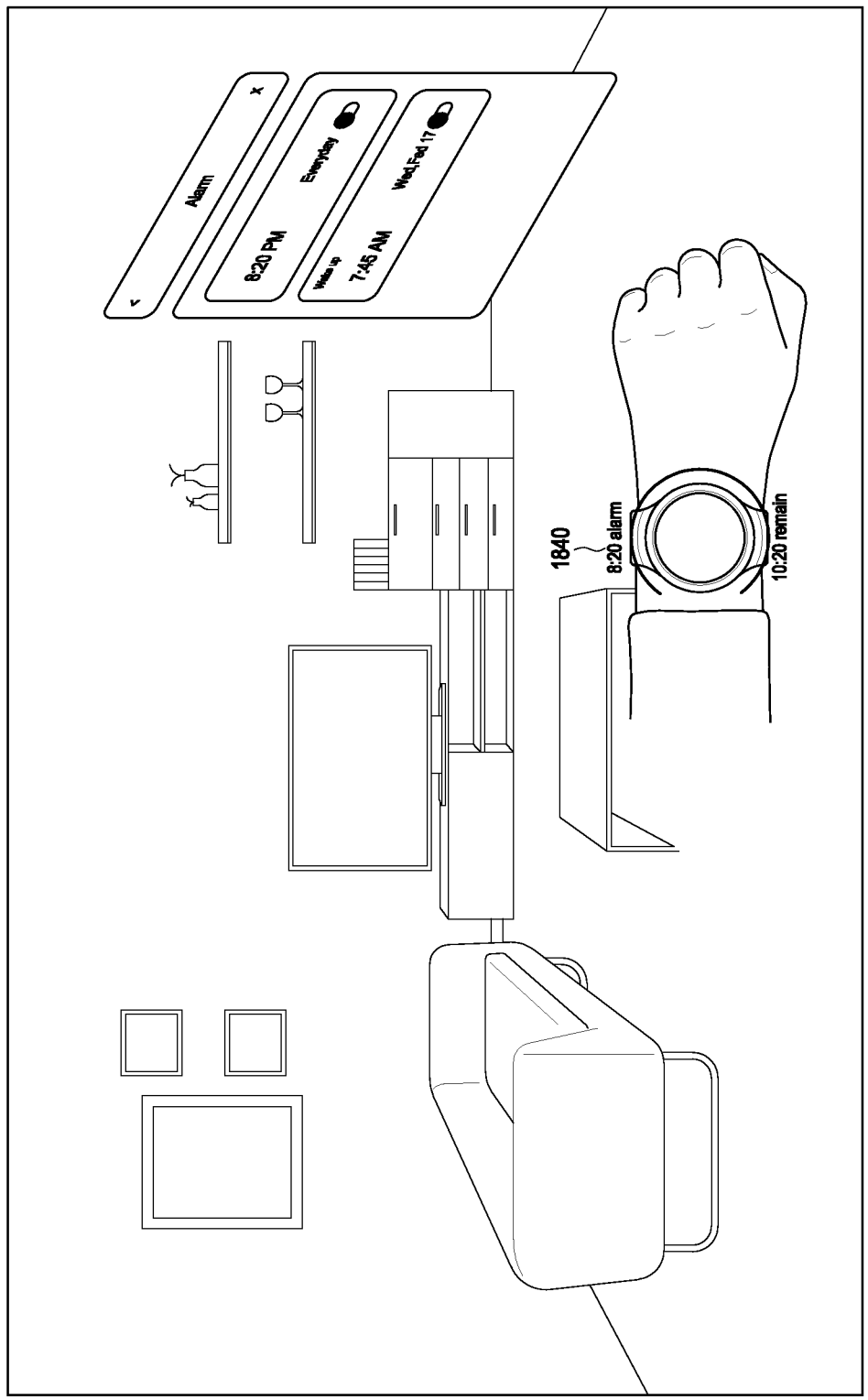
FIG. 18B is a diagram illustrating a virtual object mapped to a real space related to content according to an example embodiment.

FIG. 18B is a diagram illustrating an operation of mapping a virtual object to a real space related to content according to an embodiment.

According to an embodiment, referring to FIG. 18B, when an electronic device (e.g., the electronic device 101 of FIG. 1, the processor 120 of FIG. 1, or the electronic device 200 of FIG. 2) maps the panel-shaped virtual object 1820 illustrated in FIG. 18A to the object 1830 related to content in the real space, the electronic device may display a virtual object related to the selected content on a display (e.g., the display module 160 of FIG. 1) based on at least one of the shape, position, or size of the wrist watch 1830.

For example, the electronic device may display a changed virtual object in at least one of at least part of the object in the real space or the vicinity of the object in the real space. For example, the changed virtual object may be content information 1840 displayed in at least one of at least part of the object in the real space or the vicinity of the object in the real space.

For example, the electronic device may display the information 1840 related to a selected alarm around the wrist watch in the real space.

While FIGS. 18A and 18B illustrate that content selected on the execution screen of the alarm application is mapped to the wrist watch in the real space, when the selected content is mapped to an object (e.g., a wrist) unrelated to the selected content in the real space, a 3D virtual object in the form of a watch (e.g., a wrist watch) may be mapped to the object in the real space, and information about the selected content may be displayed in at least one of part of the 3D virtual object or the vicinity of the 3D virtual object.

Figure 18C:
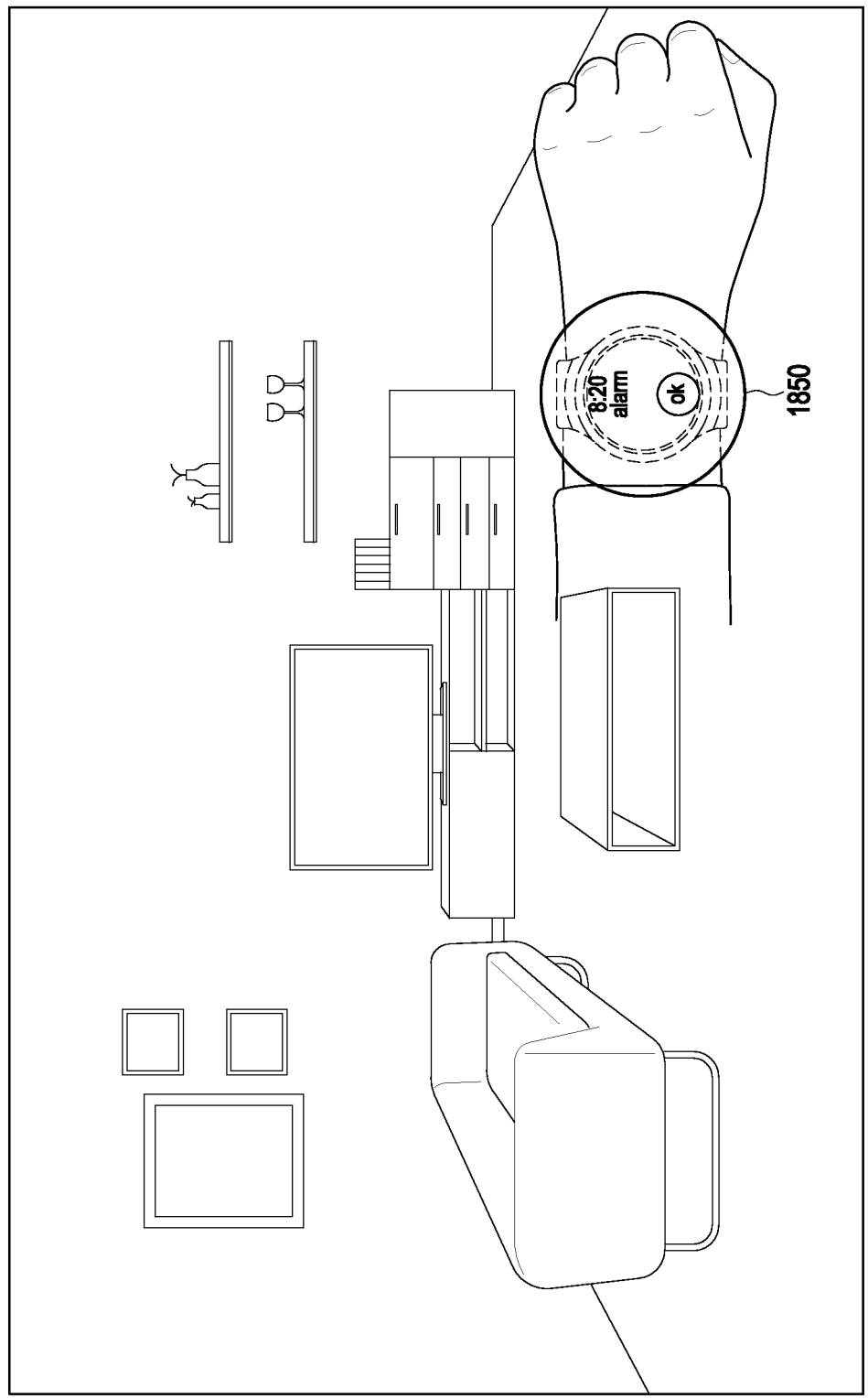
FIG. 18C is a diagram illustrating an operation of updating a virtual object when an event occurs according to an example embodiment.

FIG. 18C is a diagram illustrating an operation of updating a virtual object, when an event occurs according to an embodiment.

According to an embodiment, referring to FIG. 18C, upon occurrence of an event related to selected content, an electronic device (e.g., the electronic device 101 of FIG. 1, the processor 120 of FIG. 1, or the electronic device 200 of FIG. 2) may update a virtual object mapped to an object in a real space based on information about the event. For example, the event related to the selected content may be generated by the electronic device or an external electronic device (e.g., the electronic device 104 of FIG. 1).

For example, as illustrated in FIG. 18B, in a state in which content for a specific alarm is mapped to a wrist watch, and content information related to the specific alarm is displayed in part of the wrist watch or around the wrist watch, when a time set for the alarm arrives, the electronic device may update the mapped virtual object, considering that an event for the specific alarm has occurred. For example, the electronic device may display a graphic object 1850 informing that an alarm has been generated based on at least one of the shape, position, or size of the wrist watch.

According to an embodiment, the electronic device may provide a sound or vibration indicating that a time for which an alarm is set has arrived.

According to an embodiment, upon receipt of a user input for selecting an 'OK' button in the graphic object 1850, the electronic device may delete the graphic object 1850, and return to the state in which the content information related to the specific alarm is displayed as a virtual object in part or around the wrist watch, as illustrated in FIG. 18B. According to an embodiment, when the specific alarm is a one-time event, and a user input for selecting the 'OK' button on the graphic object 1850 is received, the electronic device may delete the virtual object mapped to the wrist watch.

Figure 19A:
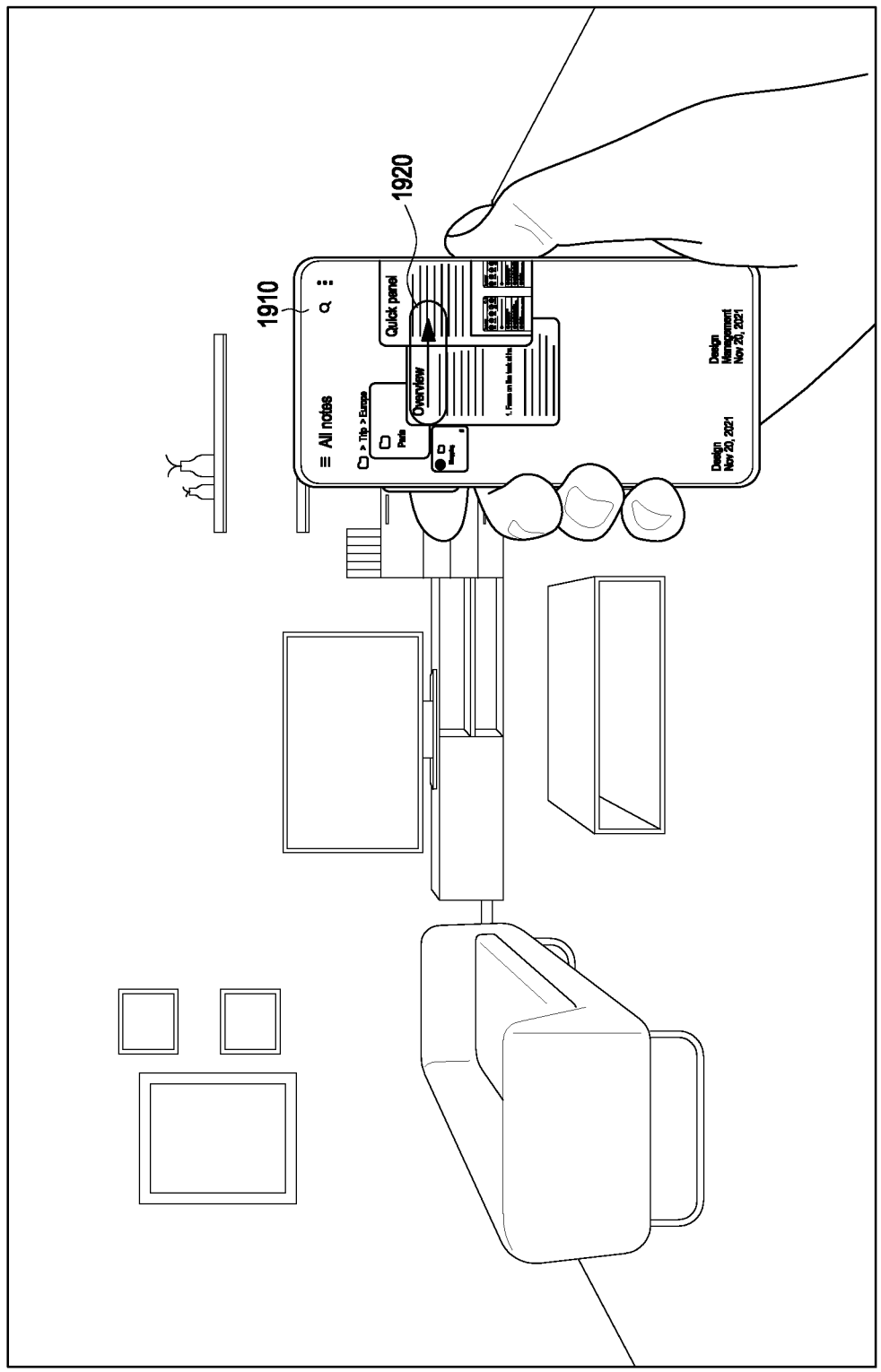
FIG. 19A is a diagram illustrating an operation of displaying an execution screen in a wearable electronic device according to an example embodiment.

FIG. 19A is a diagram illustrating an operation of displaying an execution screen in an electronic device according to an embodiment.

According to an embodiment, referring to FIG. 19A, an electronic device (e.g., the electronic device 101 of FIG. 1, the processor 120 of FIG. 1, or the electronic device 200 of FIG. 2) may receive a user input 1920 for content selection on a screen 1910 of an external electronic device in a real space. For example, the electronic device may receive a user input(s) (e.g., swipe action) 1920 for taking out note content displayed on the screen 1910 of the external electronic device from the screen 1910 of the external electronic device.

According to an embodiment, the note content to be taken out from the screen of the external electronic device 1910 may be selected, and then the swipe action 1920 may be performed. For example, when a plurality of note contents are to be taken out from the screen 1910 of the external electronic device, the swipe action 1920 may be received as many times as the number of note contents.

Figure 19B:
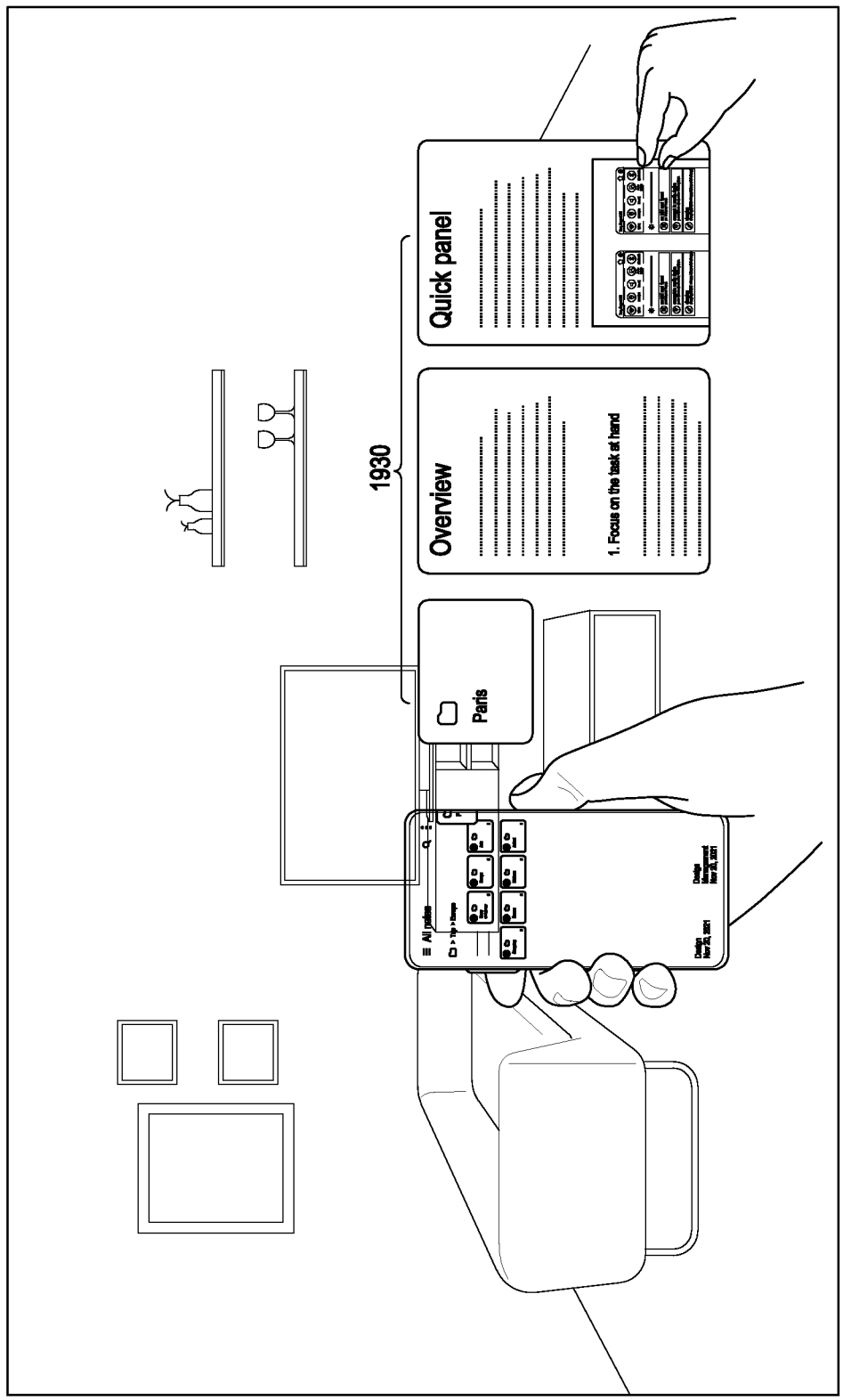
FIG. 19B is a diagram illustrating an operation of displaying an execution screen in a wearable electronic device according to an example embodiment.

FIG. 19B is a diagram illustrating an operation of displaying an execution screen in an electronic device according to an embodiment.

According to an embodiment, referring to FIG. 19B, an electronic device (e.g., the electronic device 101 of FIG. 1, the processor 120 of FIG. 1, or the electronic device 200 of FIG. 2) may display a plurality of virtual objects 1930 respectively corresponding to a plurality of contents taken out from a screen of an external electronic device on a display (e.g., the display module 160 of FIG. 1 or the display member 201 of FIG. 2).

Figure 19C:
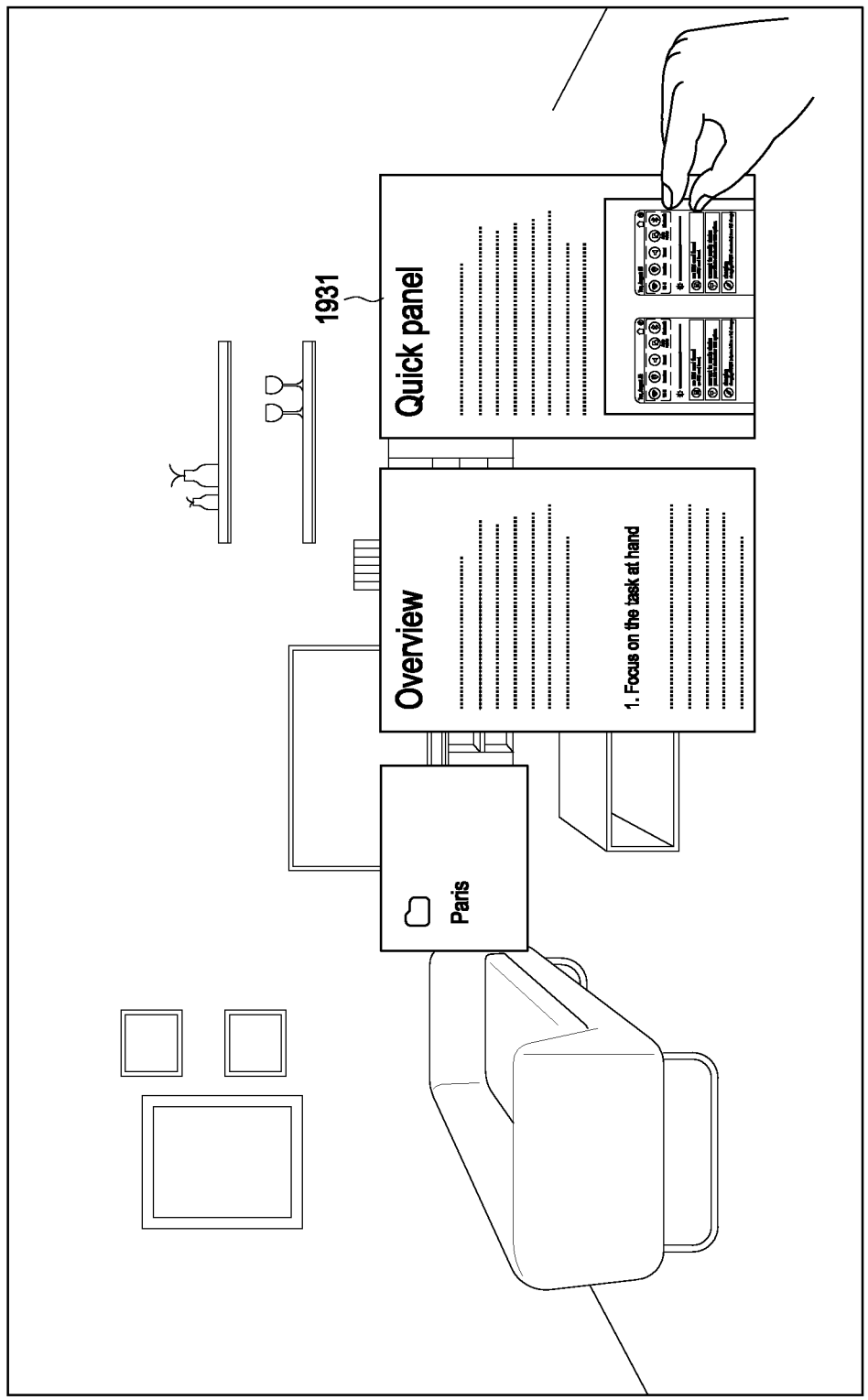
FIG. 19C is a diagram illustrating a content selection operation in a wearable electronic device according to an example embodiment.

FIG. 19C is a diagram illustrating a content selection operation in an electronic device according to an embodiment.

According to an embodiment, referring to FIG. 19C, an electronic device (e.g., the electronic device 101 of FIG. 1, the processor 120 of FIG. 1, or the electronic device 200 of FIG. 2) may receive a user input for selecting one content 1931 from among a plurality of contents displayed on a display (e.g., the display module 160 of FIG. 1 or the display member 201 of FIG. 2).

For example, the user input for selecting one content may be a gesture input such as a pinch action by which the user picks up the content with a thumb and an index finger, or a touch action. For example, a gesture input such as a pinch action or a touch action, for selecting the note content 1931 from among a plurality of note contents may be received. According to an embodiment, the gesture input is not limited to the pinch action or the touch action.

According to an embodiment, upon receipt of the gesture input for selecting the content 1931 from among the plurality of contents, the electronic device may display a virtual object related to the selected content 1931 on the display.

According to an embodiment, the virtual object displayed according to the content selection may be in the form of a panel or a 3D virtual object. According to an embodiment, the shape of the virtual object displayed according to the content selection may be set during manufacture or by a user manipulation.

Figure 19D:
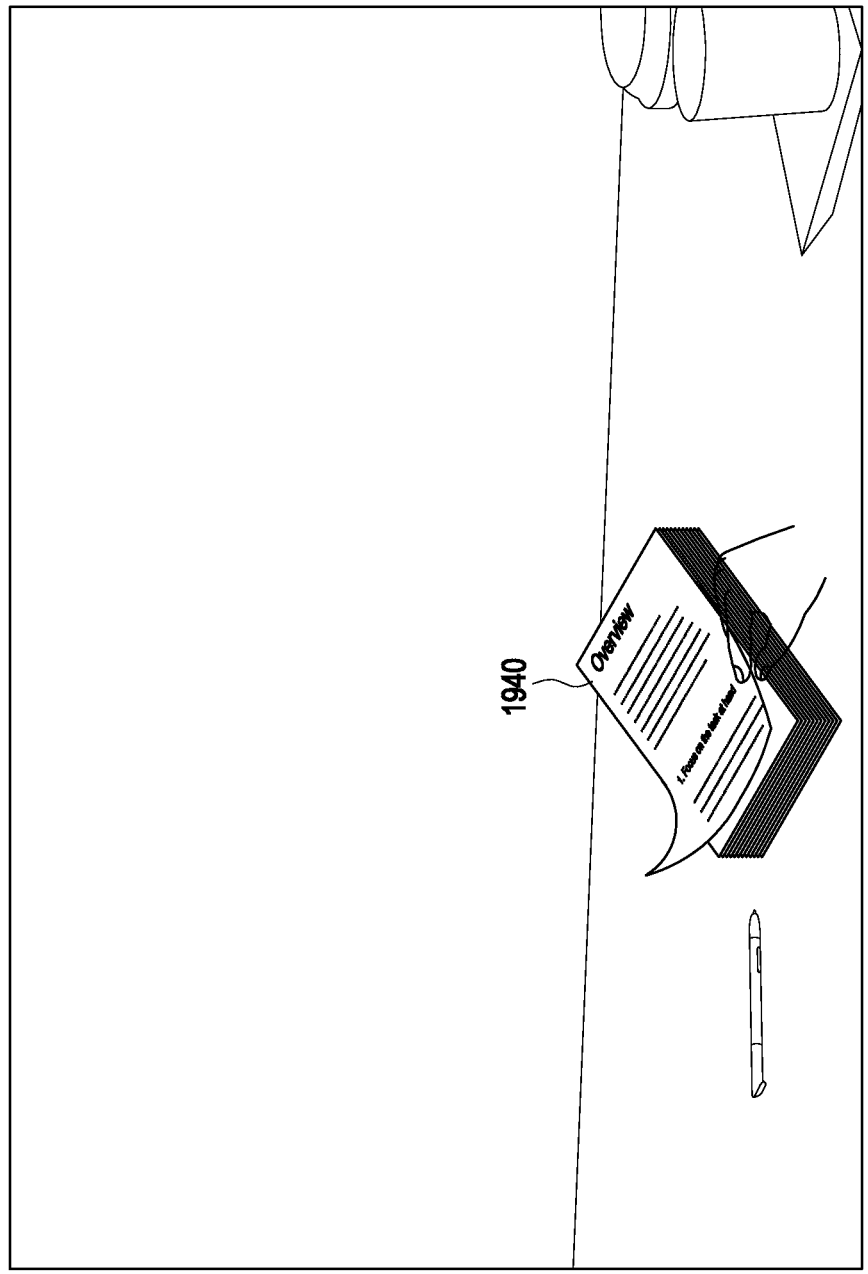
FIG. 19D is a diagram illustrating a 3D virtual object mapped to a real space according to an example embodiment.

FIG. 19D is a diagram illustrating a 3D virtual object mapped to a real space according to an embodiment.

According to an embodiment, referring to FIG. 19D, when an electronic device (e.g., the electronic device 101 of FIG. 1, the processor 120 of FIG. 1, or the electronic device 200 of FIG. 2) maps a virtual object in the form of a panel or a 3D virtual object to an object unrelated to content in a real space, the electronic device may determine the shape of the virtual object based on the type of an application and the type of the object in the real space.

For example, when the object in the real space is a desk, the electronic device may display a virtual object 1940 as a 3D virtual object in the form of a memo pad. For example, the virtual object 1940 may include selected note content information.

While FIG. 19D illustrates that the virtual object 1940 is in the form of a 3D virtual object, when a panel-shaped virtual object is moved and mapped to an object in a real space, the virtual object may be changed to the form of a 3D virtual object based on the type of selected content and the type of the object in the real space.

While FIG. 19D illustrates a case in which a virtual object in the form of a panel or a 3D virtual object is mapped to an object (e.g., a desk) unrelated to content in a real space, when a virtual object in the form of a panel or a 3D virtual object is mapped to an object (e.g., a memo pad or a note) related to content in a real space, the virtual object fixed in the real space may include content information displayed on the object in the real space according to an embodiment.

Figure 20A:
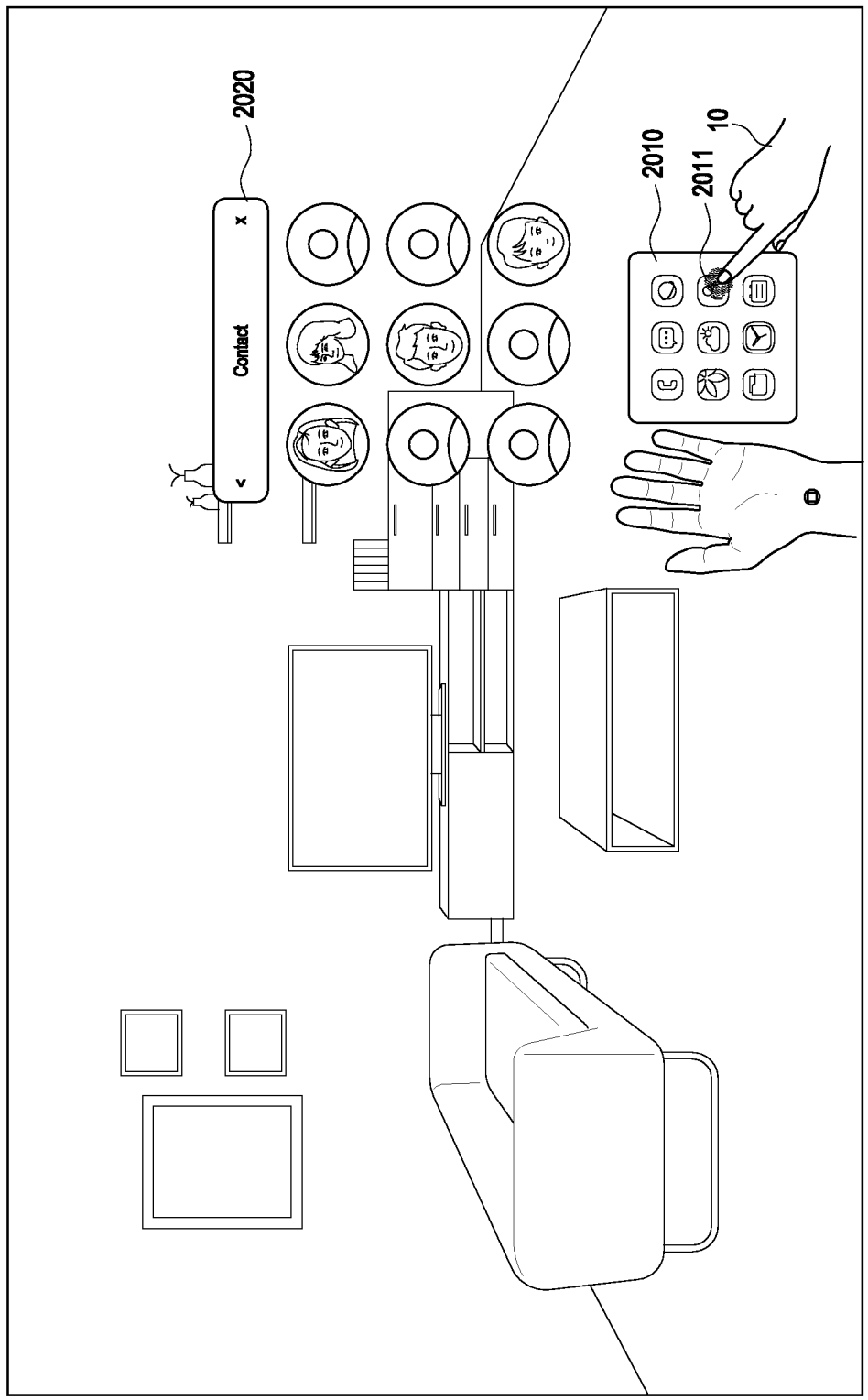
FIG. 20A is a diagram illustrating an operation of displaying an execution screen in a wearable electronic device according to an example embodiment.

FIG. 20A is a diagram illustrating an operation of displaying an execution screen in an electronic device according to an embodiment.

According to an embodiment, referring to FIG. 20A, an electronic device (e.g., the electronic device 101 of FIG. 1, the processor 120 of FIG. 1, or the electronic device 200 of FIG. 2) may display an application list 2010 including a plurality of application icons on a display (e.g., the display module 160 of FIG. 1 or the display member 201 of FIG. 2).

According to an embodiment, upon receipt of a user input for selecting one icon 2011 from the application list 2010, the electronic device may display an execution screen 2020 of an application corresponding to the selected icon on the display. For example, upon receipt of a hand gesture of the user 10 for selecting the icon 2011 from the application list 2010 through a camera (e.g., the camera module 180 of FIG. 1 or the third camera module 255 of FIG. 3), the electronic device may display the execution screen 2020 of the application on the display (e.g., the display module 160 of FIG. 1 or the display member 201 of FIG. 2).

For example, upon receipt of a user input for selecting the icon 2011 representing a contact application from the application list 2010, the electronic device may display the execution screen 2020 of the contact application on the display.

Figure 20B:
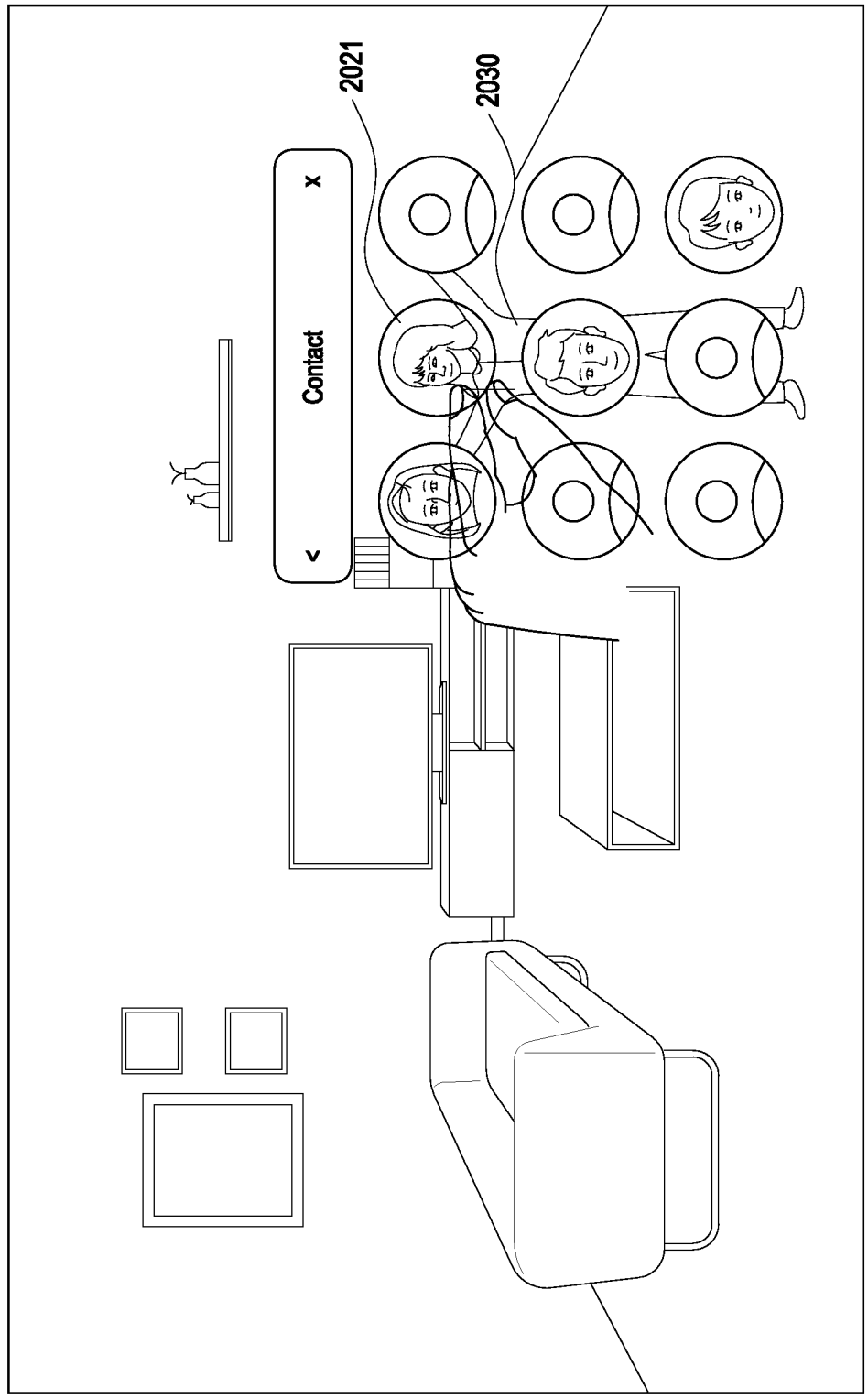
FIG. 20B is a diagram illustrating a content selection operation in a wearable electronic device according to an example embodiment.

FIG. 20B is a diagram illustrating a content selection operation in an electronic device according to an embodiment.

According to an embodiment, referring to FIG. 20B, an electronic device (e.g., the electronic device 101 of FIG. 1, the processor 120 of FIG. 1, or the electronic device 200 of FIG. 2) may receive a user input for selecting a (e.g., one) content (e.g., contact) 2021 from among a plurality of contents (e.g., contacts) included in an execution screen of an application displayed on a display (e.g., the display module 160 of FIG. 1 or the display member 201 of FIG. 2).

For example, the user input for selecting one content may be a gesture input such as a pinch action by which the user picks up the content with a thumb and an index finger or a touch action. For example, a gesture input such as a pinch action or a touch action for selecting a specific contact 2021 may be received on an execution screen of a contact application. According to an embodiment, the gesture input is not limited to the pinch action or the touch action.

According to an embodiment, upon receipt of the gesture input for selecting the content 2021 from among the plurality of contents included in the execution screen of the application, the electronic device may display a virtual object 2030 related to the selected content 2021 on the display.

According to an embodiment, the virtual object displayed according to the content selection may be in the form of a panel or a 3D virtual object. According to an embodiment, the shape of the virtual object displayed according to the content selection may be set during manufacture or by a user manipulation. For example, in the case of a panel, the virtual object may include a thumbnail image of the selected contact 2021, whereas in the case of a 3D virtual object, the virtual object may include a thumbnail image of the selected contact 2021 and a body-shaped 3D virtual object.

Figure 20C:
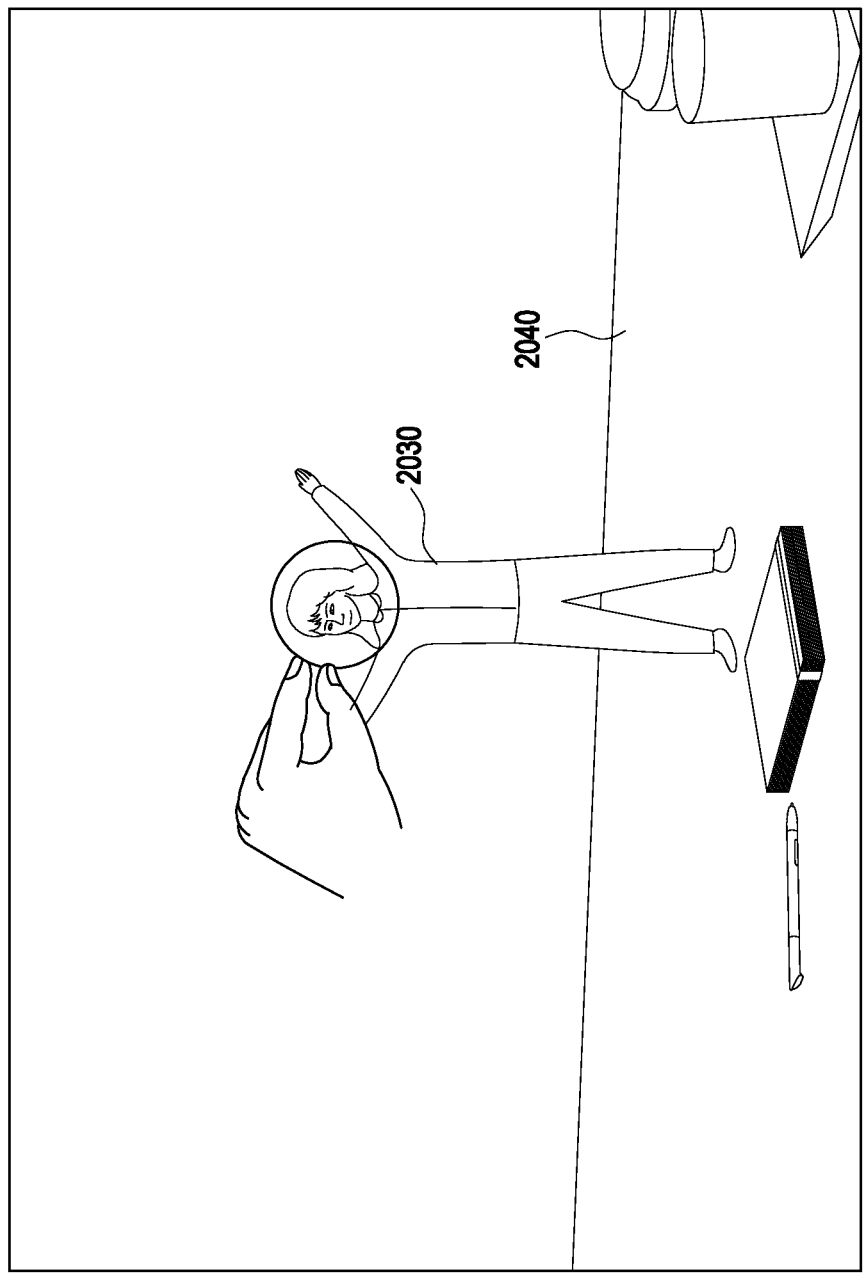
FIG. 20C is a diagram illustrating an operation of mapping a 3D virtual object to a real space according to an example embodiment.

FIG. 20C is a diagram illustrating an operation of mapping a virtual object to a real space according to an embodiment.

According to an embodiment, referring to FIG. 20C, when an electronic device (e.g., the electronic device 101 of FIG. 1, the processor 120 of FIG. 1, or the electronic device 200 of FIG. 2) may receive a user input for mapping a virtual object in the form of a panel or a 3D virtual object to an object unrelated to content in a real space.

According to an embodiment, upon receipt of a user input for performing a release action of moving the virtual object 2030 including the thumbnail image of the contact selected by the pinch action and the body-shaped 3D virtual object and mapping the virtual object 2030 to a desk as an object 2040 in the real space, the electronic device may fix the virtual object 2030 to the object 2040 in the real space.

Figure 20D:
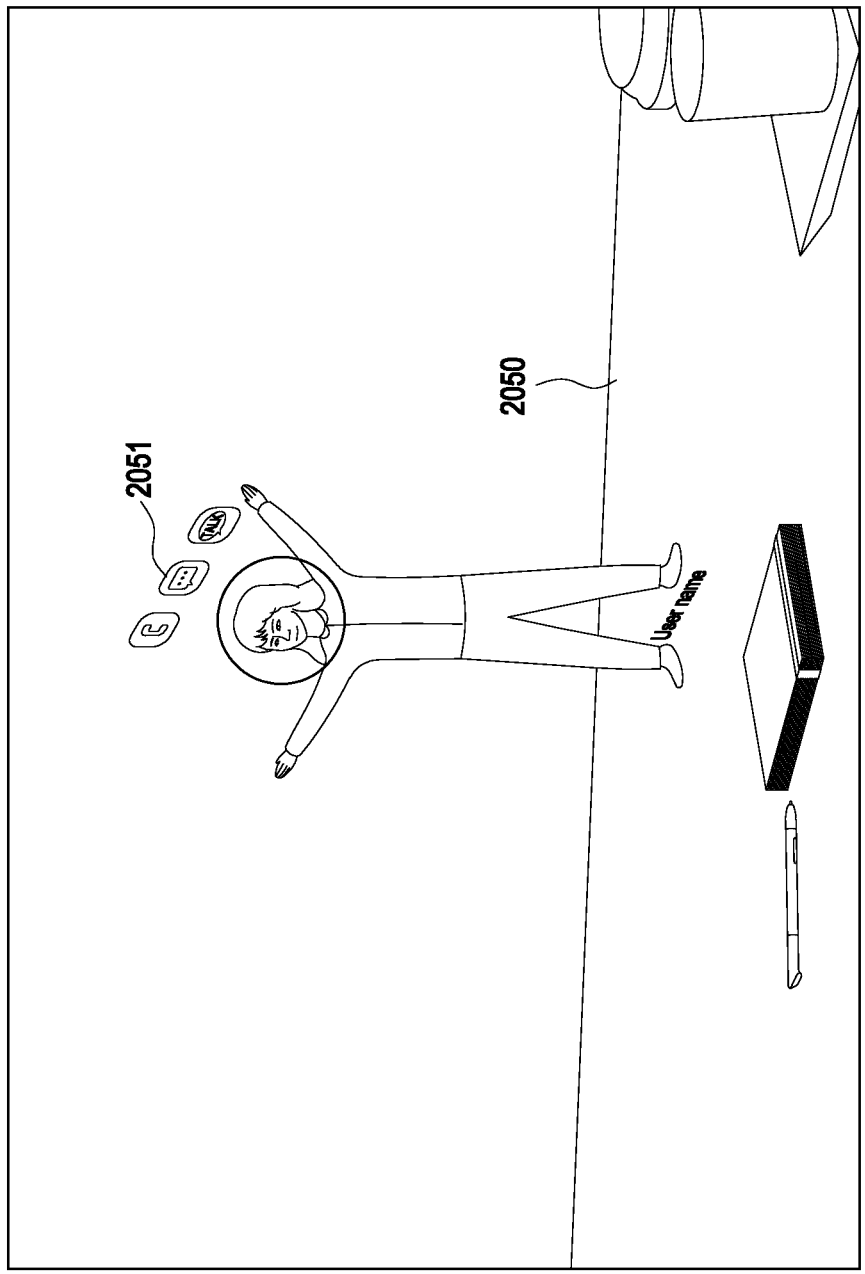
FIG. 20D is a diagram illustrating a 3D virtual object mapped to a real space according to an example embodiment.

FIG. 20D is a diagram illustrating a 3D virtual object mapped to a real space according to an embodiment.

According to an embodiment, referring to FIG. 20D, when a virtual object including a thumbnail image of a contact selected by a pinch action and a body-shaped 3D virtual object is mapped to an object in a real space, an electronic device (e.g., the electronic device 101 of FIG. 1, the processor 120 of FIG. 1, or the electronic device 200 of FIG. 2) may determine the shape of the virtual object based on the type of an application and the type of the object in the real space.

For example, when content is selected on the execution screen of the contact application, and a virtual object related to the selected content is mapped to a desk that is an object in the real space, the electronic device may change the virtual object displayed according to the content selection to a 3D virtual object 2050 in the form of an emoji. For example, the 3D virtual object 2050 in the form of the emoji may be a 3D form in which the thumbnail image of the selected contact and a body related to the thumbnail image are combined, and include information 2051 related to a function that may be performed using contact information. For example, the 3D virtual object 2050 in the form of the at least one emoji may include information (e.g., icons) 2051 representing a phone application, a message application, and/or an SNS application that may be performed using the selected contact, displayed around the emoji.

According to an embodiment, upon receipt of a user input for selecting one piece of information related to a function, the electronic device may display an execution screen of the selected function around the 3D virtual object. For example, upon receipt of a user input for selecting an icon representing a message application, the electronic device may display an execution screen of the message application enabling exchange of messages with the corresponding contact around the 3D virtual object.

Figure 20E:
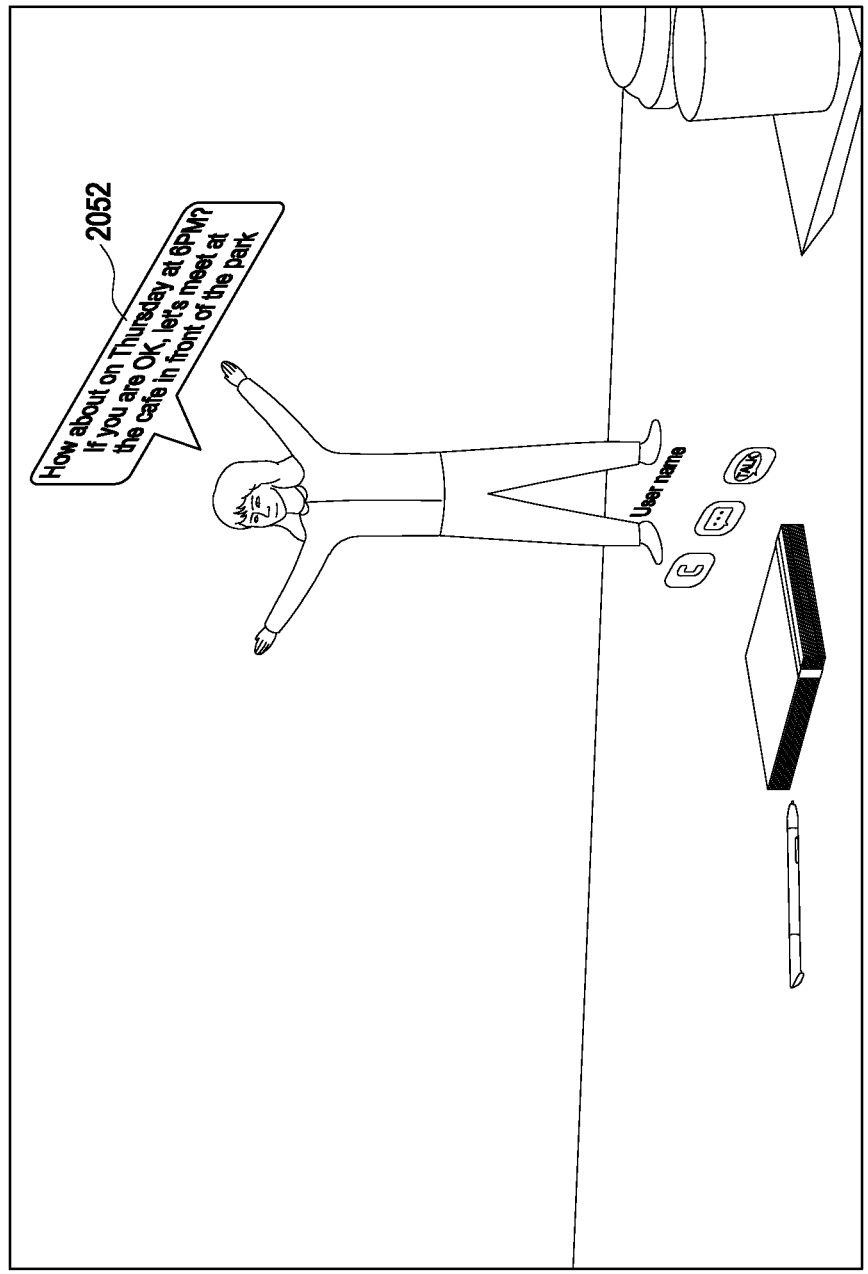
FIG. 20E is a diagram illustrating an operation of updating a virtual object when an event occurs according to an example embodiment.

FIG. 20E is a diagram illustrating an operation of updating a virtual object, upon occurrence of an event according to an embodiment.

According to an embodiment, referring to FIG. 20E, upon occurrence of an event for a selected contact, an electronic device (e.g., the electronic device 101 of FIG. 1, the processor 120 of FIG. 1, or the electronic device 200 of FIG. 2) may update a 3D virtual object mapped to an object in a real space.

For example, upon occurrence of an event of receiving a new message from the selected contact, the electronic device may update the 3D virtual object to display contents 2052 of the new message in the form of a speech bubble around an emoji.

Figure 21A:
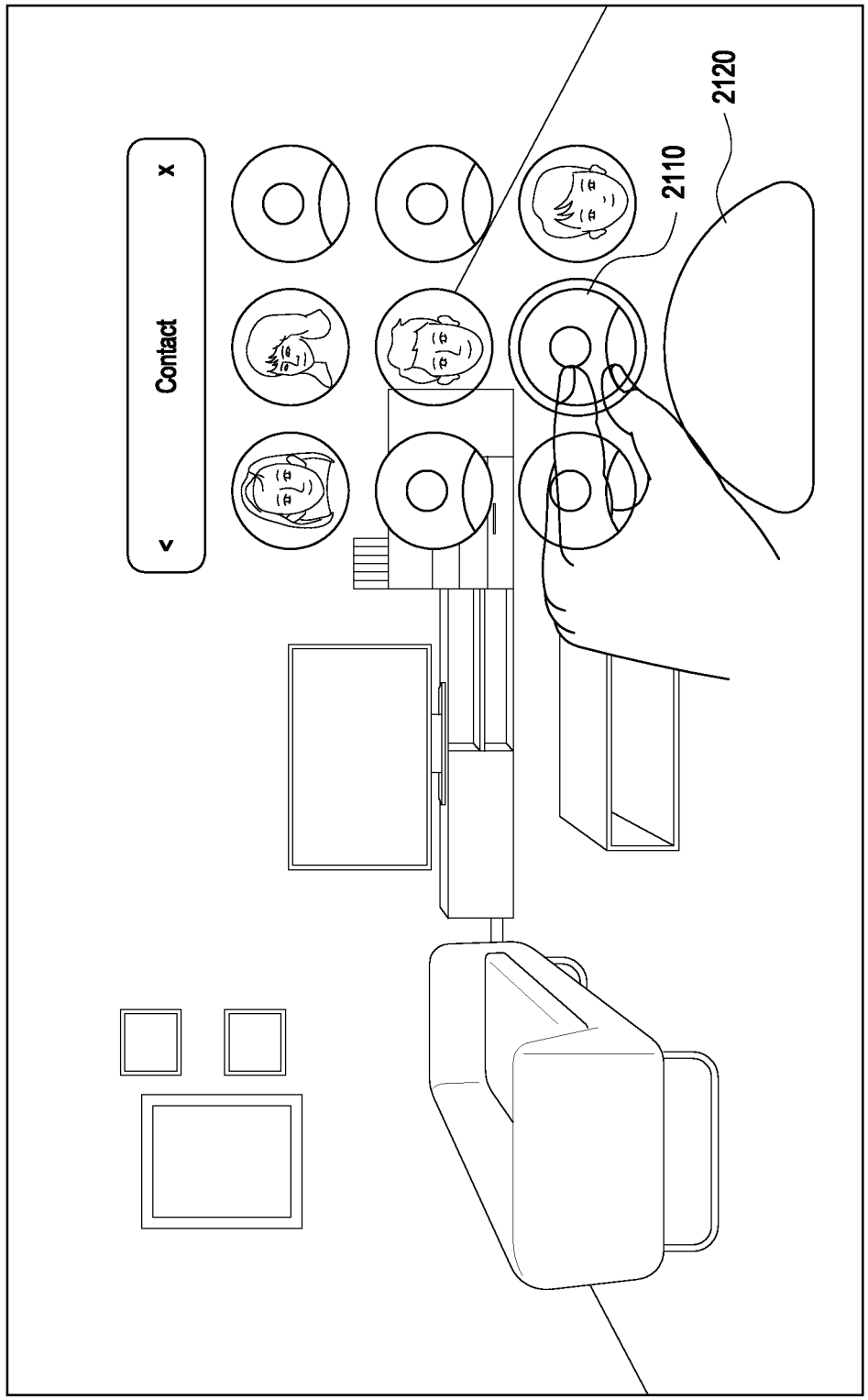
FIG. 21A is a diagram illustrating a content selection operation in a wearable electronic device according to an example embodiment.

FIG. 21A is a diagram illustrating a content selection operation in an electronic device according to an embodiment.

According to one embodiment, referring to FIG. 21A, an electronic device (e.g., the electronic device 101 of FIG. 1, the processor 120 of FIG. 1, or the electronic device 200 of FIG. 2) may receive a user input for selecting one content 2110 from among a plurality of contents included in an execution screen of an application displayed on a display (e.g., the display module 160 of FIG. 1 or the display member 201 of FIG. 2).

For example, the user input for selecting one content may be a gesture input such as a pinch action by which the user picks up the content with a thumb or an index finger or a touch action of pressing the content. For example, a gesture input such as a pinch action or a touch action for selecting the content (e.g., specific contact) 2110 may be received on the execution screen of the contact application. According to an embodiment, the gesture input is not limited to the pinch action or the touch action.

According to an embodiment, upon receipt of a gesture input for selecting the content 2110 from among the plurality of contents included in the execution screen of the application, the electronic device may display a virtual object 2120 related to the selected content 2110 on the display.

According to an embodiment, when there is no thumbnail image for the selected contact 2110, the virtual object 2120 may be in the form of a preset panel or 3D virtual object. For example, the virtual object 2120 may include a panel form or a 3D virtual object in which a person's head and torso are simplified.

Figure 21B:
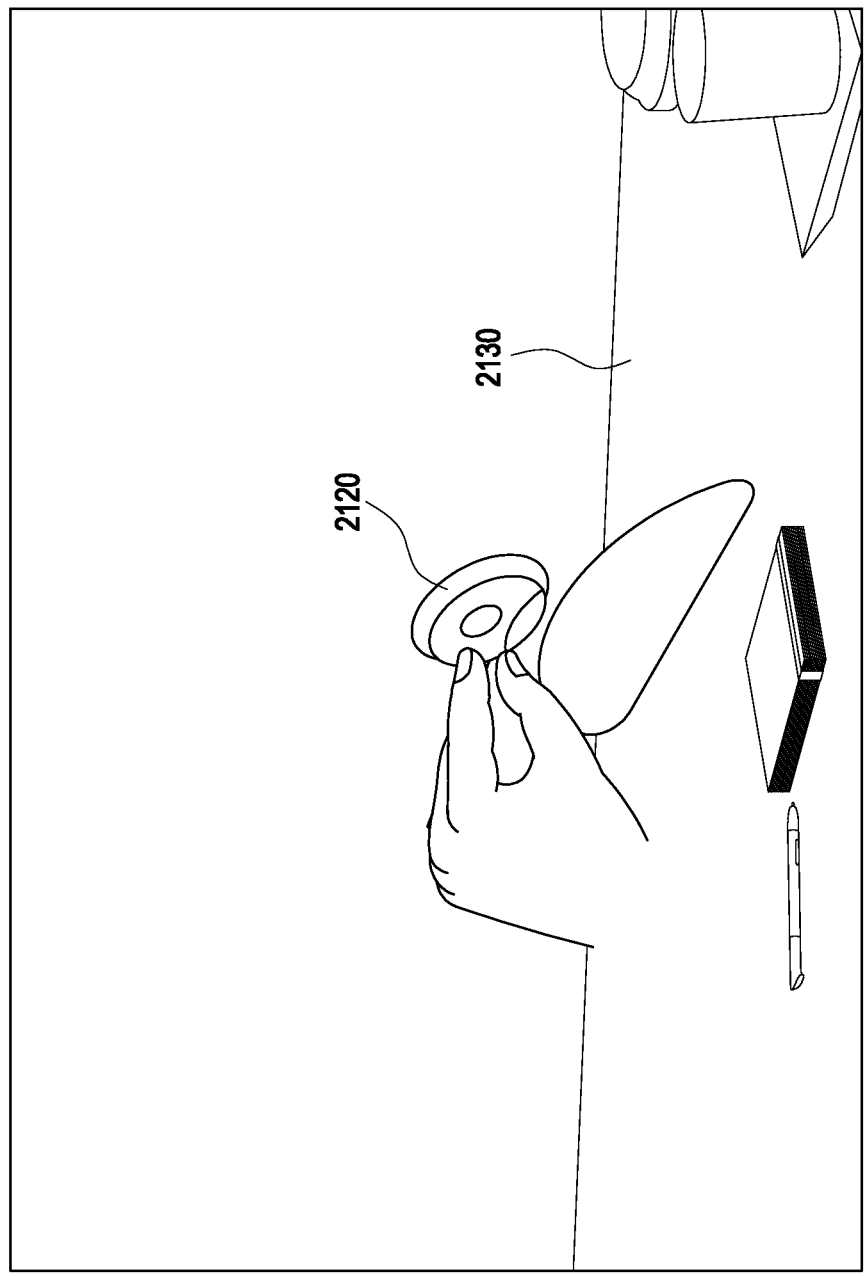
FIG. 21B is a diagram illustrating an operation of mapping a 3D virtual object to a real space according to an example embodiment.

FIG. 21B is a diagram illustrating an operation of mapping a 3D virtual object to a real space according to an embodiment.

According to an embodiment, referring to FIG. 21B, an electronic device (e.g., the electronic device 101 of FIG. 1, the processor 120 of FIG. 1, or the electronic device 200 of FIG. 2) may receive a user input for mapping the virtual object 2120 displayed according to content selection to an object 2130 unrelated to content in a real space.

For example, upon receipt of a user input for performing a release action of moving the virtual object 2120 including a panel shape or 3D virtual object shape of a person's simplified head and torso and mapping the virtual object 2120 to a desk as an object 2130 in the real space, the electronic device may fix the virtual object 2120 to the object 2130 in the real space.

Figure 21C:
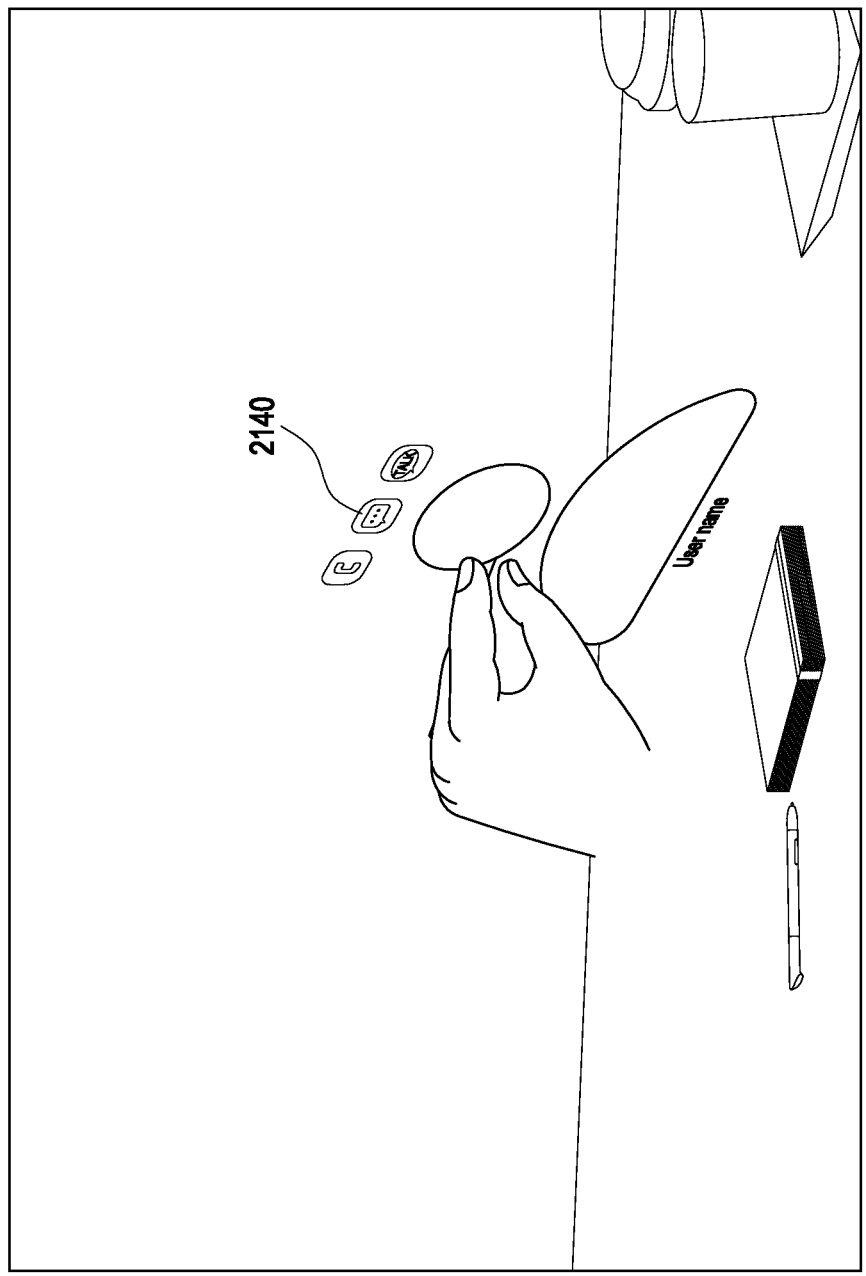
FIG. 21C is a diagram illustrating a 3D virtual object mapped to a real space according to an example embodiment.

FIG. 21C is a diagram illustrating a 3D virtual object mapped to a real space according to an embodiment.

According to an embodiment, referring to FIG. 21C, when a virtual object in the form of a panel or 3D virtual object of a simplified person's head and torso is mapped to an object in a real space, an electronic device (e.g., the electronic device 101 of FIG. 1, the processor 120 of FIG. 1, or the electronic device 200 of FIG. 2) may determine the shape of the virtual object based on the type of an application and the type of the object in the real space.

For example, when content without a thumbnail image is selected on the execution screen of the contact application, and a virtual object related to the selected content is mapped to a desk as an object in the real space, the electronic device may display the virtual object in the form of the panel or 3D virtual object of the simplified person's head and torso displayed according to content selection, as a 3D virtual object. For example, when the virtual object displayed according to the content selection is in the form of a panel, the electronic device may change the virtual object to the form of a 3D virtual object and fix the 3D virtual object to the object in the real space, and when the virtual object displayed according to the content selection is in the form of a 3D virtual object, the electronic device may maintain the shape of the 3D virtual object and fix the 3D virtual object to the object in the real space.

According to an embodiment, the virtual object fixed to the object in the real space may include information 2140 related to a function that may be performed using the selected contact information. For example, the 3D virtual object with the simplified human head and torso may include information (e.g., icon(s)) 2140 representing a phone application, a message application, and/or an SNS application that may be performed using the selected contact, which are displayed around the simplified human head and torso.

According to an embodiment, upon receipt of a user input for selecting one piece of function-related information, the electronic device may display an execution screen of a selected function around the 3D virtual object. For example, upon receipt of a user input for selecting the icon representing the message application, the electronic device may display an execution screen of the message application enabling exchange of messages with the contact around the 3D virtual object.

According to an embodiment, upon occurrence of an event for the selected contact, the 3D virtual object mapped to the object in the real space may be updated.

For example, upon occurrence of an event of receiving a new message from the selected contact, the electronic device may updates the 3D virtual object to display the contents of the new message in the form of a speech bubble around the simplified form of a human head and torso.

Figure 22A:
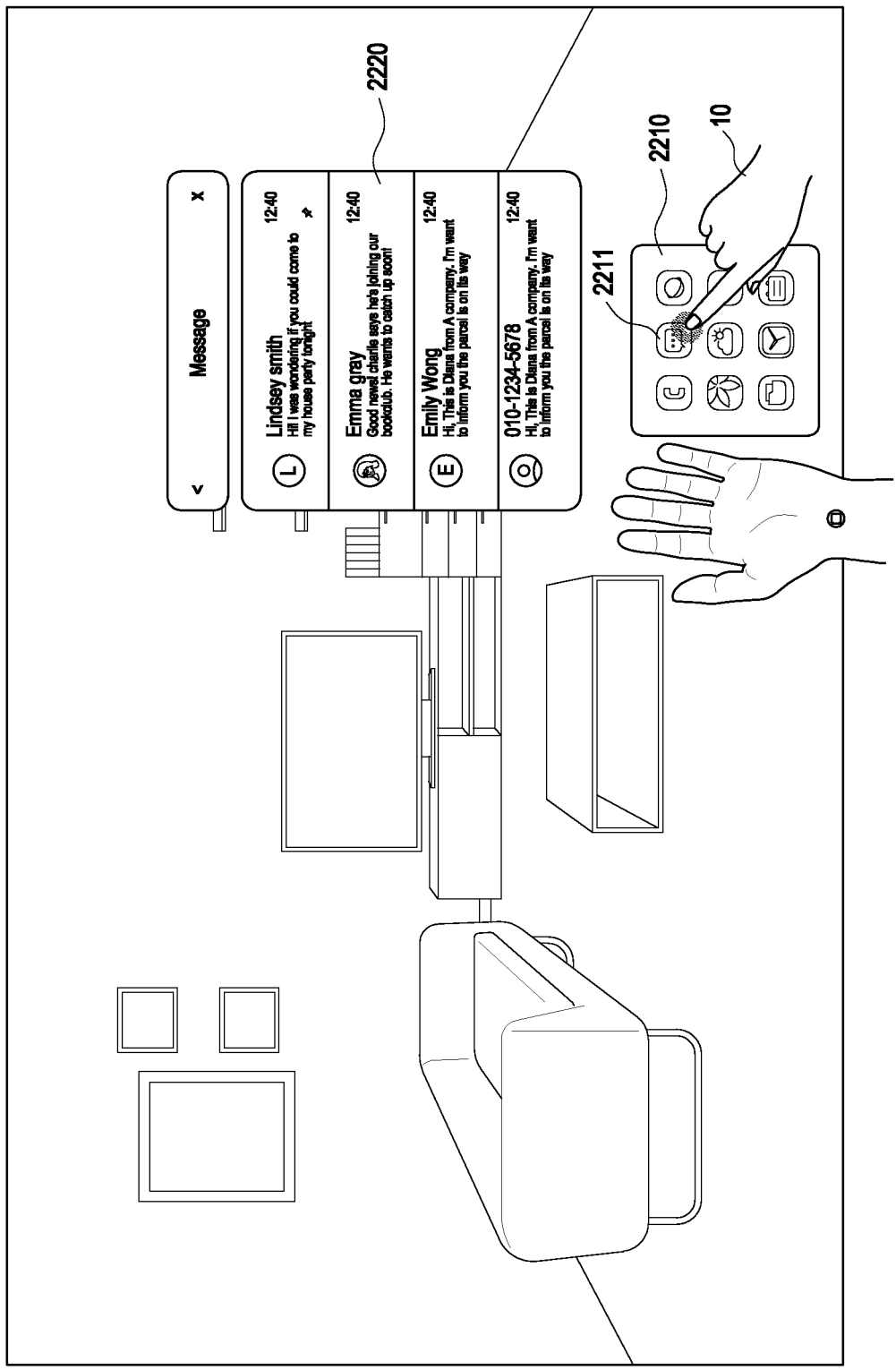
FIG. 22A is a diagram illustrating an operation of displaying an execution screen in a wearable electronic device according to an example embodiment.

FIG. 22A is a diagram illustrating an operation of displaying an execution screen in an electronic device according to an embodiment.

According to an embodiment, referring to FIG. 22A, an electronic device (e.g., the electronic device 101 of FIG. 1, the processor 120 of FIG. 1, or the electronic device 200 of FIG. 2) may display an application list 2210 including a plurality of application icons on a display (e.g., the display module 160 of FIG. 1 or the display member 201 of FIG. 2).

According to an embodiment, upon a receipt of a user input for selecting one icon 2211 from the application list 2210, the electronic device may display an execution screen 2220 of an application corresponding to the selected icon on the display. For example, upon receipt of a hand gesture of the user 10 for selecting the icon 2211 from the application list 2210 through a camera (e.g., the camera module 180 of FIG. 1 or the third camera module 255 of FIG. 3), the electronic device may display the execution screen 2220 of the application on the display (e.g., the display module 160 of FIG. 1 or the display member 201 of FIG. 2).

For example, upon receipt of a user input for selecting the icon 2211 representing a message application from the application list 2210, the electronic device may display the execution screen 2220 of the message application on the display.

Figure 22B:
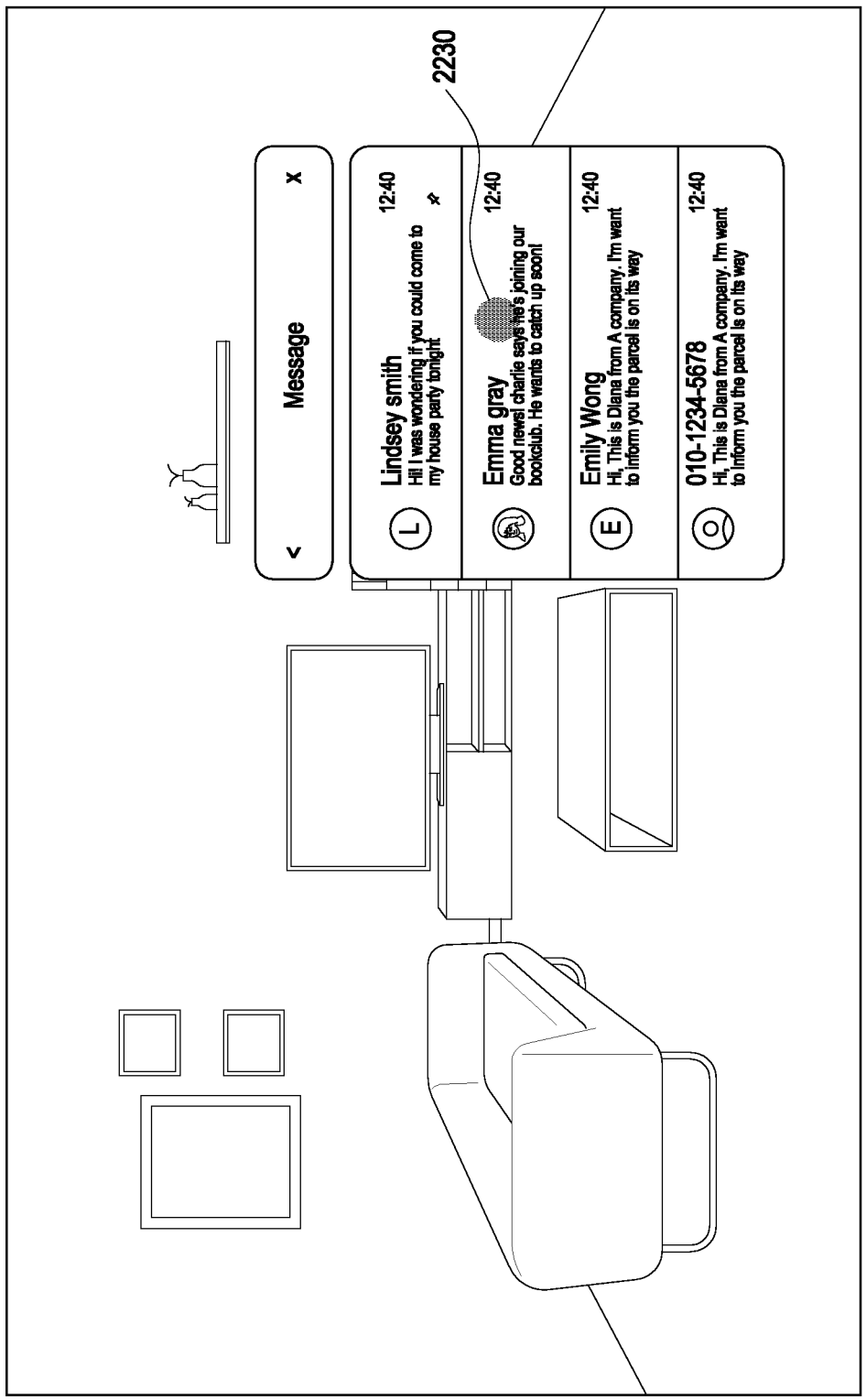
FIG. 22B is a diagram illustrating a content selection operation in a wearable electronic device according to an example embodiment.

FIG. 22B is a diagram illustrating a content selection operation in an electronic device according to an embodiment.

According to an embodiment, referring to FIG. 22B, an electronic device (e.g., the electronic device 101 of FIG. 1, the processor 120 of FIG. 1, or the electronic device 200 of FIG. 2) may receive a user input for displaying messages exchanged with a contact 2230 among a plurality of contacts included in an application execution screen displayed on a display (e.g., the display module 160 of FIG. 1 or the display member 201 of FIG. 2).

Figure 22C:
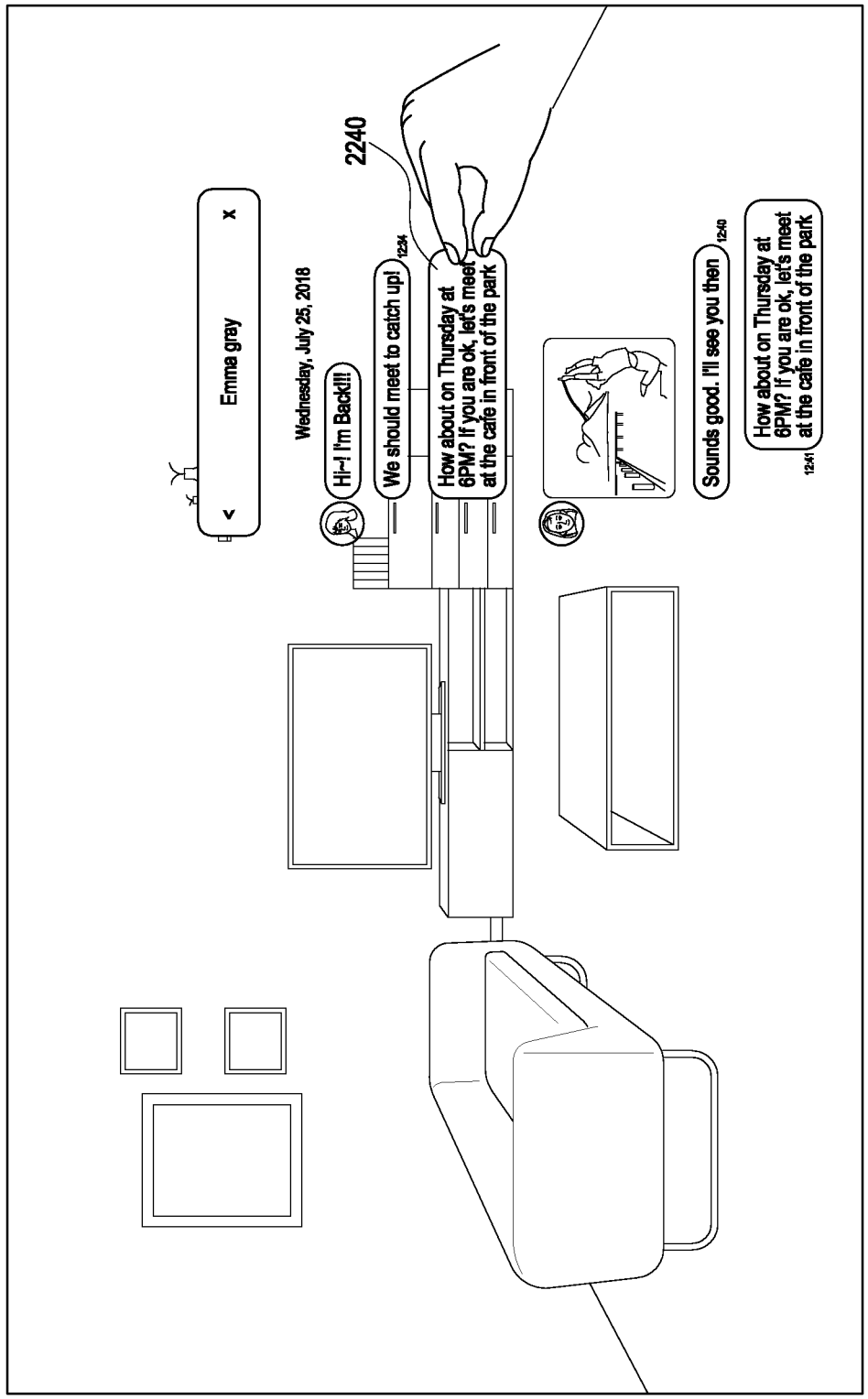
FIG. 22C is a diagram illustrating a content selection operation in a wearable electronic device according to an example embodiment.

FIG. 22C is a diagram illustrating a content selection operation in an electronic device according to an embodiment.

According to an embodiment, referring to FIG. 22C, an electronic device (e.g., the electronic device 101 of FIG. 1, the processor 120 of FIG. 1, or the electronic device 200 of FIG. 2) may receive a user input for selecting a message 2240 from among a plurality of messages exchanged with a selected contact displayed on a display (e.g., the display module 160 of FIG. 1 or the display member 201 of FIG. 2).

For example, the user input for selecting one content may be a gesture input such as a pinch action by which the user picks up the content with a thumb and index finger or a touch action of pressing the content. For example, a gesture input such as a pinch action or a touch action for selecting the specific message 2240 may be received on the execution screen of the message application. According to an embodiment, the gesture input is not limited to the pinch action or the touch action.

According to an embodiment, upon receipt of a gesture input for selecting the content (e.g., message) 2240 from among a plurality of contents included in the execution screen of the application, the electronic device may display a virtual object related to the selected content (e.g., message in FIG. 22C) 2240 on the display.

According to an embodiment, the virtual object displayed according to content selection may be in the form of a panel or a 3D virtual object. According to an embodiment, the shape of the virtual object displayed according to the content selection may be set during manufacture or by a user manipulation. For example, in the case of a panel, the virtual object may have a closed curve including the contents of the selected message 2240. In the case of a 3D virtual object, the virtual object may have a closed curve-shaped panel including the contents of the selected message 2240 and a 3D virtual object in the form of a speech bubble.

Figure 22D:
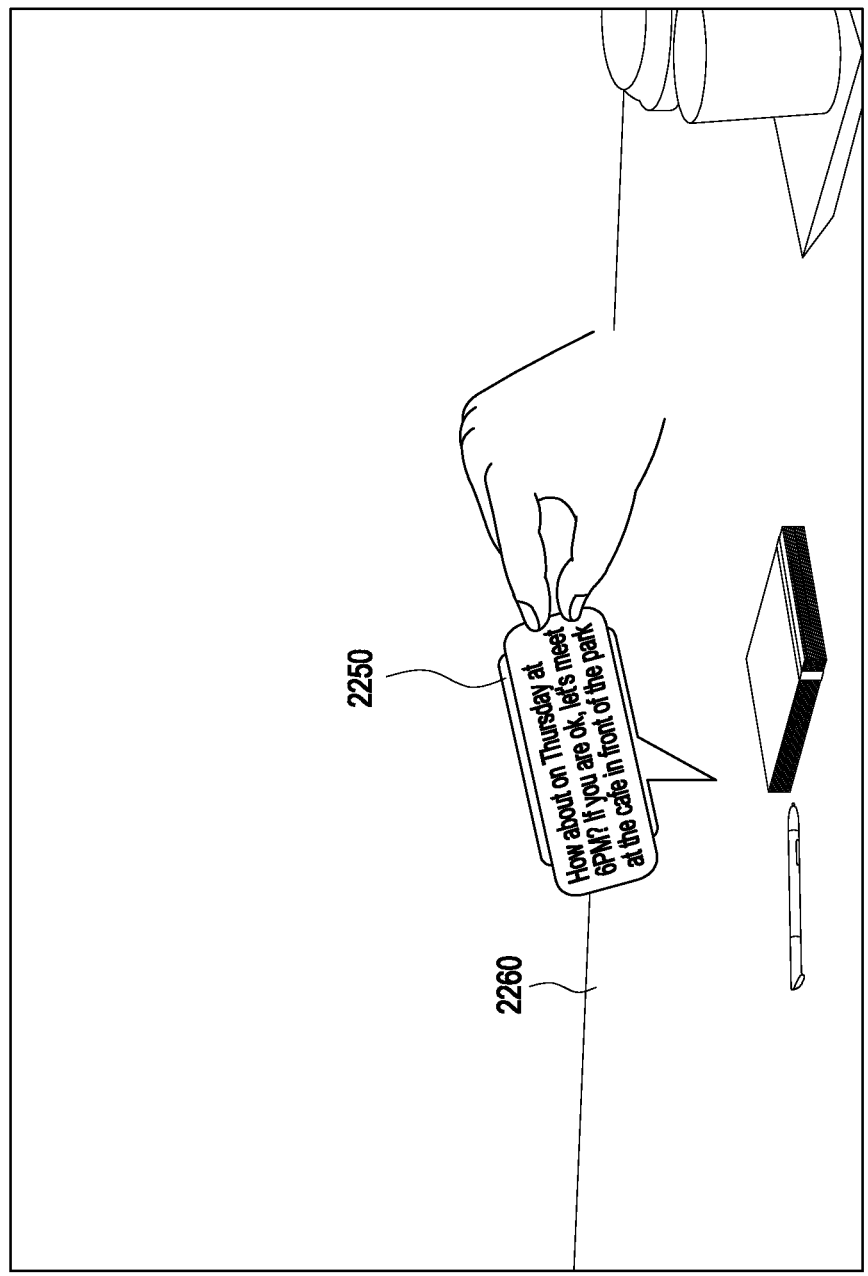
FIG. 22D is a diagram illustrating an operation of mapping a 3D virtual object to a real space according to an example embodiment.

FIG. 22D is a diagram illustrating an operation of mapping a 3D virtual object to a real space according to an embodiment.

According to an embodiment, referring to FIG. 22D, an electronic device (e.g., the electronic device 101 of FIG. 1, the processor 120 of FIG. 1, or the electronic device 200 of FIG. 2) may receive a user input for mapping a virtual object in the form of a panel or a 3D virtual object to an object unrelated to content in a real space.

For example, upon receipt of a user input for performing a release action of moving a virtual object 2250 including the contents of the selected message by a pinch action and mapping the virtual object 2250 to a desk as an object 2260 in the real space, the electronic device may fix the virtual object 2250 to the object 2260 in the real space.

According to an embodiment, when the virtual object 2250 related to a message selected through a pinch action is mapped to the object (e.g., desk in FIG. 22D) 2260 that is an object in the real space, the electronic device may display the virtual object 2250 in the form of a 3D virtual object. For example, when the virtual object including the contents of the message selected through the pinch action, is in the form of a panel, the electronic device may change the panel-shaped virtual object to a 3D virtual object including a speech bubble and fix the 3D virtual object to the object in the real space. When the virtual object including the contents of the message selected through the pinch action, is in the form of a 3D virtual object including a speech bubble, the electronic device may maintain the shape of the 3D virtual object and fix it to the object in the real space.

Figure 22E:
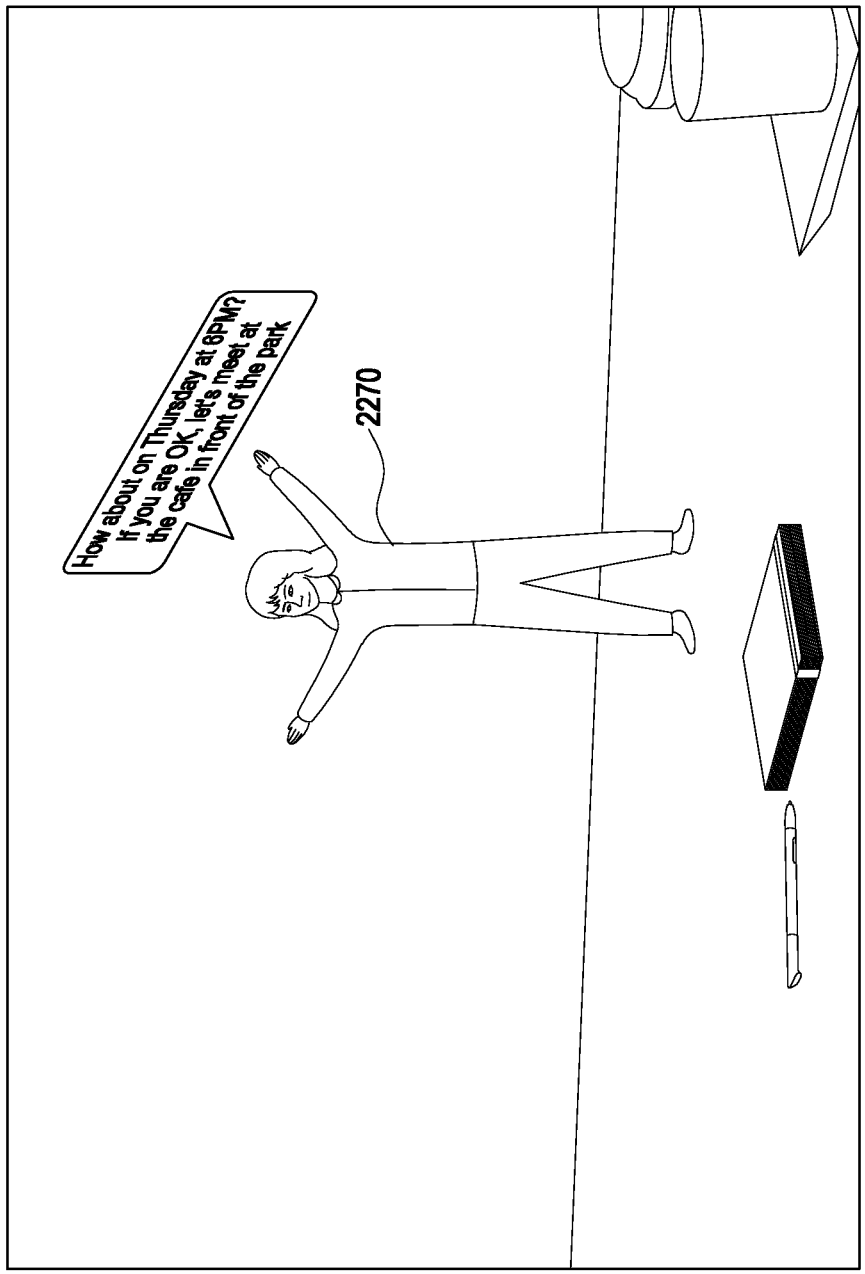
FIG. 22E is a diagram illustrating a 3D virtual object mapped to a real space according to an example embodiment.

FIG. 22E is a diagram illustrating a 3D virtual object mapped to a real space, according to an embodiment.

According to an embodiment, referring to FIG. 22E, when a virtual object including the contents of a message selected by a pinch action is mapped to an object in a real space, an electronic device (e.g., the electronic device 101 of FIG. 1, the processor 120 of FIG. 1, or the electronic device 200 of FIG. 2) may determine the shape of the virtual object based on the type of an application and the type of the object in the real space.

For example, when a message is selected on the execution screen of the message application, and a virtual object related to the selected message is mapped to a desk as an object in the real space, the electronic device may display the virtual object displayed according to the message selection to a 3D virtual object 2270 in the form of an emoji. For example, the 3D virtual object 2270 in the form of the emoji may be a 3D form in which a thumbnail image of a contact who has exchanged the selected message and a body related to the thumbnail image are combined, and include a virtual object in the form of a speech bubble including message contents.

Figure 22F:
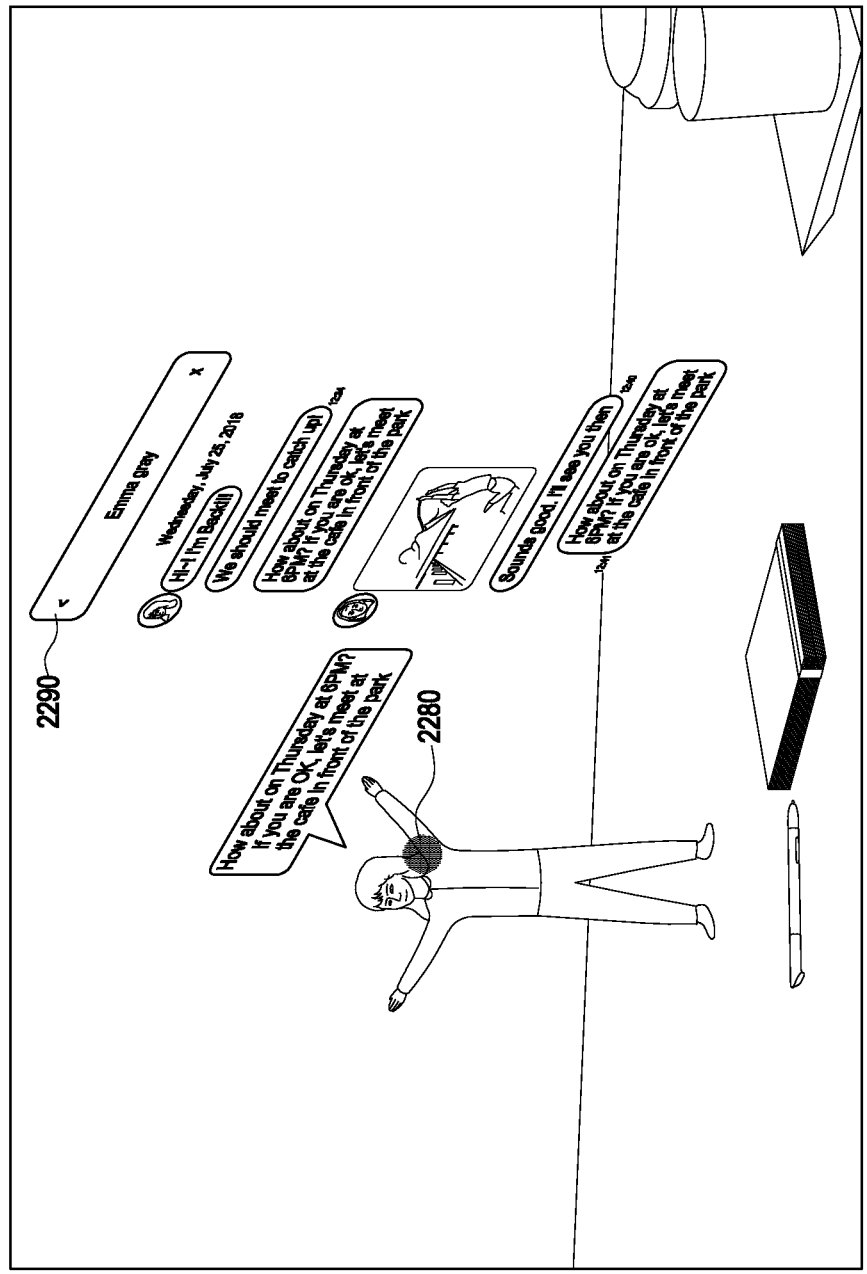
FIG. 22F is a diagram illustrating an operation when a 3D virtual object is selected according to an example embodiment.

FIG. 22F is a diagram illustrating an operation when a 3D virtual object is selected according to an embodiment.

According to an embodiment, referring to FIG. 22F, upon receipt of a user input 2280 for selecting a 3D virtual object in the form of an emoji, an electronic device (e.g., the electronic device 101 of FIG. 1, the processor 120 of FIG. 1, or the electronic device 200 of FIG. 2) may display a message window 2290 including a selected message around the 3D virtual object. For example, upon receipt of the user input 2280 for selecting the 3D virtual object in the form of the emoji, the electronic device 3D may display the message window 2290 including a plurality of messages exchanged with a contact who has transmitted or received the selected message, around the 3D virtual object.

Figure 23A:
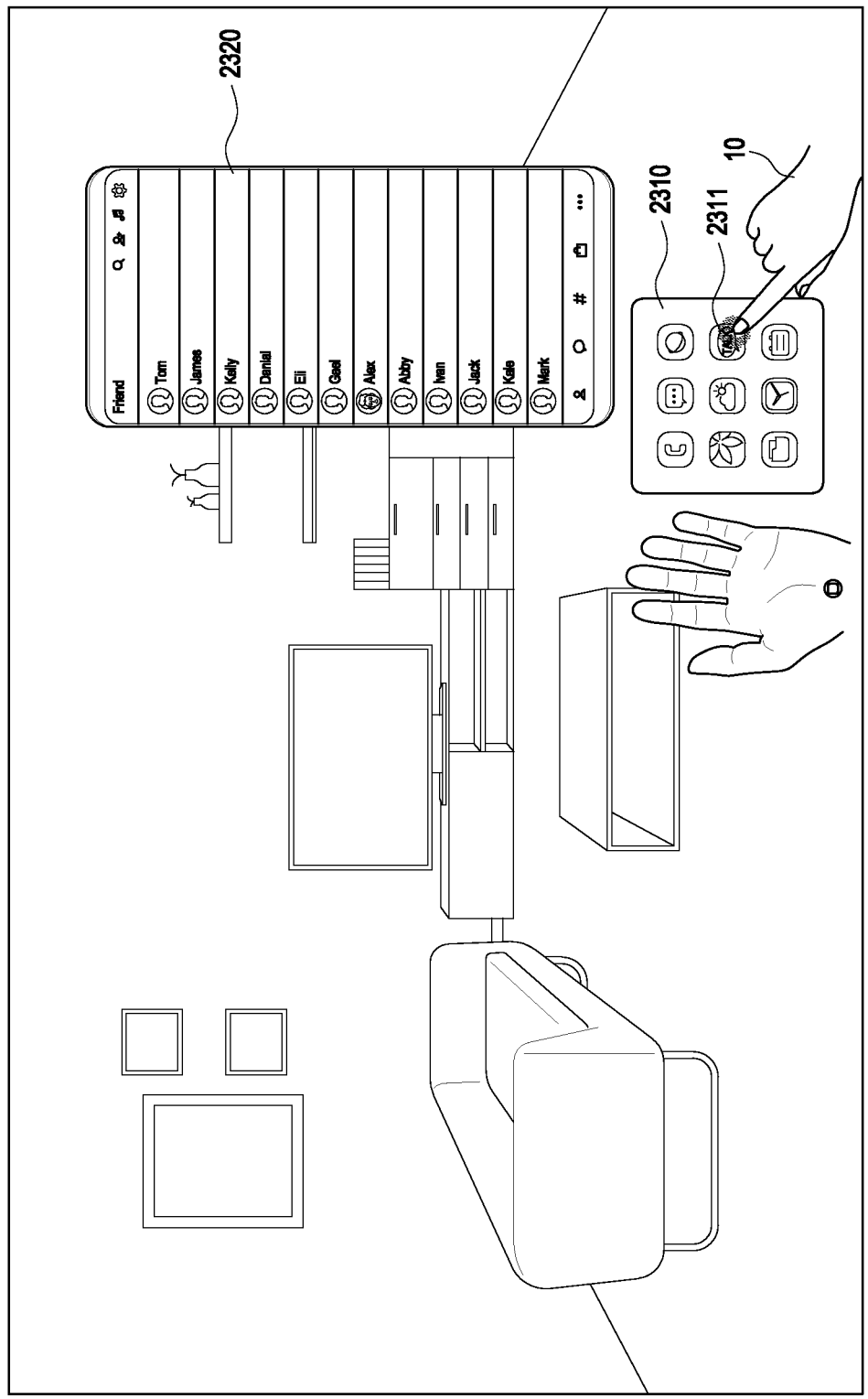
FIG. 23A is a diagram illustrating an operation of displaying an execution screen in a wearable electronic device according to an example embodiment.

FIG. 23A is a diagram illustrating an operation of displaying an execution screen in an electronic device according to an embodiment.

According to an embodiment, referring to FIG. 23A, an electronic device (e.g., the electronic device 101 of FIG. 1, the processor 120 of FIG. 1, or the electronic device 200 of FIG. 2) may display an application list 2310 including a plurality of application icons on a display (e.g., the display module 160 of FIG. 1 or the display member 201 of FIG. 2).

According to an embodiment, upon receipt of a user input (see user hand 10 in FIG. 23A) for selecting one icon 2311 from the application list 2310, the electronic device may display an execution screen 2320 of an application corresponding to the selected icon on the display. For example, upon receipt of a hand gesture of the user for selecting the icon 2311 from the application list 2310 through a camera (e.g., the camera module 180 of FIG. 1 or the third camera module 255 of FIG. 3), the electronic device may display the execution screen 2320 of the application on the display (e.g., the display module 160 of FIG. 1 or the display member 201 of FIG. 2).

For example, upon receipt of a user input for selecting the icon 2311 representing a message application from the application list 2310, the electronic device may display the execution screen 2320 of the message application on the display.

Figure 23B:
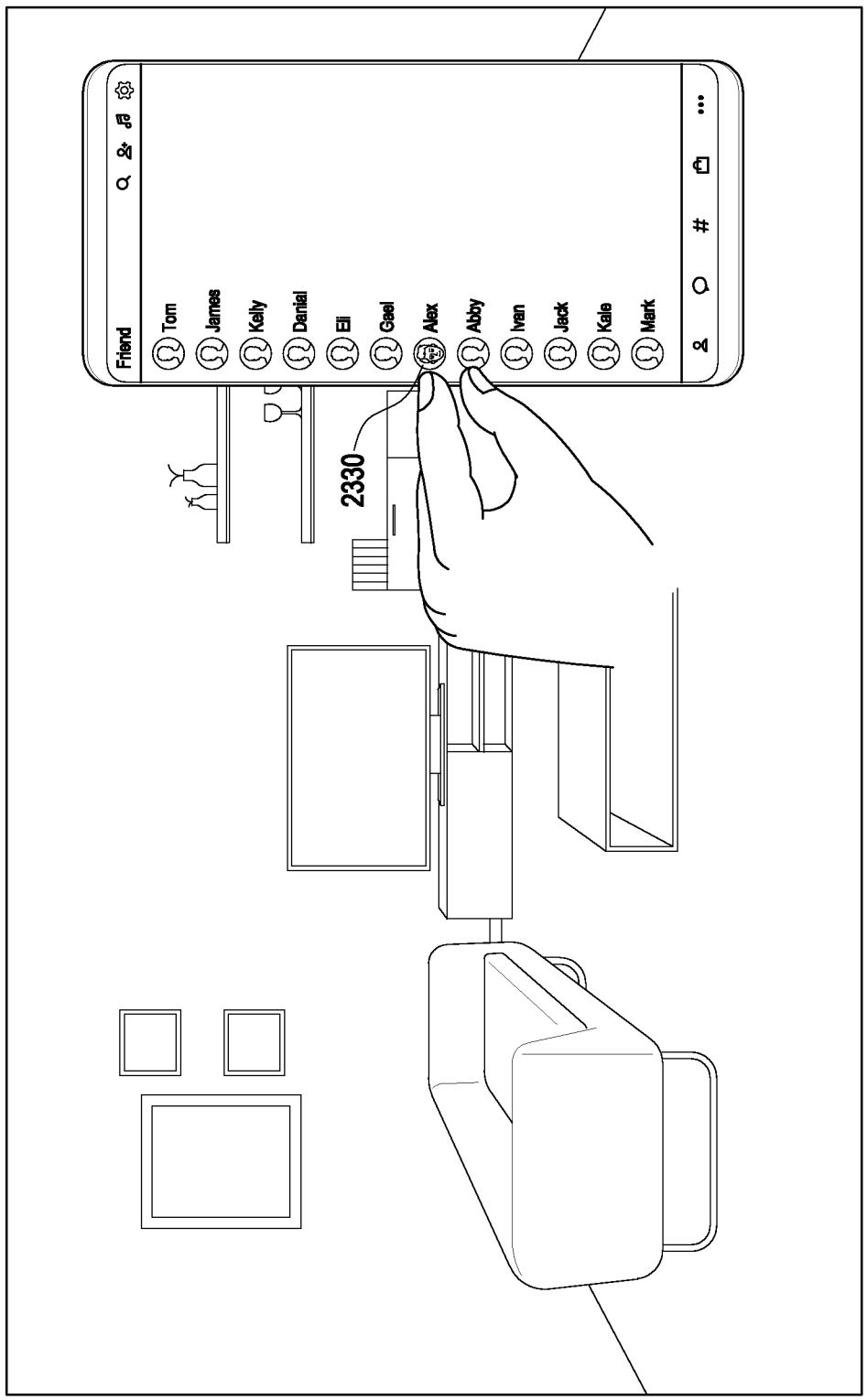
FIG. 23B is a diagram illustrating a content selection operation in a wearable electronic device according to an example embodiment.

FIG. 23B is a diagram illustrating a content selection operation in an electronic device according to an embodiment.

According to an embodiment, referring to FIG. 23B, an electronic device (e.g., the electronic device 101 of FIG. 1, the processor 120 of FIG. 1, or the electronic device 200 of FIG. 2) may receive a user input for selecting a content 2330 from among a plurality of contacts displayed on a display (e.g., the display module 160 of FIG. 1 or the display member 201 of FIG. 2).

For example, the user input for selecting one content may be a gesture input such as a pinch action by which the user picks up the content with a thumb and index finger or a touch action of pressing the content. For example, a gesture input such as a pinch action or a touch action for selecting a content (e.g., specific contact 2330 in FIG. 23B) may be received on the execution screen of the message application. According to an embodiment, the gesture input is not limited to the pinch action or the touch action.

According to an embodiment, upon receipt of a gesture input for selecting the content 2330 from among the plurality of contents included in the execution screen of the application, the electronic device may display a virtual object related to the selected content 2330 on the display.

According to an embodiment, the virtual object displayed according to the content selection may be in the form of a panel or a 3D virtual object. According to an embodiment, the shape of the virtual object displayed according to the content selection may be set during manufacture or by a user manipulation. For example, in the case of a panel, the virtual object may be a thumbnail image of the selected contact 2330, whereas in the case of a 3D virtual object, the virtual object may include a thumbnail image of the selected contact 2330 and a body-shaped 3D virtual object.

Figure 23C:
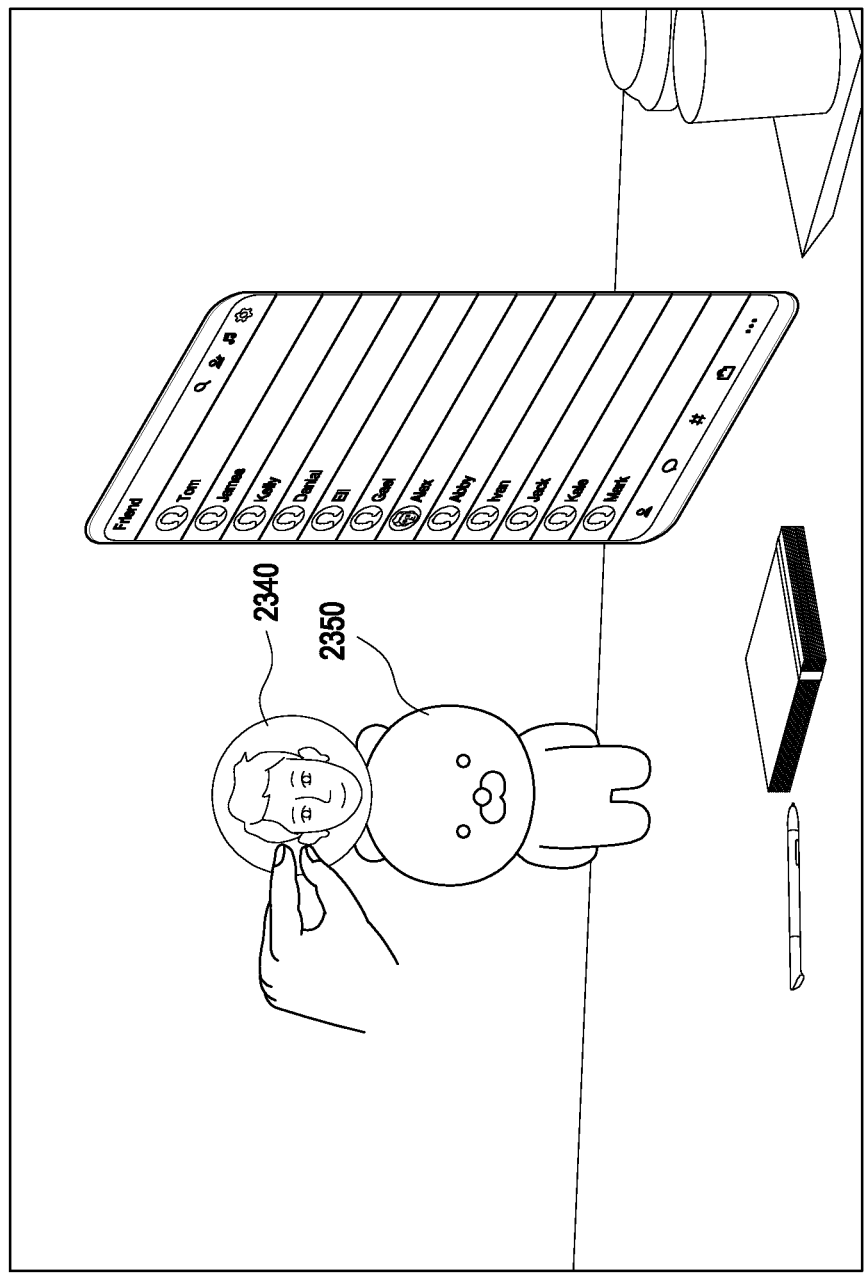
FIG. 23C is a diagram illustrating an operation of mapping a virtual object to a real space according to an example embodiment.

FIG. 23C is a diagram illustrating an operation of mapping a virtual object to a real space according to an embodiment.

According to an embodiment, referring to FIG. 23C, an electronic device (e.g., the electronic device 101 of FIG. 1, the processor 120 of FIG. 1, or the electronic device 200 of FIG. 2) may receive a user input for mapping a virtual object in the form of a panel or a 3D virtual object to an object related to content in a real space.

For example, upon receipt of a user input for performing a release information for moving a virtual object 2340 including a thumbnail image of a contact selected by a pinch action and a body-shaped 3D virtual object and mapping the virtual object 2340 to a figure as an object 2350 in the real space, the electronic device may fix the virtual object 2340 to the object 2350 in the real space.

Figure 23D:
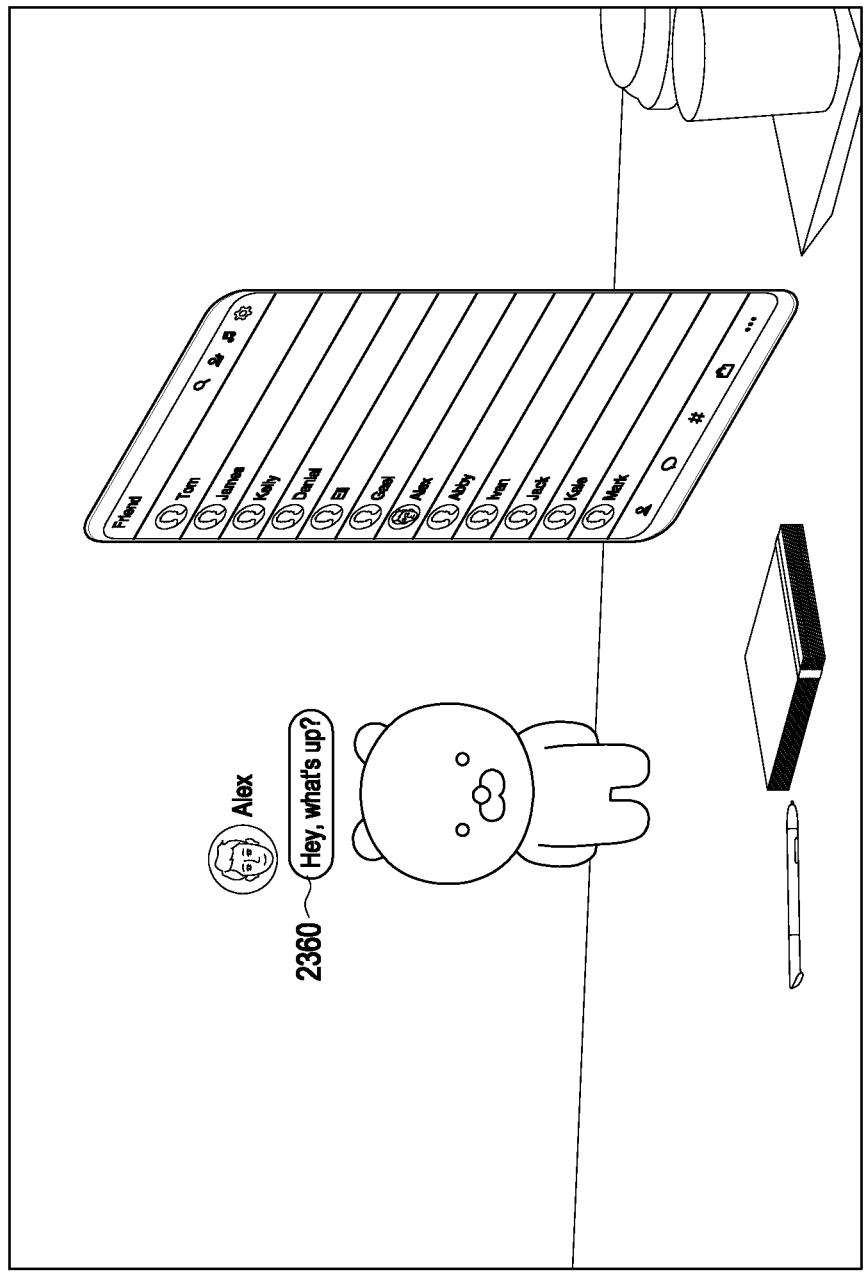
FIG. 23D is a diagram illustrating a virtual object mapped to a real space according to an example embodiment.

FIG. 23D is a diagram illustrating a virtual object mapped to a real space according to an embodiment.

According to an embodiment, referring to FIG. 23D, when a virtual object including a thumbnail image of a contact selected by a pinch action and a body-shaped 3D virtual object is mapped to an object in a real space, an electronic device (e.g., the electronic device 101 of FIG. 1, the processor 120 of FIG. 1, or the electronic device 200 of FIG. 2) may determine the shape of the virtual object based on the type of an application and the type of the object in the real space.

For example, when a content is selected on the execution screen of the message application, and a virtual object related to the selected contact is mapped to a figure as an object in a real space, the electronic device may display the virtual object displayed according to the contact selection to a panel in the form of a speech bubble or a 3D virtual object 2360 and display the panel or the 3D virtual object 2360 around the figure. According to an embodiment, the panel or the 3D virtual object 2360 may further include information about the selected contact, such as a thumbnail image and a name.

Figure 23E:
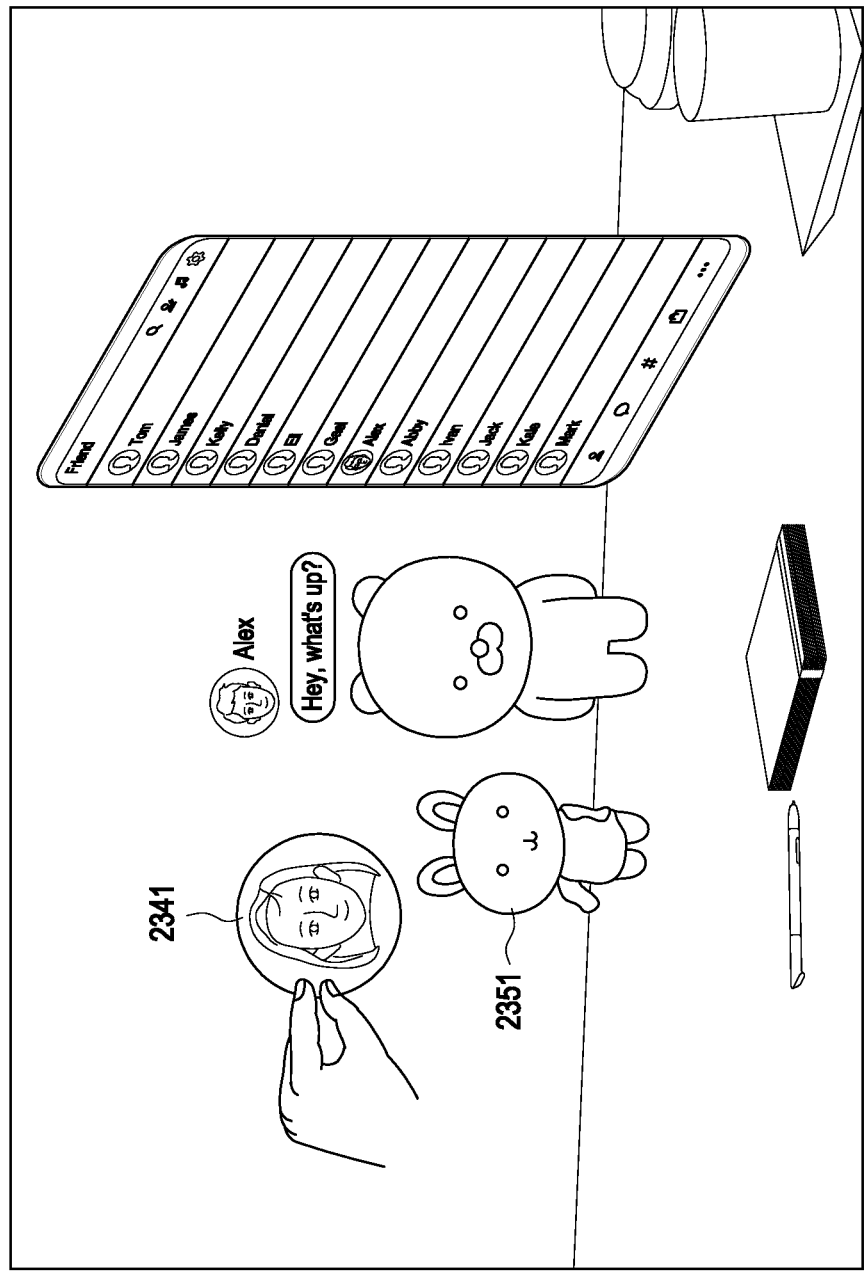
FIG. 23E is a diagram illustrating an operation of mapping a virtual object to a real space according to an example embodiment.

FIG. 23E is a diagram illustrating an operation of mapping a virtual object to a real space according to an embodiment.

According to an embodiment, referring to FIG. 23E, an electronic device (e.g., the electronic device 101 of FIG. 1, the processor 120 of FIG. 1, or the electronic device 200 of FIG. 2) may receive a user input for additionally selecting another contact on the execution screen of the message application and mapping the selected contact to another object in the real space.

With one selected contact mapped to one figure in the real space, the electronic device may map the selected other contact to another figure in the real space.

For example, upon receipt of a user input for performing a release action for moving a virtual object 2341 in the form of a panel or a 3D virtual object, which is related to the contact selected by a pinch action, and mapping the virtual object 2341 to another figure as an object 2351 in the real space, the electronic device may fix the virtual object 2341 to the object 2351 in the real space.

Figure 23F:
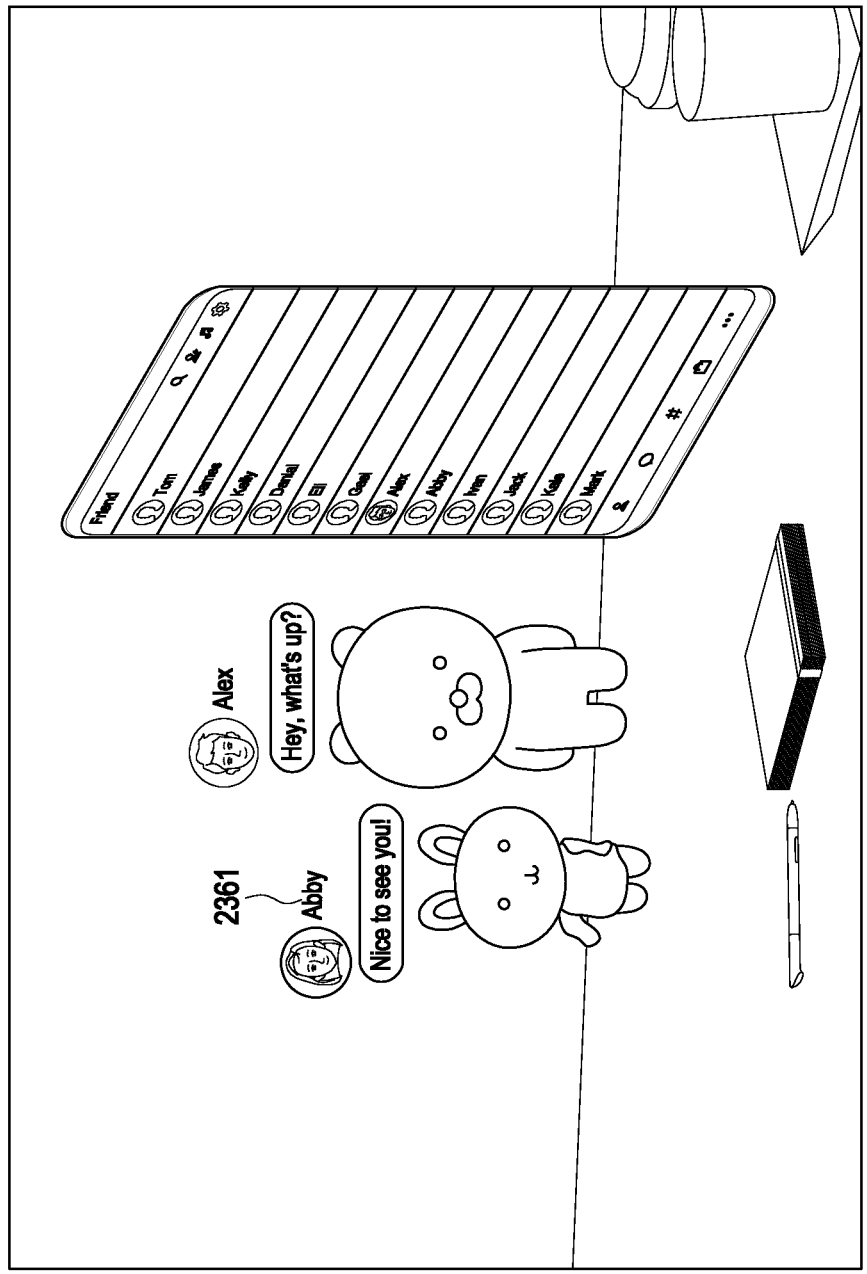
FIG. 23F is a diagram illustrating a virtual object mapped to a real space according to an example embodiment.

FIG. 23F is a diagram illustrating a virtual object mapped to a real space according to an embodiment.

According to an embodiment, referring to FIG. 23F, when a contact is selected on the execution screen of the message application, and a virtual object related to the selected contact is mapped to a figure as an object in a real space, the electronic device may change the virtual object displayed according to the contact selection to a panel in the form of a speech bubble or a 3D virtual object 2361 and display the panel or the 3D virtual object 2361 around the figure. According to an embodiment, the panel or the 3D virtual object 2361 may further include information about the selected contact, such as a thumbnail image and a name.

According to an embodiment, the electronic device may identify an attribute of the object in the real space through a camera (e.g., the camera module 180 of FIG. 1 or the third camera module 255 of FIG. 3), and determine an attribute of the panel or the 3D virtual object 2361 based on the attribute of the object in the real space. For example, the electronic device may identify at least one of shape, color, or size, which is an attribute of the figure in the real space, through the camera, and select at least one of color, font, or design, which is an attribute of the panel or the 3D virtual object 2361.

Figure 24A:
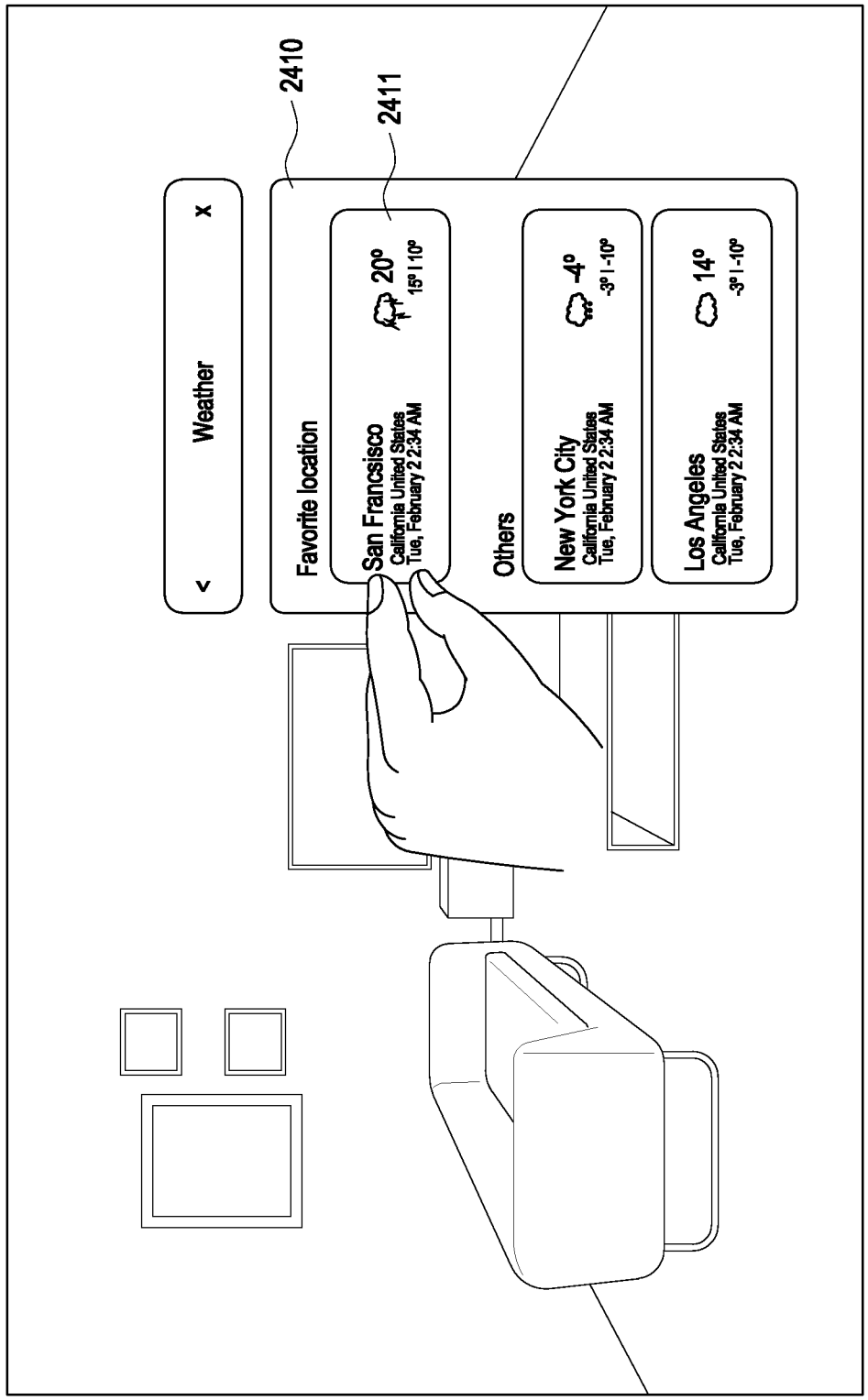
FIG. 24A is a diagram illustrating an operation of displaying an execution screen in a wearable electronic device according to an example embodiment.

FIG. 24A is a diagram illustrating an operation of displaying an execution screen in an electronic device according to an embodiment.

According to an embodiment, referring to FIG. 24A, an electronic device (e.g., the electronic device 101 of FIG. 1, the processor 120 of FIG. 1, or the electronic device 200 of FIG. 2) may receive a user input for selecting the weather 2411 of one city from among the weathers of a plurality of cities included in an execution screen 2410 of a weather application displayed on a display (e.g., the display module 160 of FIG. 1 or the display member 201 of FIG. 2). For example, the user input for selecting the weather 2411 of the city from among the weathers of the plurality of cities may be a gesture input such as a pinch action by which the user picks up content with a thumb and index finger or a touch action of pressing the content. According to an embodiment, the gesture input is not limited to the pinch action or the touch action.

According to an embodiment, upon receipt of a gesture input for the weather 2411 of the city from among the weathers of the plurality of cities included in the execution screen of the weather application, the electronic device may display a virtual object related to the weather 2411 of the selected city on the display.

According to an embodiment, the virtual object displayed according to content selection may be in the form of a panel or a 3D virtual object. According to an embodiment, the shape of the virtual object displayed according to the content selection may be set during manufacture or by a user manipulation. For example, in the case of a panel, the virtual object may have a closed curve including information about the weather 2411 of the selected city. In the case of a 3D virtual object, the virtual object may have a closed curve-shaped panel including the information about the weather 2411 of the selected city and a 3D virtual object related to the weather.

Figure 24B:
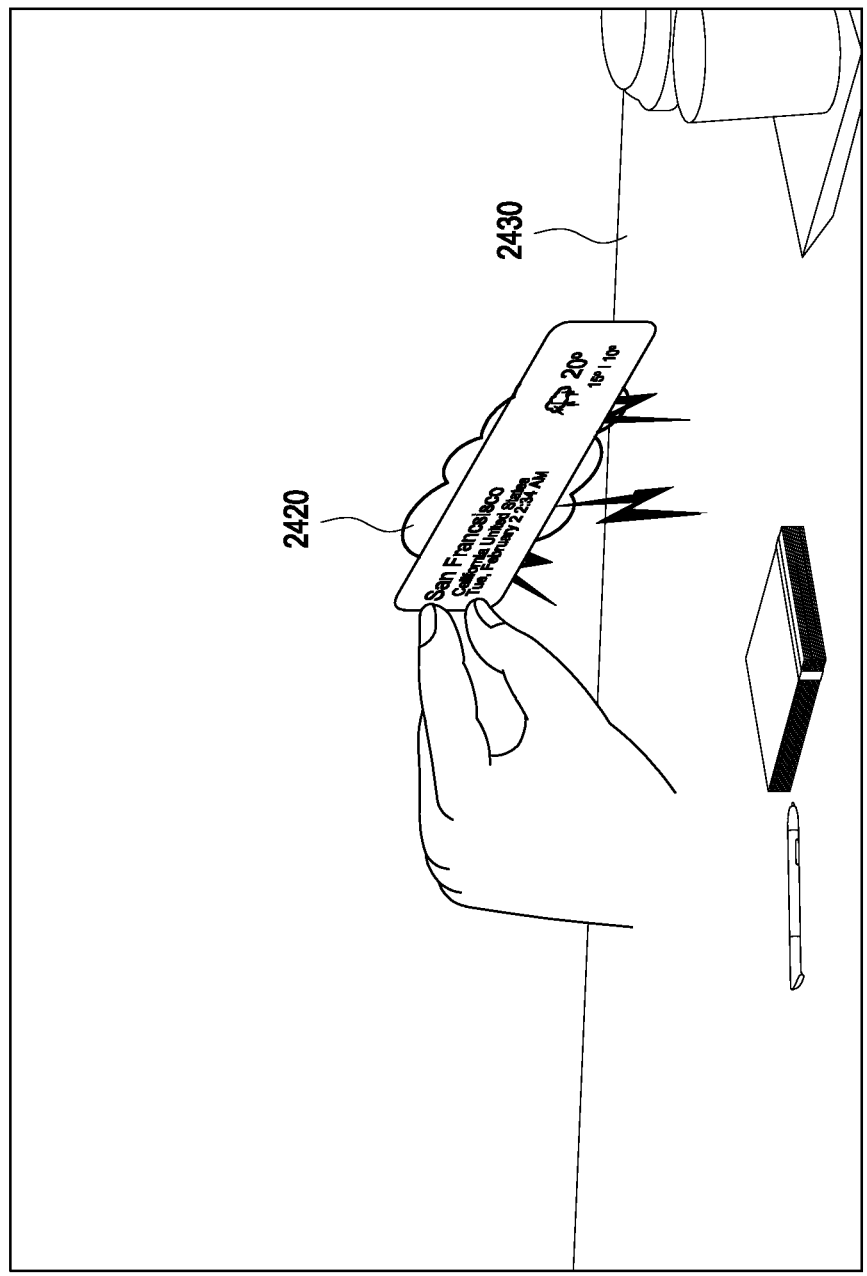
FIG. 24B is a diagram illustrating an operation of mapping a virtual object to a real space according to an example embodiment.

FIG. 24B is a diagram illustrating an operation of mapping a virtual object to a real space according to an embodiment.

According to an embodiment, referring to FIG. 24B, an electronic device (e.g., the electronic device 101 of FIG. 1, the processor 120 of FIG. 1, or the electronic device 200 of FIG. 2) may receive a user input for mapping a virtual object in the form of a panel or a 3D virtual object to an object unrelated to content in a real space.

For example, upon receipt of a user input for performing a release action of moving a virtual object 2420 including the panel including the weather information selected by a pinch action and the 3D virtual object related to the weather and mapping the virtual object 2420 to a desk as an object 2430 in the real space, the electronic device may fix the virtual object 2420 to the object 2430 in the real space.

Figure 24C:
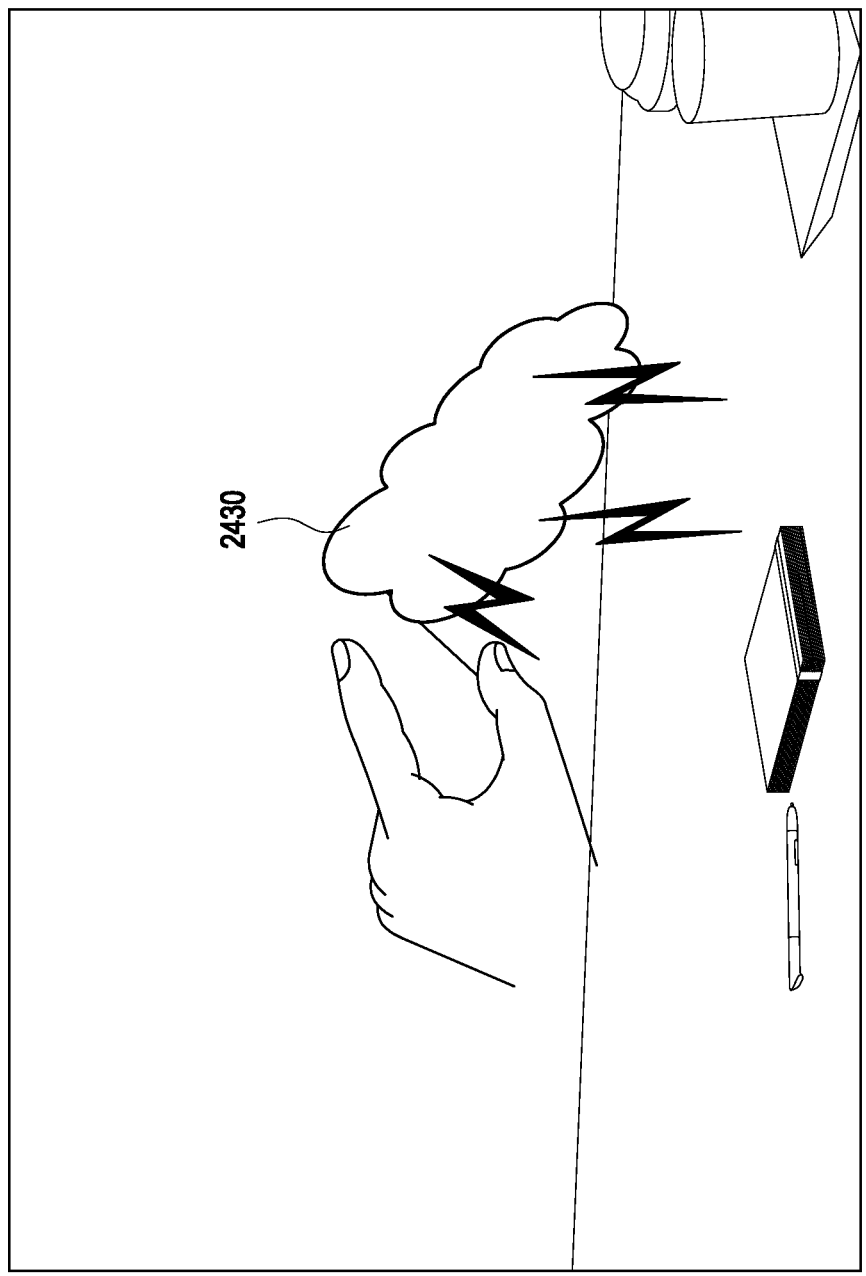
FIG. 24C is a diagram illustrating an operation of mapping a 3D virtual object to a real space according to an example embodiment.

FIG. 24C is a diagram illustrating an operation of mapping a 3D virtual object to a real space.

According to an embodiment, when a virtual object related to a message selected by a pinch action is released on a desk as an object in a real space, an electronic device (e.g., the electronic device 101 of FIG. 1, the processor 120 of FIG. 1, or the electronic device 200 of FIG. 2) may display the virtual object in the form of a 3D virtual object 2430. For example, when a virtual object related to weather information of a city selected by a pinch action is in the form of a panel, the electronic device may change the virtual object to a 3D virtual object related to the weather information of the selected city and fix the 3D virtual object to an object in a real space, whereas when the virtual object related to the weather information of the city selected by the pinch action is in the form of a 3D virtual object, the electronic device may maintain the 3D virtual object and fix the 3D virtual object to the object in the real space.

According to an embodiment, upon occurrence of an event in which the weather of the selected city is changed, the electronic device may update the 3D virtual object fixed to the object in the real space to a 3D virtual object related to the changed weather.

Figure 25A:
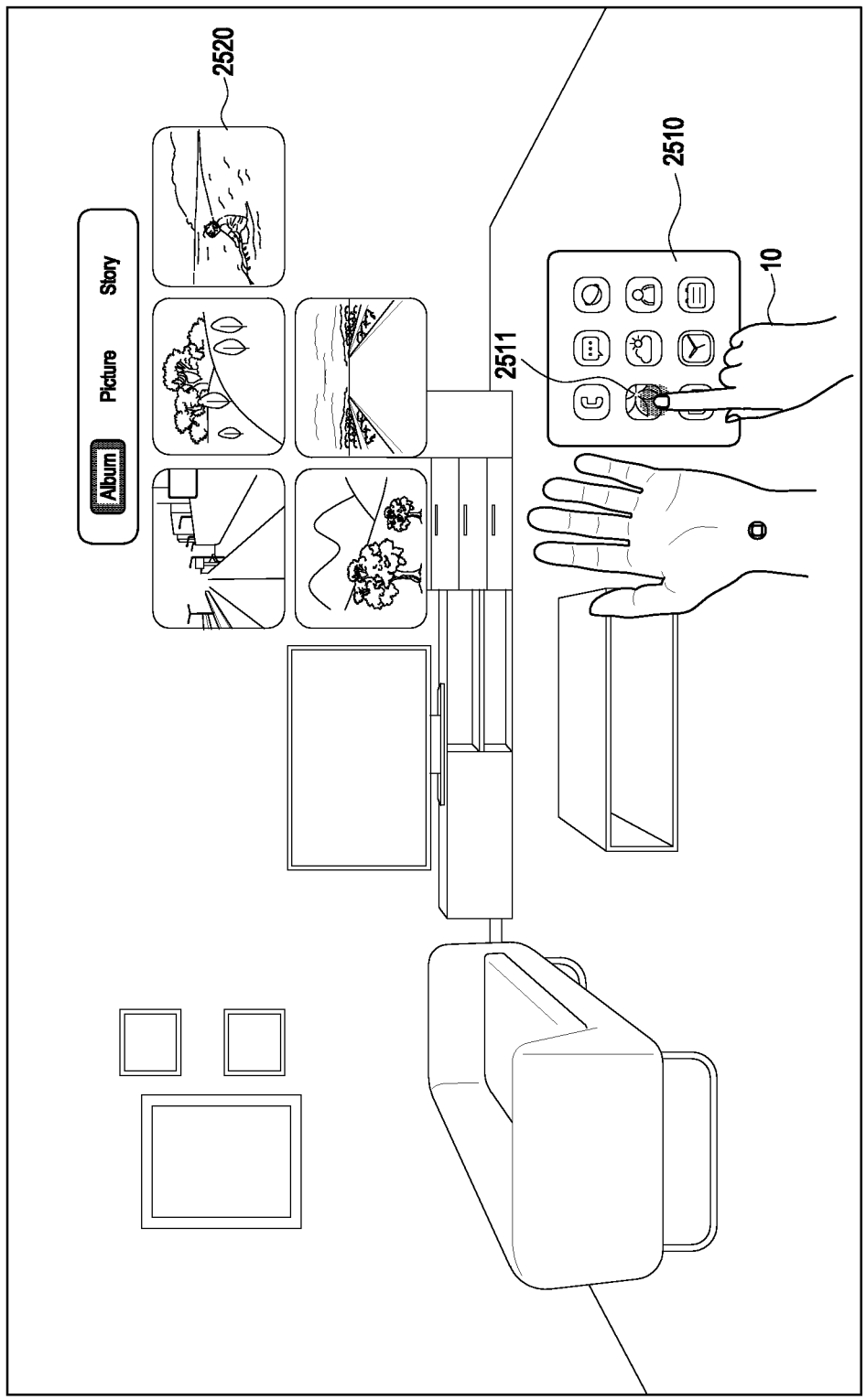
FIG. 25A is a diagram illustrating an operation of displaying an execution screen in a wearable electronic device according to an example embodiment.

FIG. 25A is a diagram illustrating an operation of displaying an execution screen of an electronic device according to an embodiment.

According to an embodiment, referring to FIG. 25A, an electronic device (e.g., the electronic device 101 of FIG. 1, the processor 120 of FIG. 1, or the electronic device 200 of FIG. 2) may display an application list 2510 including a plurality of application icons on a display (e.g., the display module 160 of FIG. 1 or the display member 201 of FIG. 2).

According to an embodiment, upon a receipt of a user input for selecting one icon 2511 from the application list 2510, the electronic device may display an execution screen 2520 of an application corresponding to the selected icon on the display. For example, upon receipt of a hand gesture of the user 10 for selecting the icon 2511 from the application list 2510 through a camera (e.g., the camera module 180 of FIG. 1 or the third camera module 255 of FIG. 3), the electronic device may display the execution screen 2520 of the application on the display (e.g., the display module 160 of FIG. 1 or the display member 201 of FIG. 2).

For example, upon receipt of a user input for selecting the icon 2511 representing a photo application from the application list 2510, the electronic device may display the execution screen 2520 of the photo application on the display.

Figure 25B:
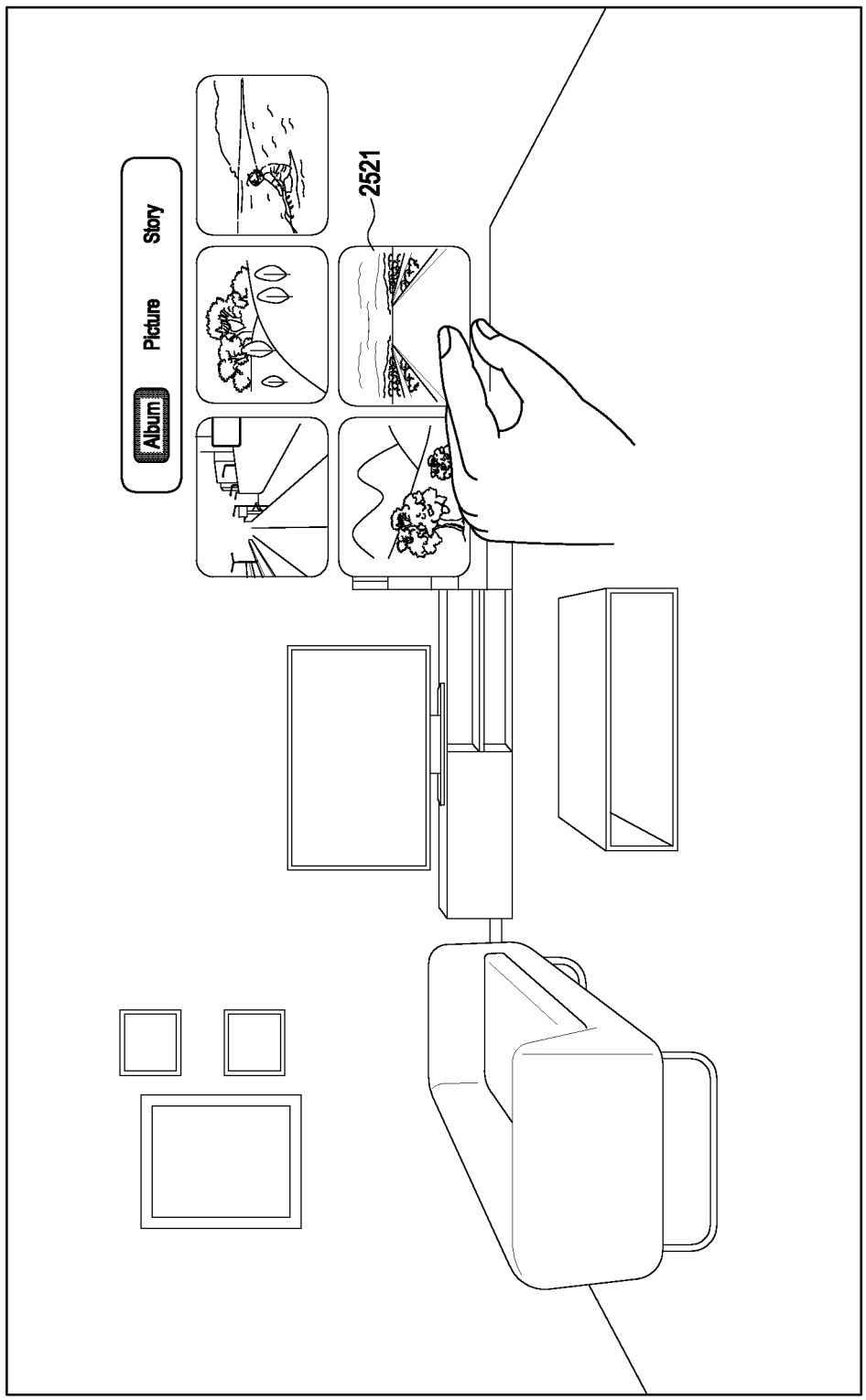
FIG. 25B is a diagram illustrating an operation of mapping a virtual object to a real space according to an example embodiment.

FIG. 25B is a diagram illustrating an operation of mapping a virtual object to a real space in an electronic device according to an embodiment.

According to an embodiment, referring to FIG. 25B, an electronic device (e.g., the electronic device 101 of FIG. 1, the processor 120 of FIG. 1, or the electronic device 200 of FIG. 2) may receive a user input for selecting a photo 2521 from among a plurality of photos displayed on a display (e.g., the display module 160 of FIG. 1 or the display member 201 of FIG. 2).

For example, the electronic device may receive a gesture input such as a pinch action of selecting the photo 2521 with a thumb and index finger, or a touch action.

According to an embodiment, upon receipt of a gesture input for selecting the photo 2521, the electronic device may display a virtual object related to the selected photo 2521 on the display.

According to an embodiment, the virtual object displayed according to the photo selection may be in the form of a panel or a 3D virtual object. According to an embodiment, the shape of the virtual object displayed according to the content selection may be set during manufacture or by a user manipulation. For example, in the case of a panel, the virtual object may have a closed curve including the selected photo 2521. In the case of a 3D virtual object, the virtual object may have a closed curve-shaped panel including the selected photo 2521 and a 3D virtual object in the form of a picture frame.

Figure 25C:
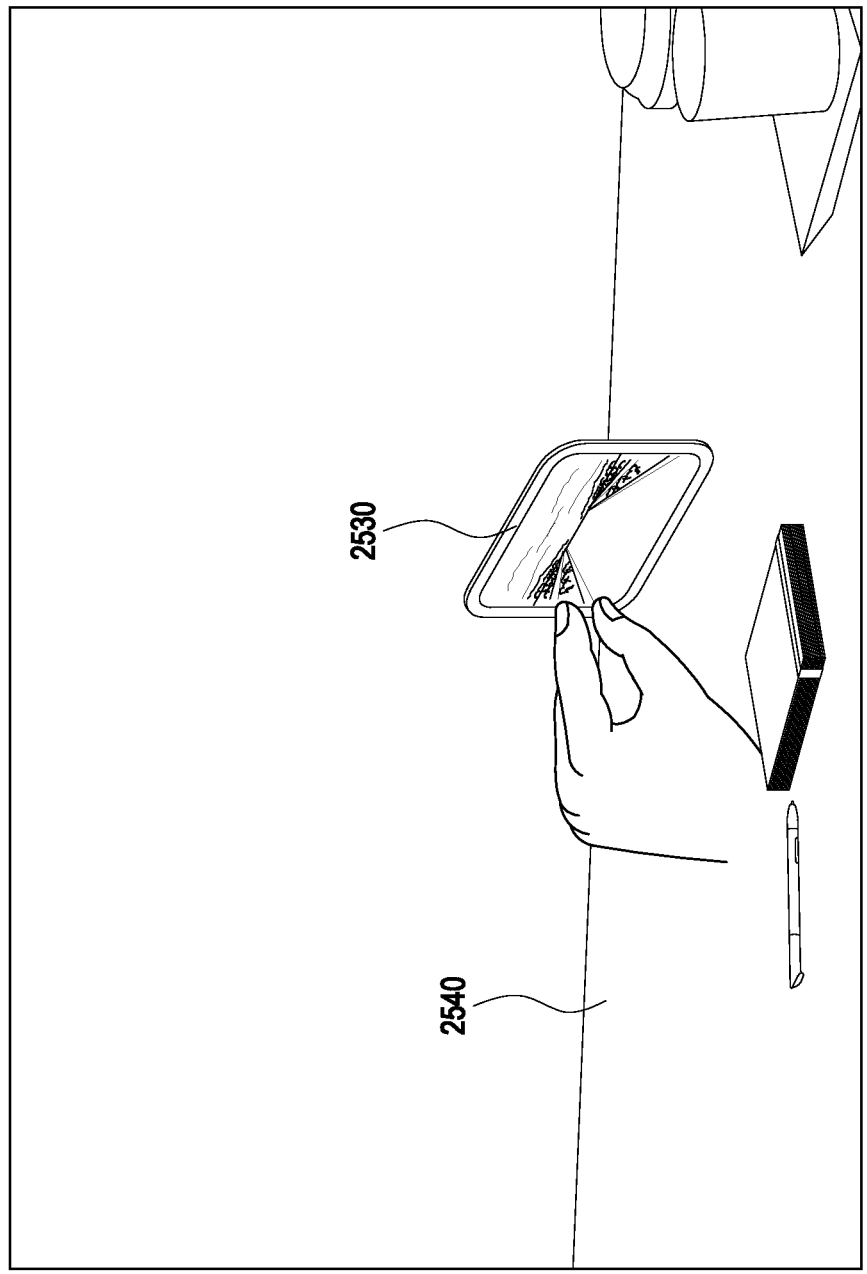
FIG. 25C is a diagram illustrating an operation of mapping a 3D virtual object to a real space according to an example embodiment.

FIG. 25C is a diagram illustrating an operation of mapping a 3D virtual object to a real space according to an embodiment.

According to an embodiment, referring to FIG. 25C, an electronic device (e.g., the electronic device 101 of FIG. 1, the processor 120 of FIG. 1, or the electronic device 200 of FIG. 2) may receive a user input for mapping a virtual object in the form of a panel or a 3D virtual object to an object unrelated to content in a real space.

For example, upon receipt of a user input for performing a release action of moving a virtual object 2530 including a photo selected by a pinch action and mapping the virtual object 2530 to a desk as an object 2540 in the real space, the electronic device may fix the virtual object 2530 to the object 2540 in the real space.

Figure 25D:
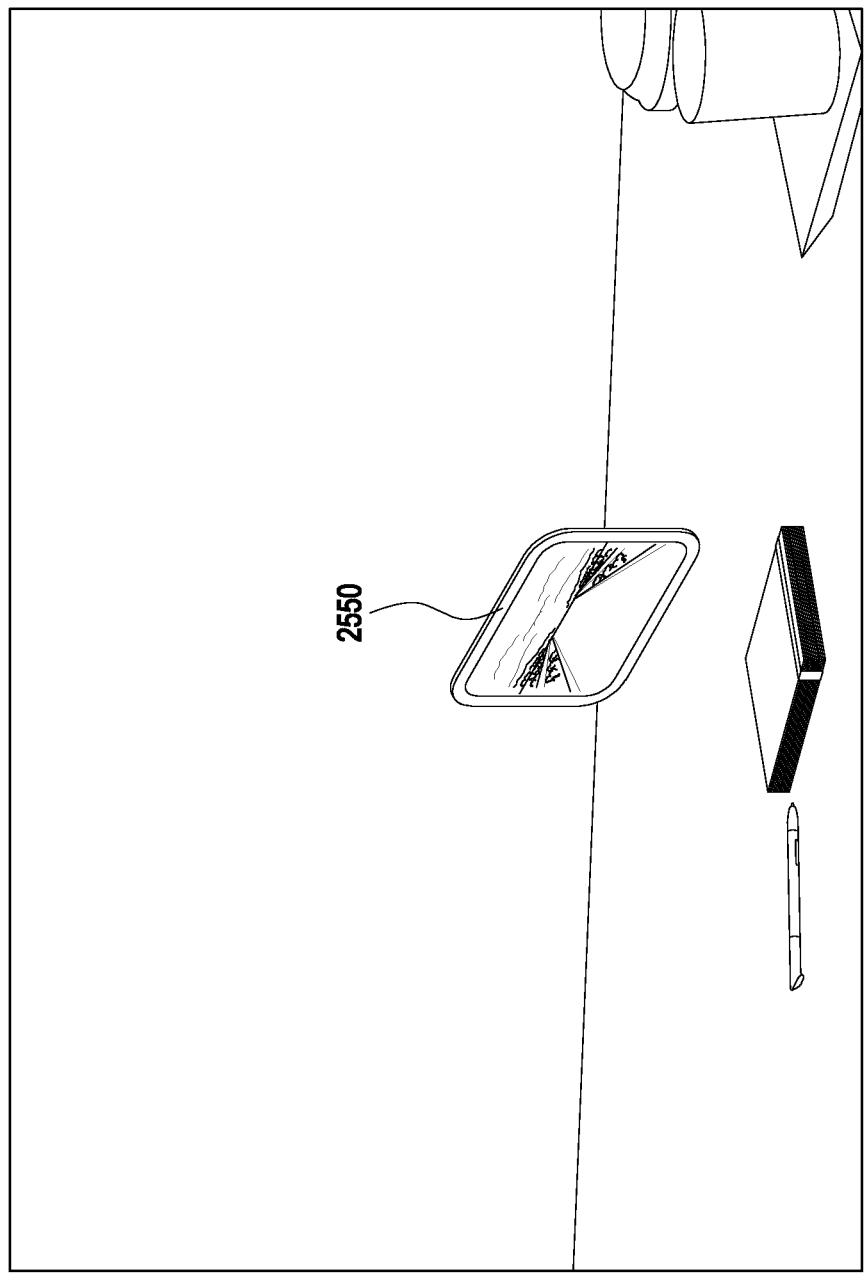
FIG. 25D is a diagram illustrating a 3D virtual object mapped to a real space according to an example embodiment.

FIG. 25D is a diagram illustrating a 3D virtual object mapped to a real space according to an embodiment.

According to an embodiment, referring to FIG. 25D, when a virtual object related to a photo selected by a pinch action is mapped to a desk as an object in a real space, an electronic device (e.g., the electronic device 101 of FIG. 1, the processor 120 of FIG. 1, or the electronic device 200 of FIG. 2) may display the virtual object in the form of a 3D virtual object 2550. For example, when a virtual object including the photo selected by the pinch action is in the form of a panel, the electronic device may change the virtual object to the 3D virtual object 2550 in the form of a picture frame and fixes the 3D virtual object 2550 to the object in the real space, whereas when the virtual object including the selected photo is in the form of a picture frame-shaped 3D virtual object, the electronic device may maintain the 3D virtual object 2550 and fix the 3D virtual object 2550 to the object in the real space.

Figure 26:
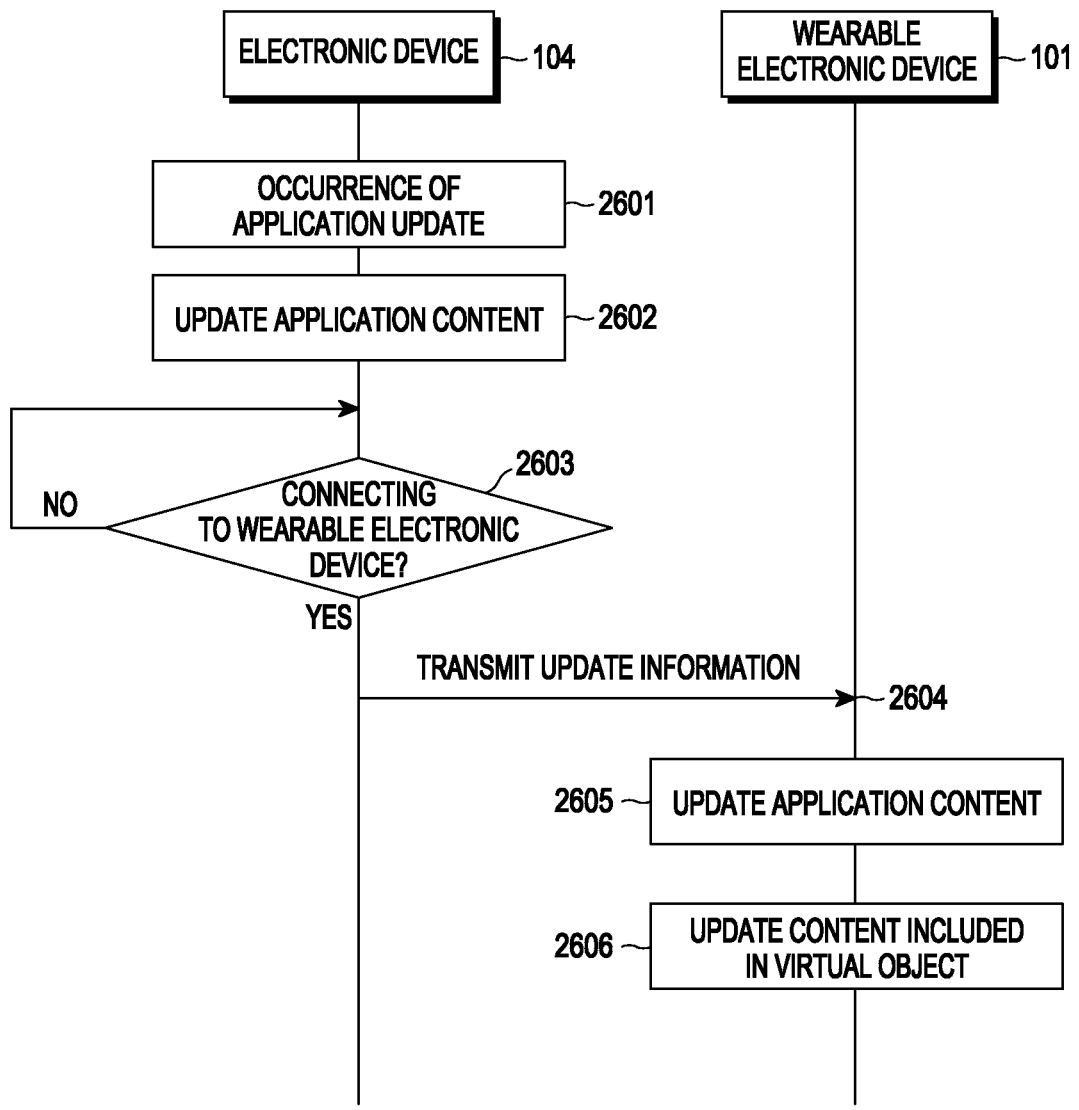
FIG. 26 is a flowchart illustrating content update operations of an external electronic device and a wearable electronic device, when an event occurs in the external electronic device according to an example embodiment.

FIG. 26 is a flowchart illustrating content update operations of an external electronic device and a wearable electronic device, when an event occurs in the external electronic device according to an embodiment.

According to an embodiment, referring to FIG. 26, the electronic device 104 (e.g., the electronic device 104 of FIG. 1) may identify that an application update has occurred in operation 2601. For example, upon occurrence of an event of receiving a new message in a message application, the electronic device 104 may identify that an update has occurred.

According to an embodiment, in operation 2602, the electronic device 104 may update the content of the application based on update information. For example, the electronic device 104 may update the content of the application by displaying the new message of the message application.

According to an embodiment, in operation 2603, the electronic device 104 may determine whether it is being connected to the wearable electronic device 101 (e.g., the electronic device 101 of FIG. 1 or the electronic device 200 of FIG. 2).

According to an embodiment, when the wearable electronic device 101 is not connected (operation 2603—NO), the electronic device 104 may identify again whether the wearable electronic device 101 is connected.

According to an embodiment, when the electronic device 104 is connected to the wearable electronic device 101 (operation 2603—YES), the electronic device 104 may transmit the update information to the wearable electronic device 101 in operation 2604. For example, the electronic device 104 may transmit new message information to the wearable electronic device 101.

According to an embodiment, in operation 2605, the wearable electronic device 101 may update content of an application installed in the wearable electronic device 101 based on the update information received from the electronic device 101. For example, when a message application interworking with the message application of the electronic device 104 is installed in the wearable electronic device 101 as well, the wearable electronic device 101 may update the content of the message application installed in the wearable electronic device 101 based on the received new message information.

According to an embodiment, in operation 2606, the wearable electronic device 101 may update content included in a virtual object. For example, when a virtual object related to the message application is mapped to an object in a real space, the wearable electronic device 101 may update the virtual object mapped to the real space. For example, the wearable electronic device 101 may display a speech bubble including the contents of the new message on the virtual object.

Figure 27:
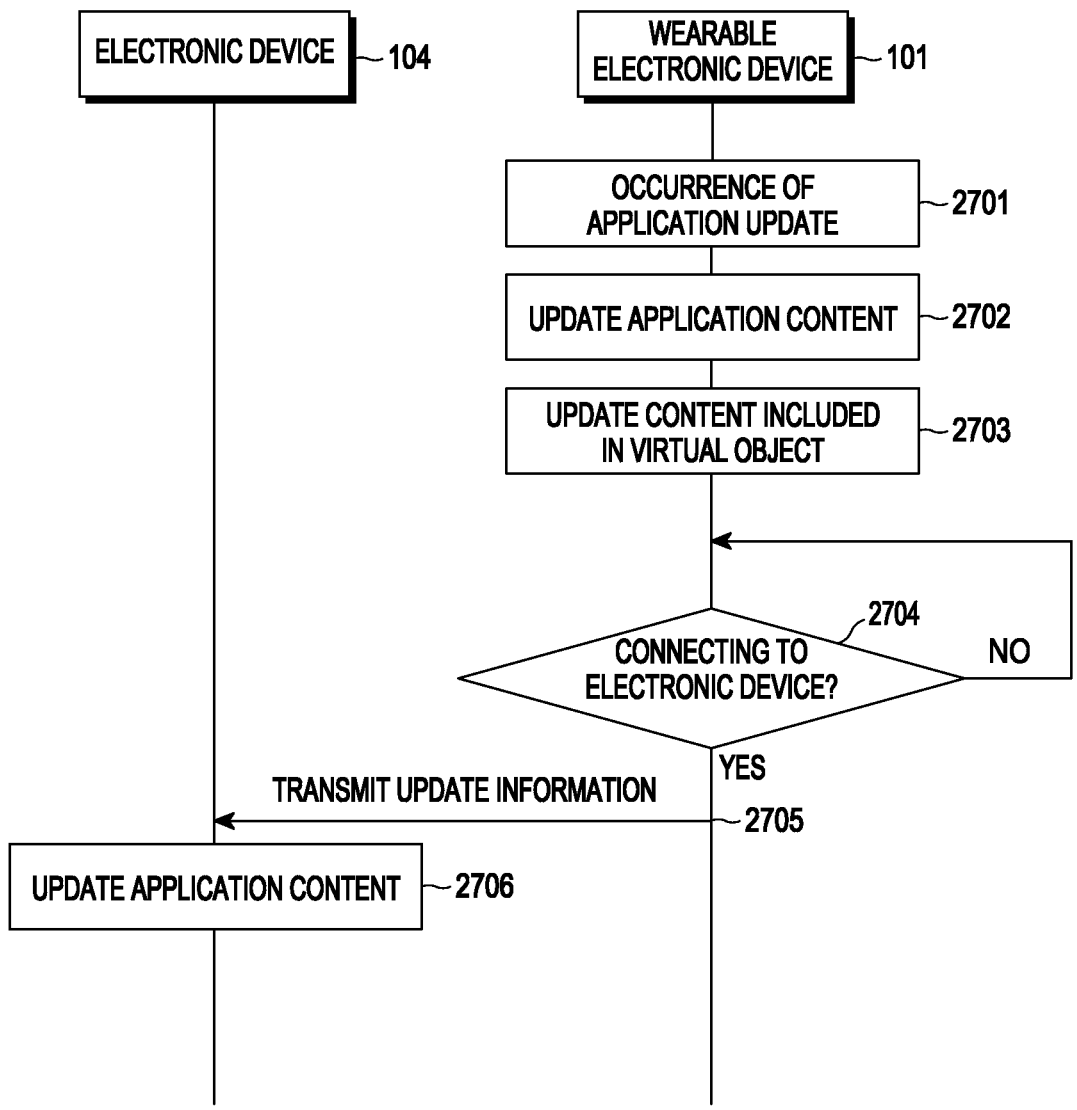
FIG. 27 is a flowchart illustrating content update operations of an external electronic device and a wearable electronic device, when an event occurs in the wearable electronic device according to an example embodiment.

FIG. 27 is a flowchart illustrating content update operations of an external electronic device and a wearable electronic device, when an event occurs in the wearable electronic device according to an embodiment.

According to an embodiment, referring to FIG. 27, the wearable electronic device 101 (e.g., the electronic device 101 of FIG. 1 or the electronic device 200 of FIG. 2) may identify occurrence of an application update in operation 2701. For example, upon occurrence of an event of inputting a new schedule to a calendar application through a gesture by a user, the wearable electronic device 101 may identify that an update has occurred.

According to an embodiment, in operation 2702, the wearable electronic device 101 may update the content of an application based on update information. For example, the wearable electronic device 101 may update the content of the application by storing a new schedule in the calendar application.

According to an embodiment, in operation 2703, the wearable electronic device 101 may update content included in a virtual object. For example, when a virtual object related to the calendar application is mapped to an object in a real space, the wearable electronic device 101 may update the virtual object mapped to the real space. For example, the wearable electronic device 101 may display new schedule information on the virtual object.

According to an embodiment, in operation 2704, the wearable electronic device 101 may identify whether it is being connected to the electronic device 104 (e.g., the electronic device 104 of FIG. 1).

According to an embodiment, when the electronic device 104 is not connected (operation 2704—NO), the wearable electronic device 101 may identify again whether the wearable electronic device 101 is connected to the electronic device 104.

According to an embodiment, when the wearable electronic device 101 is connected to the electronic device 104 (operation 2704—YES), the wearable electronic device 101 may transmit the update information to the electronic device 104 in operation 2705. For example, the wearable electronic device 101 may transmit new schedule information to the electronic device 104.

According to an embodiment, in operation 2706, the electronic device 104 may update the content of an application installed in the electronic device 104 based on the update information received from the wearable electronic device 101. For example, the electronic device 104 may update the content of a calendar application installed in the electronic device 104 based on the received new schedule information.

According to various embodiments, a wearable electronic device (e.g., the electronic device 101 of FIG. 1 or the electronic device 200 of FIG. 2) may include a display (e.g., the display module 160 of FIG. 1 or the display member 201 of FIG. 2), a camera (e.g., the camera module 180 of FIG. 1 or the third camera module 255 of FIG. 2), at least one first sensor (e.g., the first sensor module 176 of FIG. 1 or the second camera module 253 of FIG. 3), and at least one processor (e.g., the processor 120 of FIG. 1) operatively coupled to the display, the camera, and the at least one first sensor. The at least one processor may be configured to display an execution screen of an application on the display, upon receipt of a first user input for selecting one content from among a plurality of contents included in the execution screen of the application through the camera, display a first virtual object related to the selected content on the display, upon receipt of a second user input for mapping the first virtual object to an object included in a real space through the camera, identify a type of the object in the real space through the at least one first sensor, when the type of the object in the real space is related to the selected content or the first virtual object, display on the display a second virtual object related to the selected content based on at least one of a shape, a position, or a size of the object in the real space, and when the type of the object in the real space is not related to the selected content or the first virtual object, display on the display a third virtual object in the form of a 3D object related to the selected content.

According to an embodiment, the at least one processor may be configured to determine a shape of the third object based on the type of the object in the real space.

According to an embodiment, the wearable electronic device may further include memory which may or may not be part of the processor(s), and the at least one processor may be configured to identify the type of the object in the real space based on an artificial intelligence model stored in the memory.

According to an embodiment, the at least one processor may be configured to, upon occurrence of an event related to the selected content, update the second virtual object or the third virtual object based on information about the event.

According to an embodiment, the at least one processor may be configured to change a shape of the second virtual object or a shape of the third virtual object based on the information about the event.

According to an embodiment, the wearable electronic device may further include at least one second sensor, and the at least one processor may be configured to detect a gaze of a user through the at least one second sensor, based on the detected gaze of the user being directed toward the object in the real space, display the second virtual object or the third virtual object on the display, and based on the detected gaze of the user not being directed toward the object in the real space, delete part of the second virtual object or part of the third virtual object.

According to an embodiment, the second virtual object may include content information displayed in at least one of at least part of the object in the real space or the vicinity of the object in the real space.

According to an embodiment, the at least one processor may be configured to, upon receipt of a third user input for selecting the second virtual object or the third virtual object, display the execution screen of the application related to the selected content around the second virtual object or the third virtual object.

According to an embodiment, the at least one processor may be configured to, upon receipt of the first user input, identify a plurality of objects included in the real space, display a plurality of icons indicating that the first virtual object is mappable, respectively on the plurality of objects, and upon receipt of the second user input on one of the plurality of icons, identify a type of an object in the real space, corresponding to the one icon through the at least one first sensor.

According to an embodiment, the wearable electronic device may further include a communication module, and the at least one processor may be configured to, upon identification of occurrence of an event related to the second virtual object or the third virtual object through the camera, identify whether the wearable electronic device is connected to an external electronic device through the communication module, and based on identification that the wearable electronic device is connected to the external electronic device, transmit information about the event to the external electronic device through the communication module.

According to an embodiment, a method of controlling a wearable electronic device may include displaying an execution screen of an application on a display of the wearable electronic device, upon receipt of a first user input for selecting one content from among a plurality of contents included in the execution screen of the application through a camera of the wearable electronic device, displaying a first virtual object related to the selected content on the display, upon receipt of a second user input for mapping the first virtual object to an object included in a real space through the camera, identifying a type of the object in the real space through at least one first sensor of the wearable electronic device, when the type of the object in the real space is related to the selected content or the first virtual object, displaying on the display a second virtual object related to the selected content based on at least one of a shape, a position, or a size of the object in the real space, and when the type of the object in the real space is not related to the selected content or the first virtual object, displaying on the display a third virtual object in the form of a 3D object related to the selected content.

According to an embodiment, the method may further include determining a shape of the third object based on the type of the object in the real space.

According to an embodiment, identifying the type of the object may include identifying the type of the object in the real space based on an artificial intelligence model stored in memory of the wearable electronic device.

According to an embodiment, the method may further include, upon occurrence of an event related to the selected content, updating the second virtual object or the third virtual object based on information about the event.

According to an embodiment, the method may further include changing a shape of the second virtual object or a shape of the third virtual object based on the information about the event.

According to an embodiment, the method may further include detecting a gaze of a user through at least one second sensor of the wearable electronic device, based on the detected gaze of the user being directed toward the object in the real space, displaying the second virtual object or the third virtual object on the display, and based on the detected gaze of the user not being directed toward the object in the real space, deleting part of the second virtual object or part of the third virtual object.

According to an embodiment, the second virtual object may include content information displayed in at least one of at least part of the object in the real space or the vicinity of the object in the real space.

According to an embodiment, the method may further include, upon receipt of a third user input for selecting the second virtual object or the third virtual object, displaying the execution screen of the application related to the selected content around the second virtual object or the third virtual object.

According to an embodiment, identifying the type of the object in the real space may include, upon receipt of the first user input, identifying a plurality of objects included in the real space, displaying a plurality of icons indicating that the first virtual object is mappable, respectively on the plurality of objects, and upon receipt of the second user input on one of the plurality of icons, identifying a type of an object in the real space, corresponding to the one icon through the at least one first sensor.

According to an embodiment, the method may further include, upon identification of occurrence of an event related to the second virtual object or the third virtual object through the camera, identifying whether the wearable electronic device is connected to an external electronic device through a communication module of the wearable electronic device, and based on identification that the wearable electronic device is connected to the external electronic device, transmitting information about the event to the external electronic device through the communication module.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", or "connected to" another element (e.g., a second element), it means that the element may be coupled with the other element directly (e.g., wiredly), wirelessly, or via at least a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. A wearable electronic device comprising:
a display;
a camera;
at least one first sensor;
a processor; and
memory storing instructions that, when executed by the processor, cause the wearable electronic device to:
control to display an execution screen of an application on the display, wherein the execution screen comprises a plurality of contents,
based at least on receiving a first user input, through the camera, for selecting a content from among the plurality of contents, control to display a first virtual object related to the selected content on the display,
based at least on receiving a second user input, through the camera, for moving the first virtual object to an object included in an image of a real space obtained via the camera and mapping the first virtual object to the object included in the image of the real space, identify a type of the object in the image of the real space through the at least one first sensor, and
in response to at least the type of the object in the image of the real space being related to the selected content and/or the first virtual object, change the first virtual object to a second virtual object related to the selected content based at least on at least one of a shape, a position, or a size of the object in the image of the real space, and
in response to at least the type of the object in the image of the real space being not related to the selected content and/or the first virtual object, control to display on the display a third virtual object in a form of a three-dimensional (3D) object related to the selected content, wherein the wearable electronic device changes the first virtual object to the third virtual object based on the third virtual object being different from the first virtual object and displays the first virtual object as the third virtual object based on the third virtual object being a same as the first virtual object,
wherein a type of the second virtual object and a type of the third virtual object are different from each other.

2. The wearable electronic device of claim 1, wherein the instructions, when executed by the processor, cause the wearable electronic device to determine a shape of the third object based at least on the type of the object in the image of the real space.

3. The wearable electronic device of claim 1, further comprising a memory,
wherein the at instructions, when executed by the processor, cause the wearable electronic device to identify the type of the object in the image of the real space based at least on an artificial intelligence model stored in the memory.

4. The wearable electronic device of claim 1, wherein the instructions, when executed by the processor, cause the wearable electronic device to, in response to at least an event related to the selected content being occurred, update the second virtual object and/or the third virtual object based at least on information about the event.

5. The wearable electronic device of claim 4, wherein the instructions, when executed by the processor, cause the wearable electronic device to change a shape of the second virtual object and/or a shape of the third virtual object based at least on the information about the event.

6. The wearable electronic device of claim 1, further comprising at least one second sensor,
wherein the instructions, when executed by the processor, cause the wearable electronic device to:
detect a gaze of a user through the at least one second sensor, and
based at least on the detected gaze of the user being directed toward the object in the image of the real space, display the second virtual object and/or the third virtual object on the display, and based at least on the detected gaze of the user not being directed toward the object in the image of the real space, delete part of the second virtual object and/or part of the third virtual object.

7. The wearable electronic device of claim 1, wherein the second virtual object includes content information displayed in at least one of at least part of the object in the image of the real space or the vicinity of the object in the image of the real space.

8. The wearable electronic device of claim 1, wherein the instructions, when executed by the processor, cause the wearable electronic device to, based at least on receiving a third user input for selecting the second virtual object and/or the third virtual object, display the execution screen of the application related to the selected content around the second virtual object and/or the third virtual object.

9. The wearable electronic device of claim 1, wherein the instructions, when executed by the processor, cause the wearable electronic device to:

based at least on receiving the first user input, identify a plurality of objects included in the image of the real space, control to display a plurality of icons indicating that the first virtual object is mappable, respectively on the plurality of objects, and based at least on receiving the second user input on one of the plurality of icons, identify a type of an object in the image of the real space, corresponding to the one icon through the at least one first sensor.

10. The wearable electronic device of claim 1, further comprising a communication module comprising communication circuitry, wherein the instructions, when executed by the processor, cause the wearable electronic device to:

based at least on identification of occurrence of an event related to the second virtual object and/or the third virtual object through the camera, identify whether the wearable electronic device is connected to an external electronic device through the communication module, and based at least on identification that the wearable electronic device is connected to the external electronic device, control to transmit information about the event to the external electronic device through the communication module.

11. A method of controlling a wearable electronic device, the method comprising:

displaying an execution screen of an application on a display of the wearable electronic device, wherein the execution screen comprises a plurality of contents;

based at least on receiving a first user input, through a camera of the wearable electronic device, for selecting a content from among the plurality of contents, displaying a first virtual object related to the selected content on the display;

based at least on receiving a second user input, through the camera, for moving the first virtual object to an object included in an image of a real space obtained via the camera and mapping the first virtual object to the object included in the image of the real space, identifying a type of the object in the image of the real space through at least one first sensor of the wearable electronic device; and in response to at least the type of the object in the image of the real space being related to the selected content and/or the first virtual object, changing the first virtual object to a second virtual object related to the selected content, based on at least one of a shape, a position, or a size of the object in the image of the real space, and in response to at least the type of the object in the image of the real space being not related to the selected content or the first virtual object, displaying on the display a third virtual object in a form of a three-dimensional (3D) object related to the selected content, wherein the displaying the third virtual object comprises changing the first virtual object to the third virtual object based on the third virtual object being different from the first virtual object and displaying the first virtual object as the third virtual object based on the third virtual object being a same as the first virtual object, wherein a type of the second virtual object and a type of the third virtual object are different from each other.

12. The method of claim 11, further comprising determining a shape of the third object based on the type of the object in the image of the real space.

13. The method of claim 11, wherein identifying the type of the object comprises identifying the type of the object in the image of the real space based on an artificial intelligence model stored in memory of the wearable electronic device.

14. The method of claim 11, further comprising, in response to an event related to the selected content being occurred, updating the second virtual object or the third virtual object based on information about the event.

15. The method of claim 14, further comprising changing a shape of the second virtual object and/or a shape of the third virtual object based at least on the information about the event.

16. The method of claim 11, further comprising:

detecting a gaze of a user through at least one second sensor of the wearable electronic device; and based at least on the detected gaze of the user being directed toward the object in the image of the real space, displaying the second virtual object and/or the third virtual object on the display, and based on the detected gaze of the user not being directed toward the object in the image of the real space, deleting part of the second virtual object and/or part of the third virtual object.

17. The method of claim 11, wherein the second virtual object includes content information displayed in at least one of at least part of the object in the image of the real space and/or the vicinity of the object in the image of the real space.

18. The method of claim 11, further comprising, based at least on receiving a third user input for selecting the second virtual object and/or the third virtual object, displaying the execution screen of the application related to the selected content around the second virtual object and/or the third virtual object.

19. The method of claim 11, wherein identifying the type of the object in the image of the real space comprises:

based on receiving the first user input, identifying a plurality of objects included in the image of the real space;

displaying a plurality of icons indicating that the first virtual object is mappable, respectively on the plurality of objects; and based at least on receiving the second user input on one of the plurality of icons, identifying a type of an object in the image of the real space, corresponding to the one icon through the at least one first sensor.

20. A non-transitory computer-readable recording medium storing one or more programs, the one or more programs comprising instructions that, when executed by at least one processor of a wearable electronic device, cause the wearable electronic device to:

display an execution screen of an application, based at least on receiving a first user input for selecting a content from among a plurality of contents included in the execution screen of the application through a camera of the wearable electronic device, display a first virtual object related to the selected content, based at least on receiving a second user input, through the camera, for mapping the first virtual object to an object included in an image of a real space obtained via the camera, identify a type of the object in the image of the real space through at least one first sensor of the wearable electronic device, and in response to at least the type of the object in the image of the real space being related to the selected content and/or the first virtual object, change the first virtual object to a second virtual object related to the selected content, based at least on at least one of a shape, a position, or a size of the object in the image of the real space, and in response to at least the type of the object in the image of the real space being not related to the selected content and/or the first virtual object, control to display on the display a third virtual object, in a form of a three-dimensional (3D) object related to the selected content, wherein the wearable electronic device changes the first virtual object to the third virtual object based on the third virtual object being different from the first virtual object and display the first virtual object as the third virtual object based on the third virtual object being a same as the first virtual object, wherein a type of the second virtual object and a type of the third virtual object are different from each other.

* * * * *